(12) United States Patent
Skinder

(10) Patent No.: US 10,572,476 B2
(45) Date of Patent: Feb. 25, 2020

(54) REFINING A SEARCH BASED ON SCHEDULE ITEMS

(71) Applicant: Apple Inc., Cupertino, CA (US)

(72) Inventor: Jason A. Skinder, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 787 days.

(21) Appl. No.: 14/207,090

(22) Filed: Mar. 12, 2014

(65) Prior Publication Data

US 2014/0280292 A1    Sep. 18, 2014

Related U.S. Application Data

(60) Provisional application No. 61/785,565, filed on Mar. 14, 2013.

(51) Int. Cl.
*G06F 16/2453* (2019.01)
*G06F 16/33* (2019.01)
*G06Q 10/10* (2012.01)

(52) U.S. Cl.
CPC .... *G06F 16/24534* (2019.01); *G06F 16/3338* (2019.01); *G06Q 10/109* (2013.01)

(58) Field of Classification Search
CPC ......... G06F 17/30448; G06F 17/30672; G06F 16/24534; G06F 16/3338
USPC ....................................................... 707/767
See application file for complete search history.

(56) References Cited

U.S. PATENT DOCUMENTS

| | | |
|---|---|---|
| 3,704,345 A | 11/1972 | Coker et al. |
| 3,828,132 A | 8/1974 | Flanagan et al. |
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |

(Continued)

FOREIGN PATENT DOCUMENTS

| | | |
|---|---|---|
| CH | 681573 A5 | 4/1993 |
| DE | 3837590 A1 | 5/1990 |

(Continued)

OTHER PUBLICATIONS

Owei et al., "Natural Language Query Filtration in the Conceptual Query Language", IEEE, 1997, pp. 539-549.

(Continued)

*Primary Examiner* — Jensen Hu
(74) *Attorney, Agent, or Firm* — Dentons US LLP

(57) ABSTRACT

A method includes receiving a search request from a user, the search request specifying one or more search criteria for selecting one or more selection items from a respective selection domain; identifying one or more schedule items relevant to the search request; augmenting the search request based on information contained in at least one of the identified schedule items; and presenting the augmented search request or search results retrieved based on the augmented search request to the user.

50 Claims, 15 Drawing Sheets

(56) References Cited

U.S. PATENT DOCUMENTS

| | | |
|---|---|---|
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,518 A | 5/1989 | Feustel et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,617 A | 9/1991 | Shepard et al. |
| 5,057,915 A | 10/1991 | Von Kohorn |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,627 A | 1/1993 | Sweet et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,772 A | 2/1996 | Hardwick et al. |
| 5,493,677 A | 2/1996 | Balogh et al. |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,216 A | 3/1998 | Logan et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |

(56) References Cited

U.S. PATENT DOCUMENTS

| | | |
|---|---|---|
| 5,857,184 A | 1/1999 | Lynch |
| 5,860,063 A | 1/1999 | Gorin et al. |
| 5,862,233 A | 1/1999 | Poletti |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,394 A | 9/1999 | Gould et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,281 B1 | 9/2002 | Walters et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,519,565 B1 | 2/2003 | Clements et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Cooperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Wang et al. |
| 6,772,123 B2 | 8/2004 | Cooklev et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |

(56) References Cited

U.S. PATENT DOCUMENTS

| | | |
|---|---|---|
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,934,684 B2 | 8/2005 | Alpdemir et al. |
| 6,937,975 B1 | 8/2005 | Elworthy |
| 6,937,986 B2 | 8/2005 | Denenberg et al. |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,020,685 B1 | 3/2006 | Chen et al. |
| 7,024,363 B1 | 4/2006 | Comerford et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,467,087 B1 | 12/2008 | Gillick et al. |
| 7,475,010 B2 | 1/2009 | Chao |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,571,106 B2 | 8/2009 | Cao et al. |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,664,638 B2 | 2/2010 | Cooper et al. |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,721,301 B2 | 5/2010 | Wong et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,853,574 B2 * | 12/2010 | Kraenzel ........... G06F 17/30867 707/705 |
| 7,853,664 B1 | 12/2010 | Wang et al. |
| 7,873,519 B2 | 1/2011 | Bennett |
| 7,873,654 B2 | 1/2011 | Bernard |
| 7,881,936 B2 | 2/2011 | Longe et al. |
| 7,890,652 B2 | 2/2011 | Bull et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,925,525 B2 | 4/2011 | Chin |
| 7,930,168 B2 | 4/2011 | Weng et al. |
| 7,949,529 B2 | 5/2011 | Weider et al. |

(56) References Cited

U.S. PATENT DOCUMENTS

| | | |
|---|---|---|
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,032,383 B1 | 10/2011 | Bhardwaj et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longe et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,296,383 B2 | 10/2012 | Lindahl |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,447,612 B2 | 5/2013 | Gazdzinski |
| 9,514,470 B2 * | 12/2016 | Topatan ................ G06Q 30/02 |
| 2001/0047264 A1 | 11/2001 | Roundtree |
| 2002/0010584 A1 | 1/2002 | Schultz et al. |
| 2002/0032564 A1 | 3/2002 | Ehsani et al. |
| 2002/0035474 A1 | 3/2002 | Alpdemir |
| 2002/0046025 A1 | 4/2002 | Hain |
| 2002/0069063 A1 | 6/2002 | Buchner et al. |
| 2002/0077817 A1 | 6/2002 | Atal |
| 2002/0087525 A1 * | 7/2002 | Abbott ................ G06F 16/9535 |
| 2002/0103641 A1 | 8/2002 | Kuo et al. |
| 2002/0116185 A1 | 8/2002 | Cooper et al. |
| 2002/0116189 A1 | 8/2002 | Yeh et al. |
| 2002/0164000 A1 | 11/2002 | Cohen et al. |
| 2002/0198714 A1 | 12/2002 | Zhou |
| 2003/0088414 A1 | 5/2003 | Huang et al. |
| 2003/0097210 A1 | 5/2003 | Horst et al. |
| 2003/0135740 A1 | 7/2003 | Talmor et al. |
| 2004/0135701 A1 | 7/2004 | Yasuda et al. |
| 2004/0199387 A1 | 10/2004 | Wang et al. |
| 2004/0220798 A1 | 11/2004 | Chi et al. |
| 2004/0236778 A1 | 11/2004 | Junqua et al. |
| 2005/0002507 A1 | 1/2005 | Timmins et al. |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | Di Fabbrizio et al. |
| 2005/0182629 A1 | 8/2005 | Coorman et al. |
| 2005/0196733 A1 | 9/2005 | Budra et al. |
| 2005/0273626 A1 | 12/2005 | Pearson et al. |
| 2005/0288936 A1 | 12/2005 | Busayapongchai et al. |
| 2006/0018492 A1 | 1/2006 | Chiu et al. |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2006/0217967 A1 | 9/2006 | Goertzen et al. |
| 2006/0235700 A1 | 10/2006 | Wong et al. |
| 2007/0041361 A1 | 2/2007 | Iso-Sipila |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0174188 A1 | 7/2007 | Fish |
| 2007/0185917 A1 | 8/2007 | Prahlad et al. |
| 2007/0192179 A1 | 8/2007 | Van Luchene |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0021860 A1 * | 1/2008 | Wiegering .......... G06F 16/9535 |
| 2008/0034032 A1 | 2/2008 | Healey et al. |
| 2008/0052063 A1 | 2/2008 | Bennett et al. |
| 2008/0082332 A1 | 4/2008 | Mallett et al. |
| 2008/0082338 A1 | 4/2008 | O'Neil et al. |
| 2008/0120112 A1 | 5/2008 | Jordan et al. |
| 2008/0129520 A1 | 6/2008 | Lee |
| 2008/0140416 A1 | 6/2008 | Shostak |
| 2008/0140657 A1 | 6/2008 | Azvine et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0256613 A1 | 10/2008 | Grover |
| 2008/0270151 A1 | 10/2008 | Mahoney et al. |
| 2008/0300878 A1 | 12/2008 | Bennett |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0018835 A1 | 1/2009 | Cooper et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0076796 A1 | 3/2009 | Daraselia |
| 2009/0077165 A1 | 3/2009 | Rhodes et al. |
| 2009/0100049 A1 | 4/2009 | Cao |
| 2009/0112677 A1 | 4/2009 | Rhett |
| 2009/0150156 A1 | 6/2009 | Kennewick et al. |
| 2009/0152349 A1 | 6/2009 | Bonev et al. |
| 2009/0157401 A1 | 6/2009 | Bennett |
| 2009/0158200 A1 * | 6/2009 | Palahnuk ............... G06Q 30/00 715/781 |
| 2009/0164441 A1 | 6/2009 | Cheyer |
| 2009/0171664 A1 | 7/2009 | Kennewick et al. |
| 2009/0204409 A1 | 8/2009 | Mozer et al. |
| 2009/0228439 A1 * | 9/2009 | Manolescu ....... G06F 17/30864 |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |

(56) References Cited

U.S. PATENT DOCUMENTS

| | | | |
|---|---|---|---|
| 2010/0036660 A1 | 2/2010 | Bennett | |
| 2010/0042400 A1 | 2/2010 | Block et al. | |
| 2010/0070517 A1* | 3/2010 | Ghosh | G06F 17/30734 707/758 |
| 2010/0088020 A1 | 4/2010 | Sano et al. | |
| 2010/0088100 A1 | 4/2010 | Lindahl | |
| 2010/0131273 A1 | 5/2010 | Aley-Raz et al. | |
| 2010/0138215 A1 | 6/2010 | Williams | |
| 2010/0145700 A1 | 6/2010 | Kennewick et al. | |
| 2010/0153448 A1* | 6/2010 | Harpur | G06F 17/30867 707/779 |
| 2010/0204986 A1 | 8/2010 | Kennewick et al. | |
| 2010/0217604 A1 | 8/2010 | Baldwin et al. | |
| 2010/0228540 A1 | 9/2010 | Bennett | |
| 2010/0235341 A1 | 9/2010 | Bennett | |
| 2010/0257160 A1 | 10/2010 | Cao | |
| 2010/0262599 A1 | 10/2010 | Nitz | |
| 2010/0277579 A1 | 11/2010 | Cho et al. | |
| 2010/0278320 A1 | 11/2010 | Arsenault et al. | |
| 2010/0280983 A1 | 11/2010 | Cho et al. | |
| 2010/0286985 A1 | 11/2010 | Kennewick et al. | |
| 2010/0299142 A1 | 11/2010 | Freeman et al. | |
| 2010/0312547 A1 | 12/2010 | Van Os et al. | |
| 2010/0318576 A1 | 12/2010 | Kim | |
| 2010/0325158 A1* | 12/2010 | Oral | G06F 17/30696 707/780 |
| 2010/0332235 A1 | 12/2010 | David | |
| 2010/0332348 A1 | 12/2010 | Cao | |
| 2011/0047072 A1 | 2/2011 | Ciurea | |
| 2011/0060807 A1 | 3/2011 | Martin et al. | |
| 2011/0066366 A1* | 3/2011 | Ellanti | G01C 21/3438 701/533 |
| 2011/0082688 A1 | 4/2011 | Kim et al. | |
| 2011/0112827 A1 | 5/2011 | Kennewick et al. | |
| 2011/0112921 A1 | 5/2011 | Kennewick et al. | |
| 2011/0119049 A1 | 5/2011 | Ylonen | |
| 2011/0125540 A1 | 5/2011 | Jang et al. | |
| 2011/0130958 A1 | 6/2011 | Stahl et al. | |
| 2011/0131036 A1 | 6/2011 | DiCristo et al. | |
| 2011/0131045 A1 | 6/2011 | Cristo et al. | |
| 2011/0143811 A1 | 6/2011 | Rodriguez | |
| 2011/0144999 A1 | 6/2011 | Jang et al. | |
| 2011/0161076 A1 | 6/2011 | Davis et al. | |
| 2011/0161309 A1 | 6/2011 | Lung et al. | |
| 2011/0175810 A1 | 7/2011 | Markovic et al. | |
| 2011/0184730 A1 | 7/2011 | LeBeau et al. | |
| 2011/0184768 A1* | 7/2011 | Norton | G06Q 10/02 705/5 |
| 2011/0218855 A1 | 9/2011 | Cao et al. | |
| 2011/0231182 A1 | 9/2011 | Weider et al. | |
| 2011/0231188 A1 | 9/2011 | Kennewick et al. | |
| 2011/0264643 A1 | 10/2011 | Cao | |
| 2011/0279368 A1 | 11/2011 | Klein et al. | |
| 2011/0298585 A1 | 12/2011 | Barry | |
| 2011/0306426 A1 | 12/2011 | Novak et al. | |
| 2012/0002820 A1 | 1/2012 | Leichter | |
| 2012/0016678 A1 | 1/2012 | Gruber et al. | |
| 2012/0020490 A1 | 1/2012 | Leichter | |
| 2012/0022787 A1 | 1/2012 | LeBeau et al. | |
| 2012/0022857 A1 | 1/2012 | Baldwin et al. | |
| 2012/0022860 A1 | 1/2012 | Lloyd et al. | |
| 2012/0022868 A1 | 1/2012 | LeBeau et al. | |
| 2012/0022869 A1 | 1/2012 | Lloyd et al. | |
| 2012/0022870 A1 | 1/2012 | Kristjansson et al. | |
| 2012/0022874 A1 | 1/2012 | Lloyd et al. | |
| 2012/0022876 A1 | 1/2012 | LeBeau et al. | |
| 2012/0023088 A1 | 1/2012 | Cheng et al. | |
| 2012/0034904 A1 | 2/2012 | LeBeau et al. | |
| 2012/0035908 A1 | 2/2012 | LeBeau et al. | |
| 2012/0035924 A1 | 2/2012 | Jitkoff et al. | |
| 2012/0035931 A1 | 2/2012 | LeBeau et al. | |
| 2012/0035932 A1 | 2/2012 | Jitkoff et al. | |
| 2012/0042343 A1 | 2/2012 | Laligand et al. | |
| 2012/0053829 A1* | 3/2012 | Agarwal | G01C 21/20 701/418 |
| 2012/0117499 A1* | 5/2012 | Mori | H04M 1/72569 715/765 |
| 2012/0137367 A1 | 5/2012 | Dupont et al. | |
| 2012/0173464 A1 | 7/2012 | Tur et al. | |
| 2012/0215762 A1* | 8/2012 | Hall | G06F 17/30867 707/710 |
| 2012/0265528 A1 | 10/2012 | Gruber et al. | |
| 2012/0271676 A1 | 10/2012 | Aravamudan et al. | |
| 2012/0310922 A1* | 12/2012 | Johnson | G06F 17/30867 707/722 |
| 2012/0311583 A1 | 12/2012 | Gruber et al. | |
| 2012/0330661 A1 | 12/2012 | Lindahl | |
| 2013/0006638 A1 | 1/2013 | Lindahl | |
| 2013/0054631 A1* | 2/2013 | Govani | G06F 16/9535 707/767 |
| 2013/0110518 A1 | 5/2013 | Gruber et al. | |
| 2013/0110520 A1 | 5/2013 | Cheyer et al. | |
| 2014/0074815 A1* | 3/2014 | Plimton | G06F 17/30572 707/709 |
| 2014/0081633 A1* | 3/2014 | Badaskar | G06F 17/30023 704/235 |
| 2014/0122153 A1* | 5/2014 | Truitt | G06Q 10/1095 705/7.19 |
| 2014/0280107 A1* | 9/2014 | Heymans | G06F 16/9535 707/727 |
| 2015/0201064 A1* | 7/2015 | Bells | G06F 17/30241 705/7.19 |

FOREIGN PATENT DOCUMENTS

| | | |
|---|---|---|
| DE | 19841541 B4 | 12/2007 |
| EP | 0138061 A1 | 4/1985 |
| EP | 0218859 A2 | 4/1987 |
| EP | 0262938 A1 | 4/1988 |
| EP | 0138061 B1 | 6/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0570660 A1 | 11/1993 |
| EP | 0863453 A1 | 9/1998 |
| EP | 0559349 B1 | 1/1999 |
| EP | 1229496 A2 | 8/2002 |
| EP | 1245023 A1 | 10/2002 |
| EP | 2109295 A1 | 10/2009 |
| GB | 2293667 A | 4/1996 |
| JP | 6-19965 A | 1/1994 |
| JP | 2001-125896 A | 5/2001 |
| JP | 2002-24212 A | 1/2002 |
| JP | 2003-517158 A | 5/2003 |
| JP | 2009-36999 A | 2/2009 |
| KR | 10-0757496 B1 | 9/2007 |
| KR | 10-0776800 B1 | 11/2007 |
| KR | 10-0801227 B1 | 2/2008 |
| KR | 10-0810500 B1 | 3/2008 |
| KR | 10-2008-0109322 A | 12/2008 |
| KR | 10-2009-0086805 A | 8/2009 |
| KR | 10-0920267 B1 | 10/2009 |
| KR | 10-2010-0119519 A | 11/2010 |
| KR | 10-1032792 B1 | 5/2011 |
| KR | 10-2011-0113414 A | 10/2011 |
| WO | 1995/002221 A1 | 1/1995 |
| WO | 1997/026612 A1 | 7/1997 |
| WO | 1998/041956 A1 | 9/1998 |
| WO | 1999/001834 A1 | 1/1999 |
| WO | 1999/008238 A1 | 2/1999 |
| WO | 1999/056227 A1 | 11/1999 |
| WO | 2000/060435 A2 | 10/2000 |
| WO | 2000/060435 A3 | 4/2001 |
| WO | 2002/073603 A1 | 9/2002 |
| WO | 2006/129967 A1 | 12/2006 |
| WO | 2008/085742 A2 | 7/2008 |

(56) References Cited

FOREIGN PATENT DOCUMENTS

| WO | 2008/109835 A2 | 9/2008 |
|---|---|---|
| WO | 2010/075623 A1 | 7/2010 |
| WO | 2011/088053 A2 | 7/2011 |

OTHER PUBLICATIONS

Pannu et al., "A Learning Personal Agent for Text Filtering and Notification", Proceedings of the International Conference of Knowledge Based Systems, 1996, pp. 1-11.

Papadimitriou et al., "Latent Semantic Indexing: A Probabilistic Analysis", available online at <http://citeseerx.ist.psu.edu/messaqes/downloadsexceeded.html>, Nov. 14, 1997, 21 pages.

Parsons, T. W., "Voice and Speech Processing", Pitch and Formant Estimation © 1987, McGraw-Hill, Inc., ISBN: 0-07-0485541-0, 1987, 15 pages.

Parsons,, T. W., "Voice and Speech Processin", Linguistics and Technical Fundamentals, Articulatory Phonetics and Phonemics,© 1987 McGraw-Hill, Inc., ISBN: 0-07-0485541-0, 5 pages.

International Preliminary Report on Patentability received for PCT Patent Application No. PCT/US1993/012637, dated Apr. 10, 1995, 7 pages.

International Preliminary Report on Patentability received for PCT Patent Application No. PCT/US1993/012666, dated Mar. 1, 1995, 5 pages.

International Search Report received for PCT Patent Application No. PCT/US1993/012666, dated Nov. 9, 1994, 8 pages.

International Preliminary Report on Patentability received for PCT Patent Application No. PCT/US1994/011011, dated Feb. 28, 1996, 4 pages.

International Search Report received for PCT Patent Application No. PCT/US1994/011011, dated Feb. 8, 1995, 7 pages.

Written Opinion received for PCT Patent Application No. PCT/US1994/011011, dated Aug. 21, 1995, 4 pages.

International Preliminary Report on Patentability received for PCT Patent Application No. PCT/US1995/008369, dated Oct. 9, 1996, 4 pages.

International Search Report received for PCT Patent Application No. PCT/US1995/008369, dated Nov. 8, 1995, 6 pages.

International Search Report and Written Opinion received for PCT Patent Application No. PCT/US2011/020861, dated Nov. 29, 2011, 12 pages.

International Preliminary Report on Patentability received for PCT Patent Application No. PCT/US2012/029810, dated Oct. 3, 2013, 9 pages.

International Search Report and Written Opinion received for PCT Patent Application No. PCT/US2012/029810, dated Aug. 17, 2012, 11 pages.

Pereira, Fernando, "Logic for Natural Language Analysis", SRI International, Technical Note 275, Jan. 1983, 194 pages.

Perrault et al., "Natural-Language Interfaces", SRI International, Technical Note 393, Aug. 22, 1986, 48 pages.

Phoenix Solutions, Inc., A, "Declaration of Christopher Schmandt Regarding the MIT Galaxy System", West Interactive Corporation, a Delaware Corporation, Document 40, Jul. 2, 2010, 162 pages.

Picone, J., "Continuous Speech Recognition Using Hidden Markov Models", IEEE ASSP Magazine, vol. 7, No. 3, Jul. 1990, 16 pages.

Pulman et al., "Clare: A Combined Language and Reasoning Engine", Proceedings of JFIT Conference, available online at <URL: http://www.cam.sri.com/tr/crc042/paper.ps.Z>, 1993, 8 pages.

Rabiner et al., "Fundamental of Speech Recognition", © 1993 AT&T, Published by Prentice-Hall, Inc., ISBN: 0-13-285826-6, 1993, 17 pages.

Rabiner et al., "Note on the Properties of a Vector Quantizer for LPC Coefficients", Bell System Technical Journal, vol. 62, No. 8, Oct. 1983, 9 pages.

Ratcliffe, M., "CiearAccess 2.0 allows SQL searches off-line (Structured Query Language)", ClearAcess Corp., MacWeek, vol. 6, No. 41, Nov. 16, 1992, 2 pages.

Ravishankar, "Efficient Algorithms for Speech Recognition", Doctoral Thesis submitted to School of Computer Science, Computer Science Division, Carnegie Mellon University, Pittsburg, May 15, 1996, 146 pages.

Rayner et al., "Adapting the Core Language Engine to French and Spanish", Cornell University Library, available online at <http:l/arxiv.org/abs/cmp-lg/9605015.>, May 10, 1996, 9 pages.

Rayner et al., "Deriving Database Queries from Logical Forms by Abductive Definition Expansion", Proceedings of the Third Conference on Applied Natural Language Processing, ANLC, 1992, 8 pages.

Rayner et al., "Spoken Language Translation With Mid-90's Technology: A Case Study", EUROSPEECH, ISCA, available online at <http:// db l p. u n i-trier. de/d b/conf/interspeech/eurospeech 1993.html#RaynerBCCDGKKLPPS93>, 1993, 4 pages.

Rayner, M., "Abductive Equivalential Translation and its application to Natural Language Database Interfacing", Dissertation paper, SRI International, Sep. 1993, 163 pages.

Rayner, M., "Linguistic Domain Theories: Natural-Language Database Interfacing from First Principles", SRI International, Cambridge, 1993, 11 pages.

Remde et al., "SuperBook: An Automatic Tool for Information Exploration—Hypertext?", In Proceedings of Hypertext '87, Nov. 13-15, 1987, 14 pages.

Reynolds, C. F., "On-Line Reviews: A New Application of the HICOM Conferencing System", IEE Colloquium on Human Factors in Electronic Mail and Conferencing Systems, Feb. 3, 1989, 4 pages.

Rice et al., "Monthly Program: Nov. 14, 1995", The San Francisco Bay Area Chapter of ACM SIGCHI, Available at <http://www.baychi.org/calendar/19951114>, Nov. 14, 1995, 2 pages.

Rice et al., "Using the Web Instead of a Window System", Proceedings of the SIGCHI Conference on Human Factors in Computing Systems, CHI'96, 1996, pp. 1-14.

Rigoll, G., "Speaker Adaptation for Large Vocabulary Speech Recognition Systems Using Speaker Markov Models", International Conference on Acoustics, Speech, and Signal Processing (ICASSP'89), May 23-26, 1989, 4 pages.

Riley, M D., "Tree-Based Modelling of Segmental Durations", Talking Machines Theories, Models, and Designs, 1992 © Elsevier Science Publishers B.V., North-Holland, ISBN: 08-444-89115.3, 1992, 15 pages.

Rivlin et al., "Maestro: Conductor of Multimedia Analysis Technologies", SRI International, 1999, 7 pages.

Rivoira et al., "Syntax and Semantics in a Word-Sequence Recognition System", IEEE International Conference on Acoustics, Speech, and Signal Processing (ICASSP'79), Apr. 1979, 5 pages.

Roddy et al., "Communication and Collaboration in a Landscape of B2B eMarketplaces", VerticaiNet Solutions, white paper, Jun. 15, 2000, 23 pages.

Rosenfeld, R., "A Maximum Entropy Approach to Adaptive Statistical Language Modelling", Computer Speech and Language, vol. 10, No. 3, Jul. 1996, 25 pages.

Roszkiewicz, A., "Extending your Apple", Back Talk—Lip Service, A+ Magazine, The Independent Guide for Apple Computing, vol. 2, No. 2, Feb. 1984, 5 pages.

Rudnicky et al., "Creating Natural Dialogs in the Carnegie Mellon Communicator System", Proceedings of Eurospeech, vol. 4, 1999, pp. 1531-1534.

Russell et al., "Artificial Intelligence, A Modern Approac", © 1995 Prentice Hall, Inc., 1995, 121 pages.

Sacerdoti et al., "A Ladder User's Guide (Revised)", SRI International Artificial Intelligence Center, Mar. 1980, 39 pages.

Sagalowicz, D., "AD-Ladder User's Guide", SRI International, Sep. 1980, 42 pages.

Sakoe et al., "Dynamic Programming Algorithm Optimization for Spoken Word Recognition", IEEE Transactions on Acoustics, Speech, and Signal Processing, vol. ASSP-26 No. 1, Feb. 1978, 8 pages.

Salton et al., "On the Application of Syntactic Methodologies in Automatic Text Analysis", Information Processing and Management, vol. 26, No. 1, Great Britain, 1990, 22 pages.

(56) References Cited

OTHER PUBLICATIONS

Sameshima et al., "Authorization with security attributes and privilege delegation Access control beyond the ACL", Computer Communications, vol. 20, 1997, 9 pages.
San-Segundo et al., "Confidence Measures for Dialogue Management in the CU Communicator System", Proceedings of Acoustics, Speech, and Signal Processing (ICASSP'00), Jun. 5-9, 2000, 4 pages.
Sato, H., "A Data Model, Knowledge Base, and Natural Language Processing for Sharing a Large Statistical Database,", Statistical and Scientific Database Management, Lecture Notes in Computer Science, vol. 339, 1989, 20 pages.
Savoy, J., "Searching Information in Hypertext Systems Using Multiple Sources of Evidence", International Journal of Man-Machine Studies, vol. 38, No. 6, Jun. 1996, pp. 1017-1030.
Scagliola, C., "Language Models and Search Algorithms for Real-Time Speech Recognition", International Journal of Man-Machine Studies, vol. 22, No. 5, 1985, pp. 523-547.
Schmandt et al., "Augmenting a Window System with Speech Input", IEEE Computer Society, Computer, vol. 23, No. 8, Aug. 1990, pp. 50-56.
Ward et al., "A Class Based Language Model for Speech Recognition", Conference Proceedings International Conference on Acoustics, Speech, and Signal Processing, 1996, ICASSP-96 , pp. 416-418.
Schütze, H., "Dimensions of Meaning", Proceedings of Supercomputing'92 Conference, Nov. 16-20, 1992, 10 pages.
Seneff et al., "A New Restaurant Guide Conversational System: Issues in Rapid Prototyping for Specialized Domains", Proceedings of Fourth International Conference on Spoken Language, 1996. ICSLP 96, 1996, pp. 665-668.
Sharoff et al., "Register-domain Separation as a Methodology for Development of Natural Language Interfaces to Databases", Proceedings of Human-Computer Interaction (INTERACT'99), 1999, 7 pages.
Sheth et al., "Evolving Agents for Personalized Information Filtering", In Proceedings of the Ninth Conference on Artificial Intelligence for Applications, Mar. 1-5, 1993, 9 pages.
Sheth et al., "Relationships at the Heart of Semantic Web: Modeling, Discovering, and Exploiting Complex Semantic Relationships", Enhancing the Power of the Internet: Studies in Fuzziness and Soft Computing, Oct. 13, 2002, pp. 1-38.
Shikano et al., "Speaker Adaptation Through Vector Quantization", IEEE International Conference on Acoustics, Speech, and Signal Processing (ICASSP'86), vol. 11, Apr. 1986, 4 pages.
Shimazu et al., "CAPIT: Natural Language Interface Design Tool with Keyword Analyzer and Case-Based Parser,", NEG Research & Development, vol. 33, No. 4, Oct. 1992, 11 pages.
Shinkle, L., "Team User's Guide", SRI International, Artificial Intelligence Center, Nov. 1984, 78 pages.
Shklar et al., "Info Harness: Use of Automatically Generated Metadata for Search and Retrieval of Heterogeneous Information", 1995 Proceedings of CAiSE'95, Finland, 1995.
Sigurdsson et al., "Mel Frequency Cepstral Coefficients: An Evaluation of Robustness of MP3 Encoded Music", In Proceedings of the 7th International Conference on Music Information Retrieval ISMIR, 2006, 4 pages.
Silverman et al., "Using a Sigmoid Transformation for Improved Modeling of Phoneme Duration", Proceedings of the IEEE International Conference on Acoustics, Speech, and Signal Processing, Mar. 15-19, 1999, 5 pages.
Simonite, Tom, "One Easy Way to Make Siri Smarter", Technology Review, Oct. 18, 2011, 2 pages.
Singh, N., "Unifying Heterogeneous Information Models", Communications of the ACM, 1998, 13 pages.
SRI International, "The Open Agent Architecture.TM. 1.0 Distribution", Open Agent Architecture (OAA), 1999, 2 pages.
SRI2009, "SRI Speech: Products: Software Development Kits: EduSpeak", available a <http://web.archive.org/web/20090828084033/http://www.speechatsri.com/products/eduspeak> shtml., 2009, 2 pages.
Starr et al., "Knowledge-Intensive Query Processing", Proceedings of the 5th KRDB Workshop, Seattle, May 31, 1998, 6 pages.
Stent et al., "The CommandTalk Spoken Dialogue System", SRI International, 1999, pp. 183-190.
Stern et al., "Multiple Approaches to Robust Speech Recognition", Proceedings of Speech and Natural Language Workshop, 1992, 6 pages.
Stickel, "A Nonclausal Connection-Graph Resolution Theorem-Proving Program", Proceedings of AAAI'82, 1982, pp. 1-13.
Sugumaran, V., "A Distributed Intelligent Agent-Based Spatial Decision Support System", Proceedings of the Americas Conference on Information systems (AMCIS), Dec. 31, 1998, 4 pages.
Sycara et al., "Coordination of Multiple Intelligent Software Agents", International Journal of Cooperative Information Systems (IJCIS), vol. 5, No. 2 & 3, Jun. & Sep. 1996, 33 pages.
Sycara et al., "Distributed Intelligent Agents", IEEE Expert, vol. 11, No. 6, Dec. 1996, 32 pages.
Sycara et al., "Dynamic Service Matchmaking Among Agents in Open Information Environments", SIGMOD Record, 1999, 7 pages.
Sycara et al., "The RETSINA MAS Infrastructure", Autonomous Agents and Multi-Agent Systems, vol. 7, 2003, 20 pages.
Tenenbaum et al., "Data Structure Using Pascal", 1981 Prentice-Hall, Inc, 1981, 34 pages.
TextnDrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
Tofel et al., "SpeakTolt: A Personal Assistant for Older iPhones, iPads", Apple News, Tips and Reviews, Feb. 9, 2012, 7 pages.
Tsai et al., "Attributed Grammar—A Tool for Combining Syntactic and Statistical Approaches to Pattern Recognition", IEEE Transactions on Systems, Man, and Cybernetics, vol. SMC-10, No. 12, Dec. 1980, 13 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech, and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Tyson et al., "Domain-Independent Task Specification in the TACITUS Natural Language System", SRI International, Artificial Intelligence Center, May 1990, 16 pages.
Udell, J., "Computer Telephony", BYTE, vol. 19, No. 7, Jul. 1, 1994, 9 pages.
Van Santen, J. P., "Contextual Effects on Vowel Duration", Journal Speech Communication, vol. 11, No. 6, Dec. 1992, 34 pages.
Vepa et al., "New Objective Distance Measures for Spectral Discontinuities in Concatenative Speech Synthesis", In Proceedings of the IEEE 2002 Workshop on Speech Synthesis, 2002, 4 pages.
Verschelde, J., "MATLAB Lecture 8. Special Matrices in MATLAB,", UIC Dept. of Math., Stat. & C.S., MCS 320, Introduction to Symbolic Computation, Nov. 23, 2005, 4 pages.
Vingron, M., "Near-Optimal Sequence Alignment", Deutsches Krebsforschungszentrum (DKFZ), Abteilung Theoretische Bioinformatik, Heidelberg, Germany, Jun. 1996, 20 pages.
Vlingo, "Vlingo Launches Voice Enablement Application on Apple App Store", Press Release, Dec. 3, 2008, 2 pages.
Vlingo LnCar, "Distracted Driving Solution with Vlingo InCar", YouTube by Vlingo Voice on (Oct. 6, 2010) 2:38 minute video uploaded to Retrieved from Internet on Jun. 6, 2012<http://www.youtube.com/watch?v=Vqs8XfXxgz4?, 2 pages.
VoiceAssist, Send Text, "Listen to and Send E~Mail by Voice", YouTube Video available at <http://www.youtube.com/watch?v=0tEU61nHHA4>, Jul. 30, 2009, 1 page.
VoiceOnTheGo, "Voice on the Go (BlackBerry)", YouTube available at <http://www.youtube.com/watch?v=pJqpWgQS98w>, Jul. 27, 2009, 1 page.
Wahlster et al., "Smartkom: Multimodal Communication with a Life-Like Character,", EUROSPEECH—Scandinavia, 7th European Conference on Speech Communication and Technology, 2001, 5 pages.

(56) References Cited

OTHER PUBLICATIONS

Waldinger et al., "Deductive Question Answering from Multiple Resources", New Directions in Question Answering, published by AAAI, Menlo Park, 2003, 22 pages.
Walker et al., "Natural Language Access to Medical Text", SRI International, Artificial Intelligence Center, Mar. 1981, 23 pages.
Waltz, D., "An English Language Question Answering System for a Large Relational Database", © 1978 ACM, vol. 21, No. 7, 1978, 14 pages.
Ward et al., "Recent Improvements in the CMU Spoken Language Understanding System", ARPA Human Language Technology Workshop, 1994, pp. 213-216.
Ward, Wayne, "The CMU Air Travel Information Service: Understanding Spontaneous Speech", Proceedings of the Workshop on Speech and Natural Language, HLT '90, 1990, pp. 127-129.
Warren, "An Efficient Easily Adaptable System for Interpreting Natural Language Queries", American Journal of Computational Linguistics, vol. 8, No. 3-4, Jul.-Dec. 1982, pp. 110-119.
Weizenbaum, Joseph, "ELIZA—A Computer Program for the Study of Natural Language Communication Between Man and Machine", Communications of the ACM, vol. 9, No. 1, Jan. 1966, pp. 36-45.
Werner et al., "Prosodic Aspects of Speech," Universite de Lausanne, Switzerland, 1994, Fundamentals of Speech Synthesis and Speech Recognition: Basic Concepts, State of the Art, and Future Challenges, 1994, pp. 23-40.
Winiwarter et al., "Adaptive Natural Language Interfaces to FAQ Knowledge Bases", Proceedings of 4th International Conference on Applications of Natural Language to Information Systems, Austria, Jun. 17-19, 1999, 22 pages.
Wolff, Mark, "Poststructuralism and the ARTFUL Database: Some Theoretical Considerations", Information Technology and Libraries, vol. 13, No. 1, Mar. 1994, 10 pages.
Wu et al., "KDA: A Knowledge-based Database Assistant", Data Engineering, Proceeding of the Fifth International Conference on Engineering (IEEE Cat No. 89CH2695-5), Feb. 6-10, 1989, pp. 402-409.
Wu, Min, "Digital Speech Processing and Coding", ENEE408G Capstone—Multimedia Signal Processing, Spring 2003, Lecture-2 Course Presentation, University of Maryland, College Park, 2003, pp. 1-8.
Wu, Min, "Speech Recognition, Synthesis, and H.C.I.", ENEE408G Capstone—Multimedia Signal Processing, Spring 2003, Lecture-3 course presentation, University of Maryland, College Park, 2003, pp. 1-11.
Wyle, M. F., "A Wide Area Network Information Filter", In Proceedings of First International Conference on Artificial Intelligence on Wall Street, Oct. 9-11, 1991, pp. 10-15.
Yang et al., "Smart Sight: A Tourist Assistant System", Proceedings of Third International Symposium on Wearable Computers, 1999, 6 pages.
Yankelovich et al., "Intermedia: The Concept and the Construction of a Seamless Information Environment", IEEE Computer Magazine, Jan. 1988, pp. 81-96.
Yoon et al., "Letter-to-Sound Rules for Korean", Department of Linguistics, The Ohio State University, 2002, 4 pages.
Zeng et al., "Cooperative Intelligent Software Agents", The Robotics Institute, Carnegie-Mellon University, Mar. 1995,13 pages.
Zhao Leon., "Intelligent Agents for Flexible Workflow Systems", Proceedings of the Americas Conference on Information Systems (AMCIS), 1998, pp. 237-239.
Zhao, Y., "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.
Zovato et al., "Towards Emotional Speech Synthesis: A Rule based Approach", Proceedings 5th ISCA Speech Synthesis Workshop—Pittsburgh, 2004, pp. 219-220.
Zue et al., "From Interface to Content: Translingual Access and Delivery of On-Line Information", EUROSPEECH, 1997, 4 pages.
Zue et al., "Jupiter: A Telephone-Based Conversational Interface for Weather Information", IEEE Transactions on Speech and Audio Processing, Jan. 2000, pp. 100-112.
Zue et al., "Pegasus: A Spoken Dialogue Interface for On-Line Air Travel Planning", Elsevier, Speech Communication, vol. 15, 1994, 10 pages.
Zue et al., "The Voyager Speech Understanding System: Preliminary Development and Evaluation", Proceedings of IEEE 1990 International Conference on Acoustics, Speech, and Signal Processing, 1990, pp. 73-76.
Zue, Victor, "Conversational Interfaces: Advances and Challenges", Spoken Language System Group <http://www.cs.cmu.edu/-dod/papers/zue97.pdf>, Sep. 1997, 10 pages.
Zue, Victor W., "Toward Systems that Understand Spoken Language", ARPA Strategic Computing Institute, Feb. 1994, pp. 51-59.
Bahl et al., "Multonic Markov Word Models for Large Vocabulary Continuous Speech Recognition", IEEE Transactions on Speech and Audio Processing, vol. 1, No. 3, Jul. 1993, 11 pages.
Bahl et al., "Speech Recognition with Continuous-Parameter Hidden Markov Models", In Proceeding of International Conference on Acoustics, Speech, and Signal Processing (ICASSP'88), vol. 1, Apr. 11-14, 1988, 8 pages.
Banbrook, M., "Nonlinear Analysis of Speech from a Synthesis Perspective", A Thesis Submitted for the Degree of Doctor of Philosophy, The University of Edinburgh, Oct. 15, 1996, 35 pages.
Bear et al., "A System for Labeling Self-Repairs in Speech", SRI International, Technical Note 522, Feb. 22, 1993, pp. 1-8.
Bear et al., "Detection and Correction of Repairs in Human-Computer Dialog", SRI International, Technical Note 518, May 5, 1992, pp. 1-10.
Bear et al., "Integrating Multiple Knowledge Sources for Detection and Correction of Repairs in Human-Computer Dialog", Proceedings of the 30th annual meeting on Association for Computational Linguistics (ACL), 1992, 8 pages.
Bear et al., "Using Information Extraction to Improve Document Retrieval", SRI International, Jan. 9, 1998, pp. 1-11.
Belaid et al., "A Syntactic Approach for Handwritten Mathematical Formula Recognition", IEEE Transactions on Pattern Analysis and Machine Intelligence, vol. PAMI-6, No. 1, Jan. 1984, 7 pages.
Bellegarda et al., "A Latent Semantic Analysis Framework for Large-Span Language Modeling", 5th European Conference on Speech, Communication and Technology, (EUROSPEECH'97), Sep. 22-25, 1997, 4 pages.
Bellegarda et al., "A Multispan Language Modeling Framework for Large Vocabulary Speech Recognition", IEEE Transactions on Speech and Audio Processing vol. 6, No. 5, Sep. 1998, 12 pages.
Bellegarda et al., "A Novel Word Clustering Algorithm Based on Latent Semantic Analysis", In Proceedings of the IEEE International Conference on Acoustics, Speech, and Signal Processing (ICASSP'96}, vol. 1, 1996, 4 pages.
Bellegarda et al., "Experiments Using Data Augmentation for Speaker Adaptation", International Conference on Acoustics, Speech, and Signal Processing (ICASSP'95), May 9-12, 1995, 4 pages.
Bellegarda et al., "On-Line Handwriting Recognition Using Statistical Mixtures", Advances in Handwriting and Drawings: A Multi-disciplinary Approach, Europia, 6th International IGS Conference on Handwriting and Drawing, Paris-France, Jul. 1993, 11 pages.
Bellegarda et al., "Performance of the IBM Large Vocabulary Continuous Speech Recognition System on the ARPA Wall Street Journal Task", Signal Processing VII: Theories and Applications, © 1994 European Association for Signal Processing, 1994, 4 pages.
Bellegarda et al., "The Metamorphic Algorithm: A Speaker Mapping Approach to Data Augmentation", IEEE Transactions on Speech and Audio Processing, vol. 2, No. 3, Jul. 1994, 8 pages.
Bellegarda, J. R., "Exploiting Both Local and Global Constraints for Multi-Span Statistical Language Modeling", Proceeding of the 1998 IEEE International Conference on Acoustics, Speech, and Signal Processing (1CASSP'98), vol. 2, May 12-15, 1998, 5 pages.
Bellegarda, J. R., "Exploiting Latent Semantic Information in Statistical Language Modeling", Proceedings of the IEEE, vol. 88, No. 8, Aug. 2000, 18 pages.
Bellegarda, J. R., "Interaction-Driven Speech Input—A Data-Driven Approach to the Capture of Both Local and Global Language

(56) References Cited

OTHER PUBLICATIONS

Constraints", available online at <http:// old.sig.chi.ora/bulletin/1998.2/bellegarda.html>, 1992, 7 pages.
Bellegarda, J. R., "Large Vocabulary Speech Recognition with Multispan Statistical Language Models", IEEE Transactions on Speech and Audio Processing, vol. 8, No. 1, Jan. 2000, 9 pages.
Belvin et al., "Development of the HRL Route Navigation Dialogue System", In Proceedings of the First International Conference on Human Language Technology Research, Paper, 2001, 5 pages.
Berry et al., "PTIME: Personalized Assistance for Calendaring", ACM Transactions on Intelligent Systems and Technology, vol. 2, No. 4, Article 40, Jul. 2011, pp. 1-22.
Berry et al., "Task Management under Change and Uncertainty Constraint Solving Experience with the CALO Project", Proceedings of CP'05 Workshop on Constraint Solving under Change, 2005, 5 pages.
Black et al., "Automatically Clustering Similar Units for Unit Selection in Speech Synthesis", In Proceedings of Eurospeech 1997, vol. 2, 1997, 4 pages.
Blair et al., "An Evaluation of Retrieval Effectiveness for a Full-Text Document-Retrieval System", Communications of the ACM, vol. 28, No. 3, Mar. 1985, 11 pages.
Bobrow et al., "Knowledge Representation for Syntactic/Semantic Processing", AAA-80 Proceedings, 1980, pp. 316-323.
Bouchou et al., "Using Transducers in Natural Language Database Query", Proceedings of 4th International Conference on Applications of Natural Language to Information Systems, Austria, Jun. 17-19, 1999, 17 pages.
Bratt et al., "The SRI Telephone-based ATIS System", Proceedings of ARPA Workshop on Spoken Language Technology, 1995, 3 pages.
Briner, L. L., "Identifying Keywords in Text Data Processing", In Zelkowitz, Marvin V., ED, Directions and Challenges, 15th Annual Technical Symposium, Gaithersbury, Maryland, Jun. 17, 1976, 7 pages.
Bulyko et al., "Joint Prosody Prediction and Unit Selection for Concatenative Speech Synthesis", Electrical Engineering Department, University of Washington, Seattle, 2001, 4 pages.
Burke et al., "Question Answering from Frequently Asked Question Files", AI Magazine, Spring, vol. 18, No. 2, 1997, pp. 57-66.
Burns et al., "Development of a Web-Based Intelligent Agent for the Fashion Selection and Purchasing Process via Electronic Commerce", Proceedings of the Americas Conference on Information system (AMCIS), Dec. 31, 1998, pp. 140-142.
Bussey et al., "Service Architecture, Prototype Description, and Network Implications of a Personalized Information Grazing Service", INFOCOM'90, Ninth Annual Joint Conference of the IEEE Computer and Communication Societies, available online at <http://slrohall.com/oublications/>, Jun. 3-7, 1990, 8 pages.
Bussler et al., "Web Service Execution Environment (WSMX)", available online at <http://www.w3.org/Submission/WSMX/>, retrieved from Internet on Sep. 17, 2012, 29 pages.
Butcher, Mike, "EVI Arrives in Town to go Toe-to-Toe with Siri", TechCrunch, Jan. 23, 2012, 2 pages.
Buzo et al., "Speech Coding Based Upon Vector Quantization", IEEE Transactions on Acoustics, Speech, and Signal Processing, vol. Assp-28, No. 5, Oct. 1980, 13 pages.
Caminero-Gil et al., "Data-Driven Discourse Modeling for Semantic Interpretation", In Proceedings of the IEEE International Conference on Acoustics, Speech, and Signal Processing, May 7-10, 1996, 6 pages.
Carter et al., "The Speech-Language Interface in the Spoken Language Translator", SRI International, Nov. 23, 1994, pp. 1-9.
Carter, David M., "Lexical Acquisition in the Core Language Engine", Proceedings of the Fourth Conference of the European Chapter of the Association for Computational Linguistics, 1989, pp. 137-144.
Cawley, "The Application of Neural Networks to Phonetic Modelling", PhD Thesis, University of Essex, Mar. 1996, 13 pages.
Chai et al., "Comparative Evaluation of a Natural Language Dialog Based System and a Menu Driven System for Information Access: a Case Study", Proceedings of the International Conference on Multimedia Information Retrieval (RIAO), Apr. 2000, 11 pages.
Chang et al., "A Segment-based Speech Recognition System for Isolated Mandarin Syllables", Proceedings TEN CON '93, IEEE Region 10 conference on Computer, Communication, Control and Power Engineering, vol. 3, Oct. 19-21, 1993, pp. 317-320.
Chen, Yi, "Multimedia Siri Finds and Plays Whatever You Ask for", PSFK Report, Feb. 9, 2012, 9 pages.
Cheyer et al., "Demonstration Video of Multimodal Maps Using an Agent Architecture", available online at <http://www.youtube.com/watch?v=x3TptMGT9EQ&feature=youtu.be>, published on 1996, 6 pages.
Cheyer et al., "Demonstration Video of Multimodal Maps Using an Open-Agent Architecture", available online at <http://www.youtube.com/watch?v=JUxaKnyZyM&feature=youtu.be>, published on 1996, 6 pages.
Cheyer et al., "Multimodal Maps: An Agent-based Approach", International Conference on Cooperative Multimodal Communication, Jun. 9, 1995, pp. 1-15.
Cheyer et al., "Spoken Language and Multimodal Applications for Electronic Realties", Virtual Reality, vol. 3, 1999, pp. 1-15.
Cheyer et al., "The Open Agent Architecture,", Autonomous Agents and Multi-Agent systems, vol. 4, Mar. 1, 2001, 6 pages.
Cheyer et al., "The Open Agent Architecture: Building Communities of Distributed Software Agents", Artificial Intelligence Center SRI International, Power Point presentation, available online at <http://www.ai.sri.com/~oaa>, Feb. 21, 1998, 25 pages.
Cheyer, A., "Demonstration Video of Vanguard Mobile Portal", available online at <http://www.youtube.com/watch?v=ZTMsvg_0oLQ&feature=youtu.be>, published on 2004, 10 pages.
Cheyer, Adam, "A Perspective on AI & Agent Technologies for SCM", VerticaiNet presentation, 2001, 22 pages.
Lieberman et al., "Out of Context: Computer Systems that Adapt to, and Learn from, Context", IBM Systems Journal, vol. 39, No. 3&4, 2000, pp. 617-632.
Lin et al., "A Distributed Architecture for Cooperative Spoken Dialogue Agents with Coherent Dialogue State and History", <http://citeseerx.ist.psu.edu/viewdoc/summary?doi=1 0.1.1.42.272>, 1999, 4 pages.
Lin et al., "A New Framework for Recognition of Mandarin Syllables With Tones Using Sub-syllabic Units", IEEE International Conference on Acoustics, Speech, and Signal Processing (ICASSP-93), Apr. 27-30, 1993, pp. 227-230.
Linde, "An Algorithm for Vector Quantizer Design", IEEE Transactions on Communications, vol. 28, No. 1, Jan. 1980, pp. 84-95.
Liu et al., "Efficient Joint Compensation of Speech for the Effects of Additive Noise and Linear Filtering", IEEE International Conference of Acoustics, Speech, and Signal Processing,ICASSP-92, Mar. 23-26, 1992, pp. 257-260.
Lntraspect Software, "The Intraspect Knowledge Management Solution: Technical Overview", <http://tomgruber.org/writing/intraspect-whitepaper-1998.pdf>, 1998, 18 pages.
Logan et al., "Mel Frequency Cepstral Coefficients for Music Modeling", In International Symposium on Music Information Retrieval, 2000, 2 pages.
Lowegian International, "FIR Filter Properties", dspGuro, Digital Signal Processing Central, available online at <httJ;>://www.dspQuru.com/dso/taas/fir/orooerties, > retrived from internet on Jul. 28, 2010, 6 pages.
Lowerre, B. T., "The-HARPY Speech Recognition System", Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations", Revised Version of a Paper Presented at the Computational Phonology in Speech Technology workshop, 1996 annual meeting of the Association for Computational Linguistics in Santa Cruz, California, 7 pages.
Markel et al., "Linear Prediction of Speech", Springer-Verlag, Berlin Heidelberg New York, 1976, 12 pages.

(56) References Cited

OTHER PUBLICATIONS

Martin et al., "The Open Agent Architecture: A Framework for Building Distributed Software Systems", Applied Artificial Intelligence: An International Journal, vol. 13, No. 1-2, pp. 1-38.
Martin et al., "Building and Using Practical Agent Applications", SRI International, PAAM Tutorial, 1998, pp. 1-26.
Martin et al., "Building Distributed Software Systems with the Open Agent Architecture", Proceedings of the Third International Conference on the Practical Application of Intelligent Agents and Multi-Agent Technology, Mar. 23-25, 1998, pp. 355-376.
Martin et al., "Development Tools for the Open Agent Architecture", Proceedings of the International Conference on the Practical Application of Intelligent Agents and Multi-Agent Technology, Apr. 1996, pp. 1-17.
Martin et al., "Information Brokering in an Agent Architecture", Proceedings of the second International Conference on the Practical Application of Intelligent Agents and Multi-Agent Technology, Apr. 1997, pp. 1-20.
Martin et al., "Transportability and Generality in a Natural-Language Interface System", Proceedings of the Eight International Joint Conference on Artificial Intelligence, Technical Note 293, Aug. 8-12, 1983, 21 pages.
Matiasek et al., "Tamic-P: A System for NL Access to Social Insurance Database", 4th International Conference on Applications of Natural Language to Information Systems, Jun. 17-19, 1999, 7 pages.
McGuire et al., "SHADE: Technology for Knowledge-Based Collaborative Engineering", Journal of Concurrent Engineering~r Applications and Research (CERA), 1993, 18 pages.
Meng et al., "Wheels: A Conversational System in the Automobile Classified Domain", Proceedings Fourth International Conference on Spoken Language, 1996. ICSLP 96, Oct. 1996, pp. 542-545.
Michos et al., "Towards an Adaptive Natural Language Interface to Command Languages", Natural Language Engineering, vol. 2, No. 3, 1996, pp. 191-209.
Milstead et al., "Metadata: Cataloging by Any Other Name", Online, Information Today, Inc., Jan. 1999, 18 pages.
Milward et al., "D2.2: Dynamic MultimodalInterface Reconfiguration" Talk and Look: Tools for Ambient Linguistic Knowledge, IST-507802 Deliverable D2.2, Aug. 8, 2006, 69 pages.
Minker et al., "Hidden Understanding Models for Machine Translation", Proceedings of ETRW on Interactive Dialogue in Multi-Modal Systems, Jun. 1999, pp. 1-4.
Mitra et al., "A Graph-Oriented Model for Articulation of Ontology Interdependencies", Lecture Notes in Computer Science, vol. 1777, 2000, pp. 86-100.
Modi et al., "CMRadar: A Personal Assistant Agent for Calendar Management", AAAI, Intelligent Systems Demonstrations, 2004, pp. 1020-1021.
Moore et al., "Combining Linguistic and Statistical Knowledge Sources in Natural-Language Processing for ATIS", SRI International, ArtificialIntelliqence Center, 1995, 4 pages.
Moore et al., "SRI's Experience with the ATIS Evaluation", Proceedings of the workshop on Speech and Natural Language, Jun. 24-27, 1990, pp. 147-148.
Moore et al., "The Information Warefare Advisor: An Architecture for Interacting with Intelligent Agents Across the Web", Proceedings of Americas Conference on Information Systems (AMCIS), Dec. 31, 1998, pp. 186-188.
Moore, Robert C., "Handling Complex Queries in a Distributed Data Base", SRI International, Technical Note 170, Oct. 8, 1979, 38 pages.
Moore, Robert C., "Practical Natural-Language Processing by Computer", SRI International, Technical Note 251, Oct. 1981, 34 pages.
Moore, Robert C., "The Role of Logic in Knowledge Representation and Commonsense Reasoning", SRI International, Technical Note 264, Jun. 1982, 19 pages.
Moore, Robert C., "Using Natural-Language Knowledge Sources in Speech Recognition", SRI International, Artificial Intelligence Center, Jan. 1999, pp. 1-24.

Moran et al., "Intelligent Agent-based User Interfaces", Proceedings of International Workshop on Human Interface Technology, Oct. 12-13, 1995, pp. 1-4.
Moran et al., "Multimodal User Interfaces in the Open Agent Architecture", International Conference on Intelligent User Interfaces (IU197), 1997, 8 pages.
Moran, Douglas B., "Quantifier Scoping in the SRI Core Language Engine", Proceedings of the 26th Annual Meeting on Association for Computational Linguistics, 1988, pp. 33-40.
Morgan, B., "Business Objects (Business Objects for Windows) Business Objects Inc.", DBMS, vol. 5, No. 10, Sep. 1992, 3 pages.
Motro, Amihai, "Flex: A Tolerant and Cooperative User Interface to Databases", IEEE Transactions on Knowledge and Data Engineering, vol. 2, No. 2, Jun. 1990, pp. 231-246.
Mountford et al., "Talking and Listening to Computers", The Art of Human-Computer Interface Design, Copyright © 1990 Apple Computer, Inc. Addison-Wesley Publishing Company, Inc, 1990, 17 pages.
Mozer, Michael C., "An Intelligent Environment Must be Adaptive", IEEE Intelligent Systems, Mar./Apr. 1999, pp. 11-13.
Muhlhauser, Max, "Context Aware Voice User Interfaces for Workflow Support", 2007, 254 pages.
Murty, "Combining Evidence from Residual Phase and MFCC Features for Speaker Recognition", IEEE Signal Processing Letters, vol. 13, No. 1, Jan. 2006, pp. 52-55.
Murveit et al., "Integrating Natural Language Constraints into HMM-based Speech Recognition", 1990 International Conference on Acoustics, Speech, and Signal Processing, Apr. 3-6, 1990, 5 pages.
Murveit et al., "Speech Recognition in SRI's Resource Management and ATIS Systems", Proceedings of the Workshop on Speech and Natural Language, 1991, pp. 94-100.
Nakagawa et al., "Speaker Recognition by Combining MFCC and Phase Information", IEEE International Conference on Acoustics Speech and Signal Processing ICASSP, Mar. 14-19, 2010, pp. 4502-4505.
Naone, Erica, "TR10: Intelligent Software Assistant", Technology Review, Mar.-Apr. 2009, 2 pages.
Neches et al., "Enabling Technology for Knowledge Sharing", Fall, 1991, pp. 37-56.
Niesler et al., "A Variable-Length Category-Based N-Gram Language Model", IEEE International Conference on Acoustics, Speech, and Signal Processing (ICASSP'96), vol. 1, May 7-10, 1996, pp. 164-167.
Noth et al., "Verbmobil: The Use of Prosody in the Linguistic Components of a Speech Understanding System", IEEE Transactions on Speech and Audio Processing, vol. 8, No. 5, Sep. 2000, pp. 519-532.
Odubiyi et al., "SAIRE—A Scalable Agent-Based Information Retrieval Engine", Proceedings of the First International Conference on Autonomous Agents, 1997, 12 pages.
Grosz et al., "Research on Natural-Language Processing at SRI", SRI International Technical Note 257, Nov. 1981, 21 pages.
Grosz et al., "TEAM: An Experiment in the Design of Transportable Natural-Language Interfaces", Artificial Intelligence, vol. 32, 1987, pp. 173-243.
Grosz, Barbara J., "Team: A Transportable Natural-Language Interface System", Proceedings of the First Conference on Applied Natural Language Processing, 1983, pp. 39-45.
Gruber et al., "An Ontology for Engineering Mathematics", Fourth International Conference on Principles of Knowledge Representation and Reasoning, Available at <http://www-ksl.stanford.edu/knowledge-sharing/papers/engmath.html>, 1994, pp. 1-22.
Gruber et al., "Generative Design Rationale: Beyond the Record and Replay Paradigm", Knowledge Systems Laboratory, Technical Report KSL 92-59, Dec. 1991, Updated Feb. 1993, 24 pages.
Gruber et al., "Machine-Generated Explanations of Engineering Models: A Compositional Modeling Approach", In Proc. International Joint Conference on Artificial Intelligence, 1993, 7 pages.
Gruber et al., "NIKE: A National Infrastructure for Knowledge Exchange", A Whitepaper Advocating and ATP Initiative on Technologies for Lifelong Learning, Oct. 1994, pp. 1-10.

(56) References Cited

OTHER PUBLICATIONS

Gruber et al., "Toward a Knowledge Medium for Collaborative Product Development", Proceedings of the Second International Conference on Artificial Intelligence in Design, Jun. 22-25, 1992, pp. 1-19.
Gruber et al., "A Translation Approach to Portable Ontology Specifications", Knowledge Systems Laboratory, Technical Report KSL 92-71, Sep. 1992, Revised Apr. 1993, 27 pages.
Gruber, Thomas R., "Automated Knowledge Acquisition for Strategic Knowledge", Machine Learning, vol. 4, 1989, pp. 293-336.
Gruber, Thomas R., Interactive Acquisition of Justifications: Learning "Why" by Being Told "What", Knowledge Systems Laboratory, Technical Report KSL 91-17, Original Oct. 1990, Revised Feb. 1991, pp. 1-23.
Gruber, Thomas R., "Toward Principles for the Design of Ontologies Used for Knowledge Sharing", In International Journal Human-Computer Studies, vol. 43, p. 907-928, substantial revision of paper presented at the International Workshop on Formal Ontology, Available as Technical Report KSL 93-04, Knowledge Systems Laboratory, revised Aug. 23, 1993, 23 pages.
Gruber, Tom, "(Avoiding) the Travesty of the Commons", Presentation at NPUC, New Paradigms for User Computing, IBM Almaden Research Center, Jul. 24, 2006, 52 pages.
Gruber, Tom, "2021: Mass Collaboration and the Really New Economy", TNTY Futures, vol. 1, No. 6, Available Online at <http://tomgruber.org/writing/tnty2001.htm>, Aug. 2001, 5 pages.
Gruber, Tom, "Big Think Small Screen: How Semantic Computing in the Cloud will Revolutionize the Consumer Experience on the Phone", Keynote presentation at Web 3.0 conference, 2009, 41 pages.
Gruber, Tom, "Collaborating around Shared Content on the WWW", W3C Workshop on WWW and Collaboration, Available at <http://www.w3.org/Collaboration/Workshop/Proceedings/P9.html>, Sep. 11, 1995, 1 page.
Gruber, Tom, "Collective Knowledge Systems: Where the Social Web meets the Semantic Web", Web Semantics: Science, Services and Agents on the World Wide Web, 2007, pp. 1-19.
Gruber, Tom, "Despite our Best Efforts, Ontologies are not the Problem", AAAI Spring Symposium, Available at <http://tomgruber.org/writing/aaai-ss08.htm>, 2008, pp. 1-40.
Gruber, Tom, "Enterprise Collaboration Management with Intraspect", Intraspect Technical White Paper, Jul. 2001, pp. 1-24.
Gruber, Tom, "Every Ontology is a Treaty—A Social Agreement—Among People with Some Common Motive in Sharing", Official Quarterly Bulletin of AIS Special Interest Group on Semantic Web and Information Systems, vol. 1, No. 3, 2004, pp. 1-5.
Gruber, Tom, "Helping Organizations Collaborate, Communicate, and Learn", Presentation to NASA Ames Research, intraspect, available at <http://tomgruber.org/writing/organizational-intelligence-talk.htm>, Mar.-Oct. 2003, 30 pages.
Gruber, Tom, "Intelligence at the Interface: Semantic Technology and the Consumer Internet Experience", Presentation at Semantic Technologies Conference, Available at <http://tomgruber.org/writing/semtech08.htm>, 2008, pp. 1-40.
Gruber, Tom, "It Is What It Does: The Pragmatics of Ontology for Knowledge Sharing", Proceedings of the International CIDOC CRM Symposium, Available at <http://tomgruber.org/writing/cidoc-ontology.htm>, Mar. 26, 2003, 21 pages.
Gruber, Tom, "Ontologies, Web 2.0 and Beyond", Ontology Summit, available at <http://tomgruber.org/writing/ontolog-social-web-keynote.htm>, Apr. 24, 2007, 17 pages.
Gruber, Tom, "Ontology of Folksonomy: A Mash-up of Apples and Oranges", Int'l Journal on Semantic Web & Information Systems, vol. 3, No. 2, 2007, 7 pages.
Gruber, Tom, "Siri, a Virtual Personal Assistant—Bringing Intelligence to the Interface", Semantic Technologies conference, Jun. 16, 2009, 21 pages.
Gruber, Tom, "TagOntology", Presentation to Tag Camp, Oct. 29, 2005, 20 pages.
Gruber, Tom, "Where the Social Web meets the Semantic Web", Presentation at the 5th International Semantic Web Conference, Nov. 7, 2006, 38 pages.
Guida et al., "NLI: A Robust Interface for Natural Language Person-Machine Communication", Int. J. Man-Machine Studies, vol. 17, 1982, pp. 417-433.
Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.
Guzzoni et al., "Active, A Platform for Building Intelligent Operating Rooms", Surgetica 2007 Computer-Aided Medical Interventions: tools and Applications, Paris, 2007, Sauramps Medical, http://lsro.epfl.ch/page-68384-en.html,, 2007, 8 pages.
Guzzoni et al., "Active, A Platform for Building Intelligent Software,", Computational Intelligence, available online at <http://www.informatik.uni-trier.del-ley/pers/hd/g/Guzzoni:Didier>, 2006, 5 pages.
Guzzoni et al., "Active, A Tool for Building Intelligent User Interfaces", ASC 2007, Palma de Mallorca, <http://lsro.epfl.ch/page-34241.html>, 2007, 6 pages.
Guzzoni et al., "Many Robots Make Short Work", AAAI Robot Contest, SRI International, 1996, pp. 1-9.
Guzzoni et al., "Modeling Human-Agent Interaction with Active Ontologies", AAAI Spring Symposium, Interaction Challenges for Intelligent Assistants, Stanford University, Palo Alto, California, 2007, 8 pages.
Guzzoni, D., "Active: A unified platform for building intelligent assistant applications", Oct. 25, 2007, 262 pages.
Haas et al., "An Approach to Acquiring and Applying Knowledge", SRI international Technical Note 227, Nov. 1980, 22 pages.
Hadidi et al., "Students' Acceptance of Web-Based Course Offerings: An Empirical Assessment", Proceedings of the Americas Conference on Information Systems (AMCIS), 1998, 4 pages.
Hardwar, Devemder, "Driving App Waze Builds its own Siri for Hands-Free Voice Control", retrieved from internet on Feb. 9, 2012 <http://ventu rebeat. com/20 12/0 2/09/ driving-a pp-waze-bu i lds-its-own-siri-for -hands-freevoice-control/>, 4 pages.
Harris, F. J., "On the Use of Windows for Harmonic Analysis with the Discrete Fourier Transform", In Proceedings of the IEEE, vol. 66, No. 1, Jan. 1978, 34 pages.
Hawkins et al., "Hierarchical Temporal Memory: Concepts, Theory, and Terminology", Numenta, Inc., Mar. 27, 2007, pp. 1-20.
He et al., "Personal Security Agent: KQML-Based PKI", The Robotics Institute, Carnegie-Mellon University, paper, 1997, pp. 1-14.
Helm et al., "Building Visual Language Parsers", In Proceedings of CHI'91 Proceedings of the SIGCHI Conference on Human Factors in Computing Systems, 1991, pp. 105-112.
Hendrix et al., "Developing a Natural Language Interface to Complex Data", ACM Transactions on Database Systems, vol. 3, No. 2, Jun. 1978, pp. 105-147.
Hendrix et al., "Transportable Natural-Language Interfaces to Databases", SRI International, Technical Note 228, Apr. 30, 1981, 18 pages.
Hendrix et al., "Human Engineering for Applied Natural Language Processing", SRI International, Technical Note 139, Feb. 1977, 27 pages.
Hendrix, Gary G., "Klaus: A System for Managing Information and Computational Resources", SRI International, Technical Note 230, Oct. 1980, 34 pages.
Hendrix, Gary G., "Lifer: A Natural Language Interface Facility", SRI Stanford Research Institute, Technical Note 135, Dec. 1976, 9 pages.
Hendrix, Gary G., "Natural-Language Interface", American Journal of Computational Linguistics, vol. 8, No. 2, Apr.-Jun. 1982, pp. 56-61.
Hendrix, Gary G., "The Lifer Manual: A Guide to Building Practical Natural Language Interfaces", SRI International, Technical Note 138, Feb. 1977, 76 pages.
Cheyer, Adam, "About Adam Cheyer", available online at <http://www.adam.cheyer.com/about.html>, retrieved from Internet on Sep. 17, 2012, 2 pages.

(56) References Cited

OTHER PUBLICATIONS

Codd, E. F., "Databases: Improving Usability and Responsiveness—How About Recently", 1978, pp. 3-28.
Cohen et al., "An Open Agent Architecture", SRI International, 1994, pp. 1-8.
Coles et al., "Chemistry Question-Answering", Technical Note 9, Jun. 1969, 15 pages.
Coles et al., "Techniques for Information Retrieval Using an Inferential Question-Answering System with Natural Language Input", Technical Note74, Nov. 1972, 198 Pages.
Coles Stephen L., "The Application of Theorem Proving to Information Retrieval", Technical Note 51, Jan. 1971, 21 pages.
Conklin, "Hypertext: An Introduction and Survey", Computer Magazine, Sep. 1987, 25 pages.
Connolly et al., "Fast Algorithms for Complex Matrix Multiplication Using Surrogates", IEEE Transactions on Acoustics, Speech, and Signal Processing, vol. 37, No. 6, Jun. 1989, 13 pages.
Constantinides et al., "A Schema Based Approach to Dialog Control", Proceedings of the International Conference on Spoken Language Processing, 1998, 4 pages.
Cox et al., "Speech and Language Processing for Next-Millennium Communications Services", Proceedings of the IEEE, vol. 88, No. 8, Aug. 2000, pp. 1314-1337.
Craig et al., "Deacon: Direct English Access and Control", AFIPS Conference Proceedings, vol. 29, Nov. 7-10, 1966, pp. 365-380.
Cutkosky et al., "PACT: An Experiment in Integrating Concurrent Engineering Systems", Jan. 1993, pp. 1-13.
Dar et al., "DTL's DataSpot: Database Exploration Using Plain Language", Proceedings of the 24th VLDB Conference, 1998, pp. 645-649.
Davis et al., "A Personal Handheld Multi-Modal Shopping Assistant", IEEE, 2006, 9 pages.
Decker et al., "Designing Behaviors for Information Agents", Jul. 6, 1996, pp. 1-15.
Decker et al., "Matchmaking and Brokering", May 16, 1996, pp. 1-19.
Deerwester et al., "Indexing by Latent Semantic Analysis", Journal of the American Society for Information Science, vol. 41, No. 6, Sep. 1990, 19 pages.
Deller, Jr., et al., "Discrete-Time Processing of Speech Signals", May 13, 1993, pp. 114-137.
Digital Equipment Corporation, "Open VMS Software Overview", Dec. 1995, 159 pages.
Domingue et al., "Web Service Modeling Ontology (WSMO)—An Ontology for Semantic Web Services", Position paper at the W3C Workshop on Frameworks for Semantics in Web Services, Jun. 9-10, 2005, 6 pages.
Donovan, Robert E., "A New Distance Measure for Costing Spectral Discontinuities in Concatenative Speech Synthesisers", 2001, 4 pages.
Dowding et al., "Gemini: A Natural Language System for Spoken-Language Understanding", Proceedings of the Thirty-First Annual Meeting of the Association for Computational Linguistics, 1993, 8 pages.
Dowding et al., "Interleaving Syntax and Semantics in an Efficient Bottom-Up Parser", Proceedings of the 32nd Annual Meeting of the Association for Computational Linguistics, 1994, 7 pages.
Elio et al., "On Abstract Task Models and Conversation Policies", 1999, pp. 1-10.
Epstein et al., "Natural Language Access to a Melanoma Data Base", Technical Note 171, Sep. 1978, 7 pages.
Ericsson et al., "Software Illustrating a Unified Approach to Multimodality and Multilinguality in the in-home Domain", Talk and Look: Tools for Ambient Linguistic Knowledge, Dec. 22, 2006, 127 pages.
Evi, "Meet Evi: The One Mobile App that Provides Solutions for Your Everyday Problems", avialable online at <http://www.evi.com/>, retrieved on Feb. 8, 2012, 3 pages.
Grosz et al., "Dialogic: A Core Natural-Language Processing System", SRI International, Nov. 9, 1982, 17 pages.

Exhibit, 1, "Natural Language Interface Using Constrained Intermediate Dictionary of Results", List of Publications Manually reviewed for the Search of U.S. Pat. No. 7,177,798, Mar. 22, 2013, 1 page.
Feigenbaum et al., "Computer-assisted Semantic Annotation of Scientific Life Works", Oct. 15, 2007, 22 pages.
Ferguson et al., "TRIPS: An Integrated Intelligent Problem-Solving Assistant", Proceedings of the Fifteenth National Conference on Artificial Intelligence (AAAI-98) and Tenth Conference on Innovative Applications of Artificial Intelligence (IAAI-98), 1998, 7 pages.
Fikes et al., "A Network-based knowledge Representation and its Natural Deduction System", SRI International, Jul. 1977, 43 pages.
Frisse, M. E., "Searching for Information in a Hypertext Medical Handbook", Communications of the ACM, vol. 31, No. 7, Jul. 1988, 8 pages.
Gamback et al., "The Swedish Core Language Engine", NOTEX Conference, 1992, 17 pages.
Gannes, Liz, "Alfred App Gives Personalized Restaurant Recommendations", AllThingsD, Jul. 18, 2011, pp. 1-3.
Gautier et al., "Generating Explanations of Device Behavior Using Compositional Modeling and Causal Ordering", CiteSeerx, 1993, pp. 89-97.
Gervasio et al., "Active Preference Learning for Personalized Calendar Scheduling Assistancae", CiteSeerx, In Proc. of IUI'05, Jan. 9-12, 2005, pp. 90-97.
Glass et al., "Multilingual Language Generation Across Multiple Domains", International Conference on Spoken Language Processing, Japan, Sep. 18-22, 1994, 5 pages.
Glass et al., "Multilingual Spoken-Language Understanding in the Mit Voyager System", <http://groups.csail.mit.edu/sls/publications/1995/speechcomm95-voyager.pdf>, Aug. 1995, 29 pages.
Glass, Alyssa, "Explaining Preference Learning", CiteSeerx, 2006, pp. 1-5.
Goddeau et al., "A Form-Based Dialogue Manager for Spoken Language Applications", http://phasedance.com/pdf!icslp96.pdf, Oct. 1996, 4 pages.
Goddeau et al., "Galaxy: A Human-Language Interface to On-Line Travel Information", International Conference on Spoken Language Processing 1994, Yokohama, 1994, pp. 707-710.
Goldberg et al., "Using Collaborative Filtering to Weave an Information Tapestry", Communications of the ACM, vol. 35, No. 12, Dec. 1992, 10 pages.
Gorin et al., "On Adaptive Acquisition of Language", International Conference on Acoustics, Speech, and Signal Processing (ICASSP'90), vol. 1, Apr. 3-6, 1990, 5 pages.
Gotoh et al., "Document Space Models Using Latent Semantic Analysis", In Proceedings of Eurospeech, 1997, 4 pages.
Gray, R. M., "Vector Quantization", IEEE ASSP Magazine, Apr. 1984, 26 pages.
Green, C., "The Application of Theorem Proving to Question-Answering Systems", SRI Stanford Research Institute, Artificial Intelligence Group, Jun. 1969, 169 pages.
Gregg et al., "DSS Access on the WWW: An Intelligent Agent Prototype", Proceedings of the Americas Conference on Information Systems-Association for Information Systems, 1998, 3 pages.
Grishman et al., "Computational Linguistics: An Introduction", © Cambridge University Press, 1986, 172 pages.
"Integrated Audio-Graphics User Interface", IBM Technical Disclosure Bulletin, vol. 33, No. 11, Apr. 1991, pp. 368-371.
"Interactive Voice", available online at <hitp://www.helloivee.com/company/> retrieved from internet on Feb. 10, 2014, 2 pages.
"Meet Ivee Your Wi-Fi Voice Activated Assistant", available online at <http://www.helloivee.com/> retrieved from internet on Feb. 10, 2014, 8 pages.
"Mel Scale", Wikipedia the Free Encyclopedia, last modified on Oct. 13, 2009 and retrieved on Jul. 28, 2010, available online <http://ermikipedia.org/wiki/Mel_scale>, 2 pages.
"Minimum Phase", Wikipedia the free Encyclopedia, Last Modified on Jan. 12, 2010 and retrieved on Jul. 28, 2010, available online at <http://en.wikipedia.org/wiki/Minimum_phase>, 8 pages.
"Speech Editor", IBM Technical Disclosure Bulletin, vol. 29, No. 10, Mar. 1987, pp. 4512-4514.

(56) References Cited

OTHER PUBLICATIONS

"Speech Recognition with Hidden Markov Models of Speech Waveforms", IBM Technical Disclosure Bulletin, vol. 34, No. 1, Jun. 1991, pp. 7-16.
Ex-Parte Quayle Action received for U.S. Appl. No. 12/244,713, dated Sep. 10, 2012, 5 pages.
Non Final Office Action received for U.S. Appl. No. 12/244,713, dated Dec. 23, 2011, 11 pages.
Bahl et al., "Large Vocabulary Natural Language Continuous Speech Recognition", In Proceedings of 1989 International Conference on Acoustics, Speech, and Signal Processing, vol. 1, May 23-26, 1989, 6 pages.
Notice of Allowance received for U.S. Appl. No. 12/244,713, dated Aug. 7, 2012, 7 pages.
Notice of Allowance received for U.S. Appl. No. 12/244,713, dated May 10, 2012, 5 pages.
Final Office Action received for U.S. Appl. No. 13/053,144, dated Nov. 19, 2013, 24 pages.
Non Final Office Action received for U.S. Appl. No. 13/053,144, dated Mar. 22, 2013, 18 pages.
Notice of Allowance received for U.S. Appl. No. 13/480,422, dated Jul. 19, 2012, 9 pages.
Supplemental Notice of Allowance received for U.S. Appl. No. 13/480,422, dated Sep. 27, 2012, 2 pages.
Notice of Allowance received for U.S. Appl. No. 13/604,556, dated Apr. 1, 2013, 9 pages.
Notice of Allowance received for U.S. Appl. No. 13/604,556, dated Jul. 31, 2013, 9 pages.
Acero et al., "Environmental Robustness in Automatic Speech Recognition", International Conference on Acoustics, Speech, and Signal Processing (ICASSP'90), Apr. 3-6, 1990, 4 pages.
Acero et al., "Robust Speech Recognition by Normalization of the Acoustic Space", International Conference on Acoustics, Speech, and Signal Processing, 1991, 4 pages.
Agnes et al., "Spoken Language Translator: First-Year Report", SICS Research Report, Jan. 1994, 161 pages.
Ahlborn et al., "Modeling Spectral Speech Transitions Using Temporal Decomposition Techniques", IEEE International Conference of Acoustics, Speech, and Signal Processing (ICASSP'87), vol. 12, Apr. 1987, 4 pages.
Aikawa et al., "Speech Recognition Using Time-Warping Neural Networks", Proceedings of the 1991 IEEE Workshop on Neural Networks for Signal Processing, Sep. 30 to Oct. 1, 1991, 10 pages.
Alfred App, available online at <http://www.alfredapp.com/>, retrieved on Feb. 8, 2012, 5 pages.
Allen, James, "Natural Language Understanding", 2nd Edition, 1995, 671 pages.
Alshawi et al., "CLARE: A Contextual Reasoning and Cooperative Response Framework for the Core Language Engine—Final Report", SRI International, available online at <http://www.cam.sri.com/tr/crc028/paper.ps.Z>, Dec. 1992, pp. 1-272.
Alshawi et al., "Declarative Derivation of Database Queries from Meaning Representations", Proceedings of the BANKAI Workshop, Oct. 1991, pp. 1-12.
Alshawi et al., "Logical Forms in the Core Language Engine", Proceedings of the 27th Annual Meeting of the Association for Computational Linguistics, 1989, pp. 25-32.
Alshawi et al., "Overview of the Core Language Engine", Proceedings of Future Generation Computing Systems, Sep. 1988, pp. 1-13.
Alshawi, Hiyan, "Translation and Monotonic Interpretation/Generation", SRI International, available online at <http://www.cam.sri.com/tr/crc024/paper.ps.Z>, Jul. 1992, pp. 1-18.
Ambite et al., "Design and Implementation of the CALO Query Manager", American Association for Artificial Intelligence, 2006, 8 pages.
Ambite et al., "Integration of Heterogeneous Knowledge Sources in the CALO Query Manager", The 4th International Conference on Ontologies, DataBases, and Applications of Semantics (ODBASE), 2005, 18 pages.
Anastasakos et al., "Duration Modeling in Large Vocabulary Speech Recognition", International Conference on Acoustics, Speech, and Signal Processing (ICASSP'95), May 9-12, 1995, 4 pages.
Anderson et al., "Syntax-Directed Recognition of Hand-Printed Two-Dimensional Mathematics", In Proceedings of Symposium on Interactive Systems for Experimental Applied Mathematics: Proceedings of the Association for Computing Machinery Inc. Symposium, 1967, 12 pages.
Anonymous, "Speaker Recognition", Wikipedia, The Free Enclyclopedia, Nov. 2, 2010, 3 pages.
Ansari et al., "Pitch Modification of Speech using a Low-Sensitivity Inverse Filter Approach", IEEE Signal Processing Letters, vol. 5, No. 3, Mar. 1998, 3 pages.
Anthony et al., "Supervised Adaption for Signature Verification System", IBM Technical Disclosure, Jun. 1, 1978, 3 pages.
Appelt et al., "Fastus: A Finite-state Processor for Information Extraction from Real-world Text", Proceedings of IJCAI, 1993, 8 pages.
Appelt et al., "SRI International Fastus System MUC-6 Test Results and Analysis", SRI International, 1995, 12 pages.
Appelt et al., "SRI: Description of the JV-FASTUS System Used for MUC-5", SRI International, 1993, pp. 1-19.
Apple Computer, "Guide Maker User's Guide", © Apple Computer, Inc., Apr. 27, 1994, 8 pages.
Apple Computer, "Introduction to Apple Guide", © Apple Computer, Inc., Apr. 28, 1994, 20 pages.
Apple Computer, "Knowledge Navigator", available online at <http://www.youtube.com/watch?v=QRH8eimU_20>, Uploaded on Apr. 29, 2008, 7 pages.
Archbold et al., "A Team User's Guide", SRI International, Technical Note 254, Dec. 21, 1981, 70 pages.
Asanovic et al., "Experimental Determination of Precision Requirements for Back-Propagation Training of Artificial Neural Networks", In Proceedings of the 2nd International Conference of Microelectronics for Neural Networks, 1991, www.ICSI.Berkelev.EDU, 1991, 7 pages.
Atal et al., "Efficient Coding of LPC Parameters by Temporal Decomposition", IEEE International Conference on Acoustics, Speech, and Signal Processing (ICASSP'83), Apr. 1983, 4 pages.
Bahl et al., "A Maximum Likelihood Approach to Continuous Speech Recognition", IEEE Transaction on Pattern Analysis and Machine Intelligence, vol. PAMI-5, No. 2, Mar. 1983, 13 pages.
Bahl et al., "A Tree-Based Statistical Language Model for Natural Language Speech Recognition", IEEE Transactions on Acoustics, Speech and Signal Processing, vol. 37, No., Jul. 1989, 8 pages.
Bahl et al., "Acoustic Markov Models Used in the Tangora Speech Recognition System", In Proceeding of International Conference on Acoustics, Speech, and Signal Processing (ICASSP'88), vol. 1, Apr. 11-14, 1988, 4 pages.
Bulyko et al., "Error-Correction Detection and Response Generation in a Spoken Dialogue System", Speech Communication, vol. 45, 2005, pp. 271-288.
Hermansky, H., "Perceptual Linear Predictive (PLP) Analysis of Speech", Journal of the Acoustical Society of America, vol. 87, No. 4, Apr. 1990, pp. 1738-1752.
Hermansky, H., "Recognition of Speech in Additive and Convolutional Noise Based on Rasta Spectral Processing", In proceedings of IEEE International Conference on Acoustics, speech and Signal Processing (ICASSP'93), Apr. 27-30, 1993, pp. II-83-II-86.
Hirschman et al., "Multi-Site Data Collection and Evaluation in Spoken Language Understanding", Proceedings of the workshop on Human Language Technology, 1993, pp. 19-24.
Hobbs et al., "Fastus: A System for Extracting Information from Natural-Language Text", SRI International, Technical Note 519, Nov. 19, 1992, 26 pages.
Hobbs et al., "Fastus: Extracting Information from Natural-Language Texts", SRI International, 1992, pp. 1-22.
Hobbs, Jerry R., "Sublanguage and Knowledge", SRI International, Technical Note 329, Jun. 1984, 30 pages.
Hodjat et al., "Iterative Statistical Language Model Generation for Use with an Agent-Oriented Natural Language Interface", Proceedings of HCI International, vol. 4, Jun. 22-27, 2003, pp. 1422-1426.

(56) References Cited

OTHER PUBLICATIONS

Hoehfeld et al., "Learning with Limited Numerical Precision Using the Cascade-Correlation Algorithm", IEEE Transactions on Neural Networks, vol. 3, No. 4, Jul. 1992, 18 pages.
Holmes, J. N., "Speech Synthesis and Recognition—Stochastic Models for Word Recognition", Published by Chapman & Hall, London, ISBN 0 412 534304, 1998, 7 pages.
Hon et al., "CMU Robust Vocabulary-Independent Speech Recognition System", IEEE International Conference on Acoustics, Speech, and Signal Processing (ICASSP-91), Apr. 14-17, 1991, pp. 889-892.
Huang et al., "The SPHINX-II Speech Recognition System: An Overview", Computer, Speech and Language, Jan. 15, 1992, pp. 1-12.
Issar et al., "CMU's Robust Spoken Language Understanding System", Proceedings of Eurospeech, 1993, 4 pages.
Issar, Sunil, "Estimation of Language Models for New Spoken Language Applications", Proceedings of 4th International Conference on Spoken language Processing, Oct. 3-6, 1996, 4 pages.
Jacobs et al., "Scisor: Extracting Information from On-Line News", Communications of the ACM, vol. 33, No. 11, Nov. 1990, pp. 88-97.
Janas, Jurgen M., "The Semantics-Based Natural Language Interface to Relational Databases", Chapter 6, Cooperative Interfaces to Information Systems, 1986, pp. 143-188.
Jelinek, F., "Self-Organized Language Modeling for Speech Recognition,", Readings in Speech Recognition, edited by Alex Waibel and Kai-Fu Lee, Morgan Kaufmann Publishers, Inc., ISBN: 1-55860-124-4, May 15, 1990, 63 pages.
Jennings et al., "A Personal News Service Based on a User Model Neural Network", IEICE Transactions on Information and Systems, vol. E75-D, No. 2, Tokyo, JP, Mar. 1992, pp. 198-209.
Ji et al., "A Method for Chinese Syllables Recognition based upon Sub-syllable Hidden Markov Model", 1994 International Symposium on Speech, Image Processing and Neural Networks, Hong Kong, Apr. 13-16, 1994, pp. 730-733.
Johnson, Julia A., "A Data Management Strategy for Transportable Natural Language Interfaces", Doctoral thesis submitted to the Department of Computer Science, University of British Columbia, Canada, Jun. 1989, 285 pages.
Jones, J., "Speech Recognition for Cyclone", Apple Computer, Inc., E.R.S.Revision 2.9, Sep. 10, 1992, 93 pages.
Julia et al., "http//www.speech.sri.com/demos/atis.html", Proceedings of AAAI, Spring Symposium, 1997, 5 pages.
Julia et al., "Un editeur interactif de tableaux dessines a main levee (An Interactive Editor for Hand-Sketched Tables)", Traitement du Signal, vol. 12, No. 6, 1995, pp. 619-626.
Kahn et al., "CoABS Grid Scalability Experiments", Autonomous Agents and Multi-Agent Systems, vol. 7, 2003, pp. 171-178.
Kamel et al., "A Graph Based Knowledge Retrieval System", IEEE International Conference on Systems, Man and Cybernetics, 1990, pp. 269-275.
Karp, P. D., "A Generic Knowledge-Base Access Protocol", <http://lecture.cs.buu.ac.th/-450353/Document/gfp.pdf>, May 12, 1994, 66 pages.
Kats et al., "Exploiting Lexical Regularities in Designing Natural Language Systems", In the Proceedings of the 12th International Conference on Computational Linguistics, 1988, pp. 1-22.
Katz et al., "REXTOR: A System for Generating Relations from Natural Language", In Proceedings of the ACL Workshop on Natural Language Processing and Information Retrieval (NLP&IR), Oct. 2000, 11 pages.
Katz, Boris, "A Three-Step Procedure for Language Generation", Massachusetts Institute of Technology, A.I. Memo No. 599, Dec. 1980, pp. 1-40.
Katz, Boris, "Annotating the World Wide Web Using Natural Language", In Proceedings of the 5th RIAO Conference on Computer Assisted Information Searching on the Internet, 1997, 7 pages.
Katz, Boris, "Using English for Indexing and Retrieving", Proceedings of the 1st RIAO Conference on User-Oriented Content-Based Text and Image Handling, 1988, pp. 314-332.
Katz, Slava. M., "Estimation of Probabilities from Sparse Data for the Language Model Component of a Speech Recognizer", IEEE Transactions on Acoustics, Speech, and Signal Processing, vol. ASSP-35, No. 3, Mar. 1987, 3 pages.
Kickstarter, "Ivee Sleek: Wi-Fi Voice-Activated Assistant", available online at <https://www.kickstarter.com/projects/ivee/ivee-sleek-wi-fi-voice-activated-assistant> retrived from internet on Feb. 10, 2014, 13 pages.
Kitano, H., "ϕDM-Dialog: An Experimental Speech-to-Speech Dialog Translation System", Computer, vol. 24, No. 6, Jun. 1991, 13 pages.
Klabbers et al., "Reducing Audible Spectral Discontinuities", IEEE Transactions on Speech and Audio Processing, vol. 9, No. 1, Jan. 2001, pp. 39-51.
Klatt Dennis H., "Linguistic Uses of Segmental Duration in English: Acoustic and Perpetual Evidence", Journal of the Acoustical Society of America, vol. 59, No. 5, May 1976, pp. 1208-1221.
Knownav, "Knowledge Navigator", YouTube Video available at <http://www.youtube.com/watch?v=QRH8eimU_20>, Apr. 29, 2008, 1 page.
Kominek et al., "Impact of Durational Outlier Removal from Unit Selection Catalogs", 5th ISCA Speech Synthesis Workshop, Jun. 14-16, 2004, 6 pages.
Konolige, Kurt, "A Framework for a Portable Natural-Language Interface to Large Data Bases", SRI International, Technical Note 197, Oct. 12, 1979, 54 pages.
Kubala et al., "Speaker Adaptation from a Speaker-Independent Training Corpus", International Conference on Acoustics, Speech, and Signal Processing (ICASSP'90), Apr. 3-6, 1990, 4 pages.
Kubala et al., "The Hub and Spoke Paradigm for CSR Evaluation", Proceedings of the Spoken Language Technology Workshop, Mar. 6-8, 1994, 9 pages.
Laird et al., "SOAR: An Architecture for General Intelligence", Artificial Intelligence, vol. 33, 1987, pp. 1-64.
Langly et al., "A Design for the ICARUS Architechture", SIGART Bulletin, vol. 2, No. 4, 1991, pp. 104-109.
Larks, "Intelligent Software Agents", Available Online at <http://www.cs.cmu.edu/~softagents/larks.html> retrieved on Mar. 15, 2013, 2006, 2 pages.
Lee et al., "A Real-Time Mandarin Dictation Machine for Chinese Language with Unlimited Texts and Very Large Vocabulary", International Conference on Acoustics, Speech and Signal Processing, vol. 1, Apr. 3-6, 1990, 5 pages.
Lee et al., "Golden Mandarin(II)—An Improved Single-Chip Real-Time Mandarin Dictation Machine for Chinese Language with Very Large Vocabulary", 0-7803-0946-4193 © 19931EEE, 1993, 4 pages.
Lee et al., "Golden Mandarin(II)—An Intelligent Mandarin Dictation Machine for Chinese Character Input with Adaptation/Learning Functions", International Symposium on Speech, Image Processing and Neural Networks, Hong Kong, Apr. 13-16, 1994, 5 pages.
Lee et al., "System Description of Golden Mandarin (I) Voice Input for Unlimited Chinese Characters", International Conference on Computer Processing of Chinese & Oriental Languages, vol. 5, Nos. 3 & 4, Nov. 1991, 16 pages.
Lee, K. F., "Large-Vocabulary Speaker-Independent Continuous Speech Recognition: The SPHINX System", Partial Fulfillment of the requirements for the degree of Doctor of Philosophy, Computer Science Department, Carnegie Mellon University, Apr. 18, 1988, 195 pages.
Lemon et al., "Multithreaded Context for Robust Conversational Interfaces: Context-Sensitive Speech Recognition and Interpretation of Corrective Fragments", ACM Transactions on Computer-Human Interaction, vol. 11, No. 3, Sep. 2004, pp. 241-267.
Leong et al., "CASIS: A Context-Aware Speech Interface System", Proceedings of the 10th International Conference on Intelligent user Interfaces, San Diego, California, Jan. 9-12, 2005, pp. 231-238.
International Preliminary Report on Patentability received for PCT Patent Application No. PCT/US2014/026873, dated Sep. 24, 2015, 9 pages.

(56) References Cited

OTHER PUBLICATIONS

International Search Report and Written Opinion received for PCT Patent Application No. PCT/US2014/026873, dated Jan. 5, 2015, 11 pages.

* cited by examiner

404

410

(A)

To determine whether a particular schedule item is relevant to the search request in time:
  identify a first time window associated with the search request and a second time window associated with the particular schedule item, and determine whether there is an overlap between the first time window and the second time window 412

To determine whether a particular schedule item is relevant to the search request in location:
  identify a first geographic area associated with the search request and a second geographic area associated with the particular schedule item, and determine whether there is an overlap between the first geographic area and the second geographic area 414

To determine whether a particular schedule item is relevant to the search request in associated people:
  identify a first group of people including all persons specified in the search request and a second group of people including all persons specified in the particular schedule item, and determine whether there is an overlap between the first group of people and the second group of people 416

To determine whether a particular schedule item is relevant to the search request in subject matter:
  identify a first domain associated with the search request and a second domain associated with the particular schedule item, and determine whether the first domain and the second domain are related domains 418

FIG. 4B

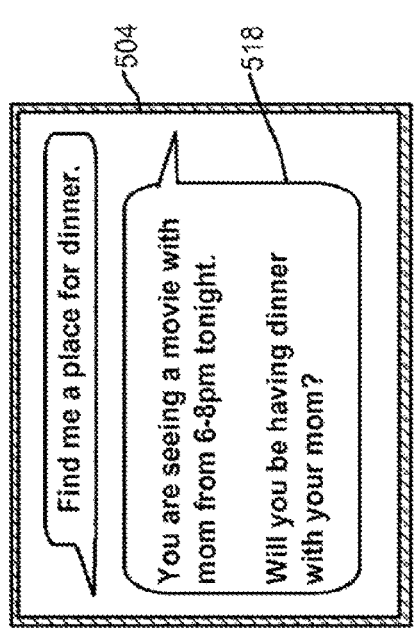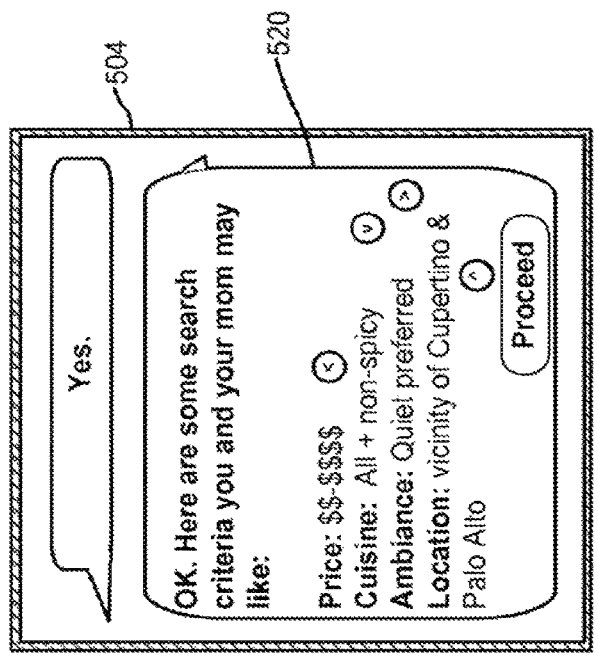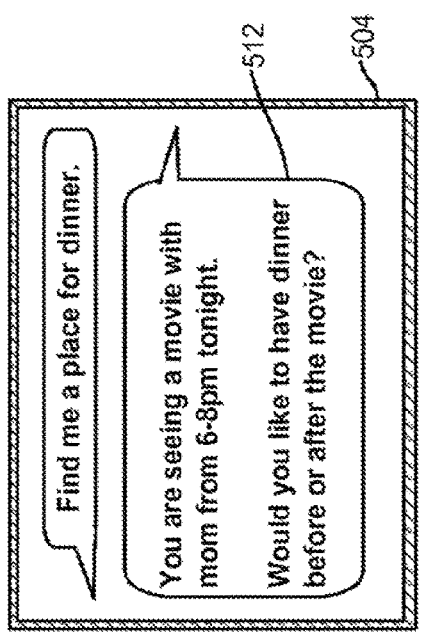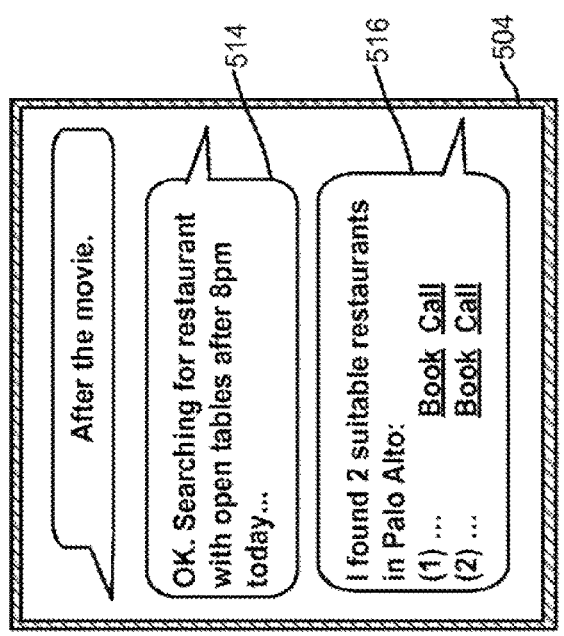

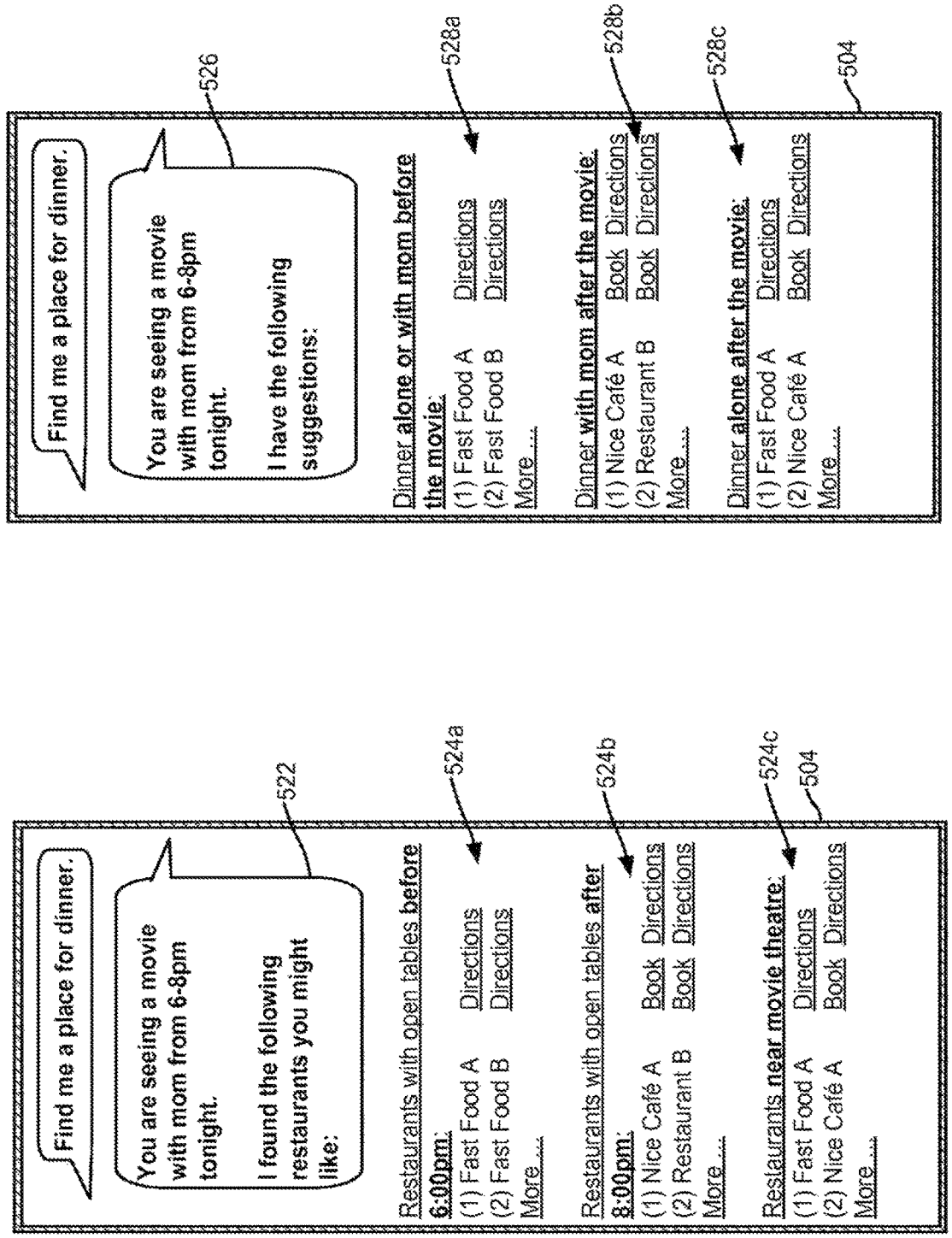

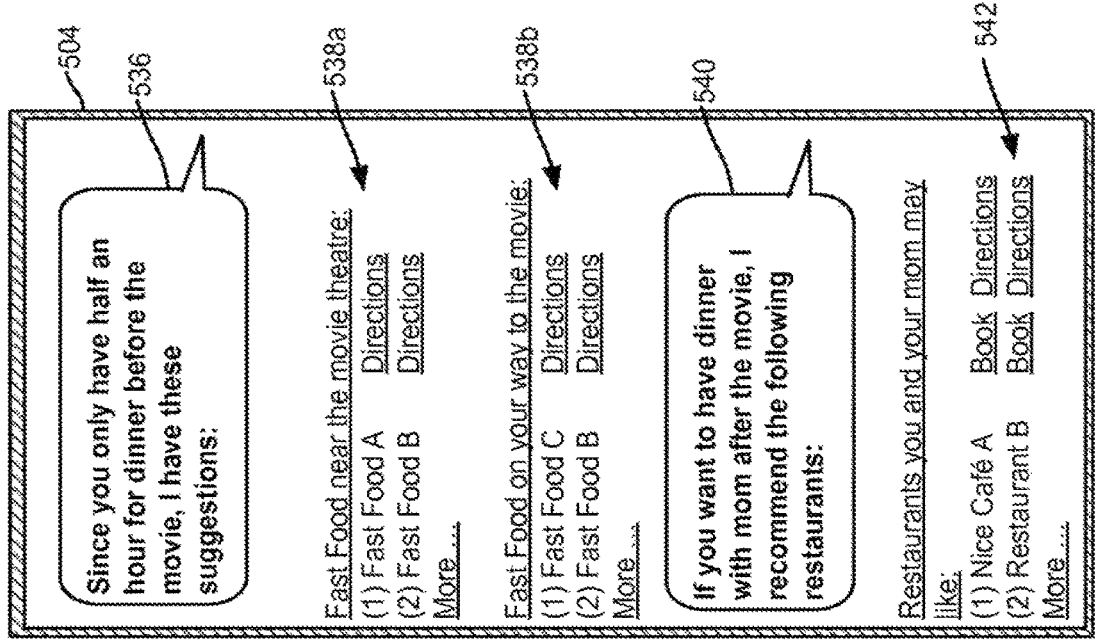
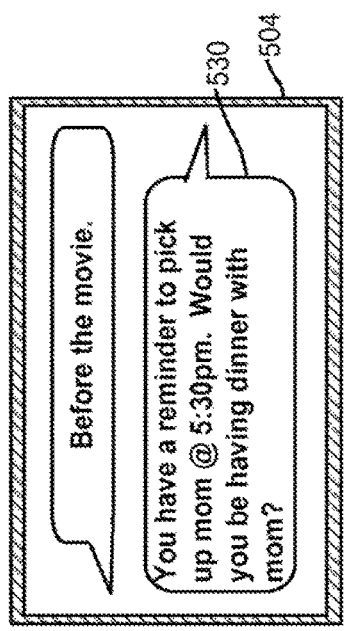
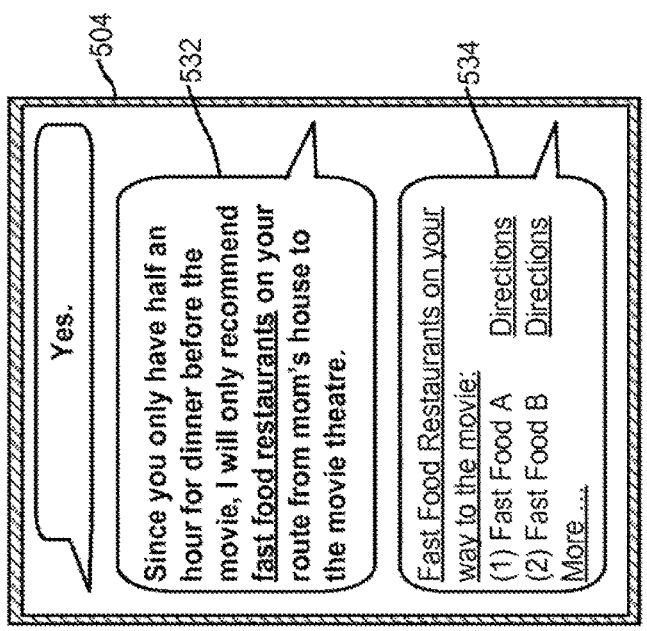

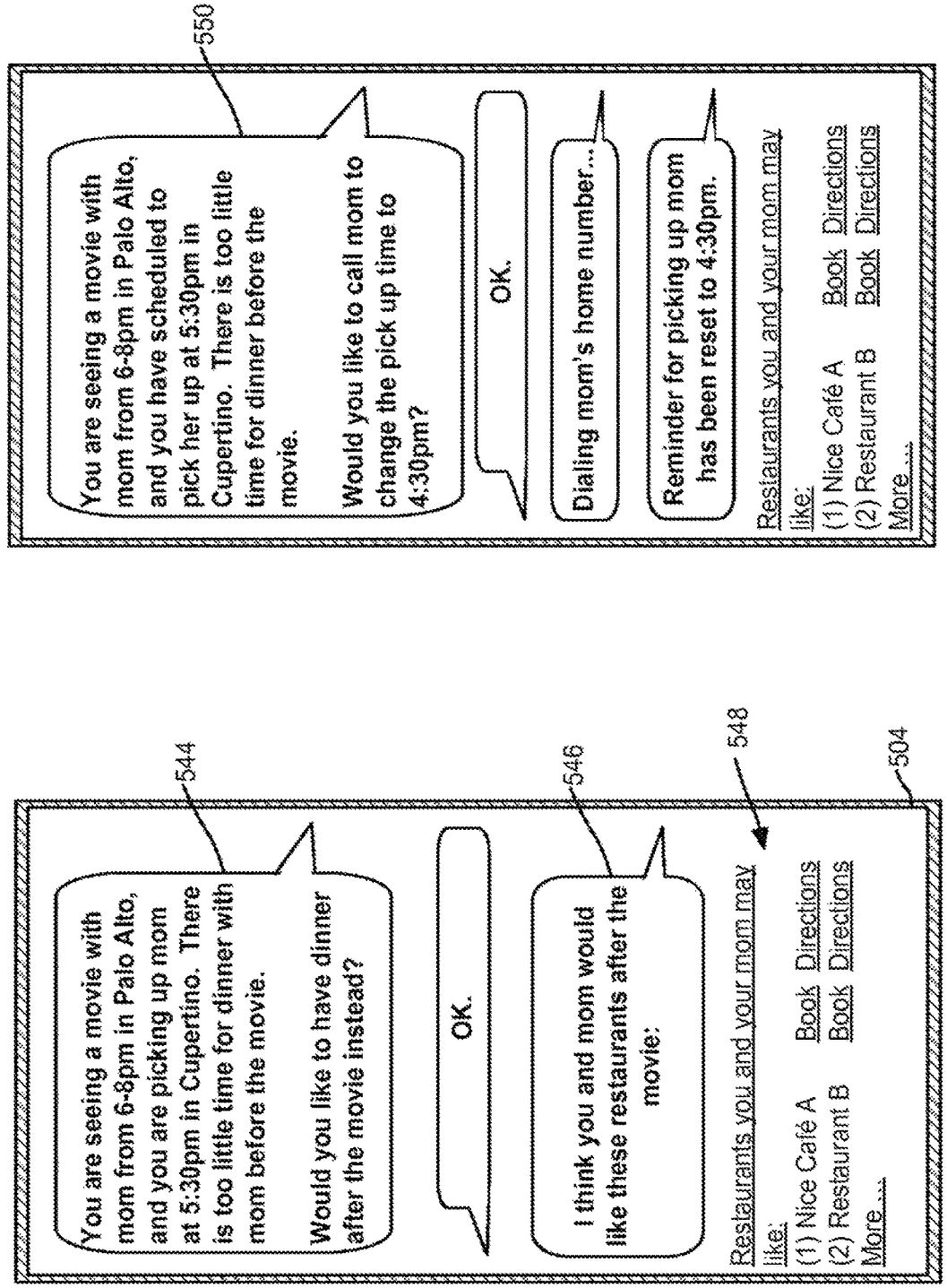

REFINING A SEARCH BASED ON SCHEDULE ITEMS

CROSS-REFERENCE TO RELATED APPLICATIONS

This application claims the benefit of U.S. Provisional Application No. 61/785,565, filed on Mar. 14, 2013, entitled REFINING A SEARCH BASED ON SCHEDULE ITEMS, which is hereby incorporated by reference in its entity for all purposes.

TECHNICAL FIELD

The disclosed embodiments relate generally to digital assistants, and more specifically to digital assistants that intelligently perform searches in one or more selection domains based on a user request.

BACKGROUND

Just like human personal assistants, digital assistants or virtual assistants can perform requested tasks and provide requested advice, information, or services. An assistant's ability to fulfill a user's request is dependent on the assistant's correct comprehension of the request or instruction. Recent advances in natural language processing have enabled users to interact with digital assistants using natural language, in spoken or textual forms, rather than employing a conventional user interface (e.g., menus or programmed commands). Such digital assistants can interpret the user's input to infer the user's intent; translate the inferred intent into actionable tasks and parameters; execute operations or deploy services to perform the tasks; and produce outputs that are intelligible to the user. Ideally, the outputs produced by a digital assistant should fulfill the user's intent expressed during the natural language interaction between the user and the digital assistant. A digital assistant can perform searches in a selection domain (e.g., a restaurant domain, etc.) and present qualifying selection items (e.g., restaurants) in response to a search request received from a user.

The ability of a digital assistant system to produce satisfactory responses to user requests depends on the natural language processing, knowledge base, and artificial intelligence implemented by the system. A well-designed response procedure can improve a user's experience in interacting with the system and promote the user's confidence in the system's services and capabilities.

SUMMARY

A conventional digital assistant system responds to a user's search request based on the search criteria provided in the user's direct input, and does not take into account of the user's schedule items that may be relevant to the search request. The embodiments disclosed herein provide methods, systems, computer readable storage medium and user interfaces for a digital assistant to intelligently identify schedule items relevant to a search request received from a user, and use additional information obtained from these relevant schedule items to further refine the search request received from the user. Various techniques for how to identify the relevant schedule items, and how to utilize the information in the identified schedule items can be used to improve the responsiveness and efficiency of the digital assistant, making the service provided by the digital assistant more user friendly, efficient, and intuitive.

Accordingly, some embodiments provide a method for operating a digital assistant, the method including, at a device including one or more processors and memory storing one or more programs: receiving a search request from a user, the search request specifying one or more search criteria for selecting one or more selection items from a respective selection domain; identifying one or more schedule items relevant to the search request; augmenting the search request based on information contained in at least one of the identified schedule items; and presenting the augmented search request or search results retrieved based on the augmented search request to the user.

In some embodiments, the relevant schedule items include one or more calendar items from a calendar associated with the user.

In some embodiments, the relevant schedule items further include one or more calendar items from a calendar that has been shared with the user by another user.

In some embodiments, the relevant schedule items further include one or more reminder items in the user's electronic schedule.

In some embodiments, the relevant schedule items further include or one or more to-dos in the user's electronic schedule.

In some embodiments, identifying the one or more schedule items relevant to the search request further includes: identifying one or more schedule items that are relevant to the search request in at least one of location, time, associated people, and subject matter.

In some embodiments, augmenting the search request based on the information contained in the at least one of the identified schedule items includes: establishing, based on the information contained in the at least one of the identified schedule items, a refinement on an existing criterion specified in the search request; and modifying the search request based on the refinement on the existing criterion.

In some embodiments, augmenting the search request based on the information contained in the at least one of the identified schedule items includes: establishing, based on the information contained in the at least one of the identified schedule items, a new search criterion that has not been specified in the search request; and modifying the search request to include the new search criterion.

In some embodiments, augmenting the search request based on the information contained in the at least one of the identified schedule items includes: establishing, based on the information contained in the at least one of the identified schedule items, a new preference order that has not been specified in the search request; and modifying the search request to include the new preference order.

In some embodiments, augmenting the search request further includes: adding a new time criterion or modifying an existing time criterion based on an event time associated with the at least one of the identified schedule items.

In some embodiments, adding the new time criterion or modifying the existing time criterion is further based on an event location associated with at least one of the identified schedule items.

In some embodiments, augmenting the search request further includes: adding a new location criterion or modifying an existing location criterion based on a respective location associated with at least one of the identified schedule items.

In some embodiments, adding the new location criterion or modifying the existing location criterion is further based on an event time associated with at least one of the identified schedule items.

In some embodiments, identifying the one or more schedule items relevant to the search request further includes: identifying a respective group of relevant schedule items, wherein each of the respective group of relevant schedule items is associated with a respective time window overlapping with a present time window of a given duration.

In some embodiments, identifying the respective group of relevant schedule items is performed in accordance with a determination that the search request includes neither any distant time criterion nor any distant location criterion.

In some embodiments, identifying the one or more schedule items relevant to the search request further includes: identifying an additional group of relevant schedule items, wherein each of the additional group of relevant schedule items is associated with (1) a respective time window that does not overlap with the present time window, and (2) a respective local geographic region that meets a location criterion specified in the search request.

In some embodiments, identifying the additional group of relevant schedule items is performed in accordance with a determination that the search request includes a local location criterion and does not include any time criterion.

In some embodiments, identifying the one or more schedule items relevant to the search request further includes: identifying an additional group of relevant schedule items, wherein each of the additional group of relevant schedule items is associated with (1) a respective time window that does not overlap with the present time window, and (2) a respective local geographic region that matches a current location of the user.

In some embodiments, identifying the one or more schedule items relevant to the search request further includes: identifying an additional group of relevant schedule items, wherein each of the additional group of relevant schedule items is associated with (1) a respective time window that does not overlap with the present time window, and (2) a respective group of attendees that overlaps with a group of relevant people specified by a respective person criterion in the search request.

In some embodiments, identifying the one or more schedule items relevant to the search request further includes: identifying an additional group of relevant schedule items, wherein each of the additional group of relevant schedule items is associated with (1) a respective time window that does not overlap with the present time window, and (2) a respective subject matter that relates to a relevant subject matter specified by a respective selection domain criterion in the search request.

In some embodiments, identifying the additional group of relevant schedule items is performed in accordance with a determination that the search request does not include any location or time criterion.

In some embodiments, identifying the one or more schedule items relevant to the search request further includes: identifying a respective group of relevant schedule items based on a respective distant time criterion specified in the search request, wherein each of the respective group of relevant schedule items is associated with a respective time window overlapping with a relevant time range specified by the respective distant time criterion.

In some embodiments, identifying the respective group of relevant schedule items is performed in accordance with a determination that the search request includes the respective distant time criterion and does not include any distant location criterion.

In some embodiments, identifying the one or more schedule items relevant to the search request further includes: identifying a respective group of relevant schedule items based on a respective distant location criterion specified in the search request, wherein each of the respective group of relevant schedule items is associated with a respective geographic location overlapping with a relevant geographic location specified by the respective distant location criterion.

In some embodiments, identifying the respective group of relevant schedule items is performed in accordance with a determination that the search request includes the respective distant location criterion and does not include any distant time criterion.

In some embodiments, identifying the one or more schedule items relevant to the search request further includes: identifying a respective group of relevant schedule items based on the respective distant time criterion and the respective distant location criterion of the search request, wherein each of the respective group of relevant schedule items is associated with (1) a respective time window overlapping with the relevant time range specified by the respective distant time criterion, and (2) a respective geographic location overlapping with the relevant geographic location specified by the respective distant location criterion.

In some embodiments, identifying the respective group of relevant schedule items is performed in accordance with a determination that the search request includes the respective distant time criterion and the respective distant location criterion.

In some embodiments, identifying the one or more schedule items relevant to the respective selection domain or the one or more selection criteria further includes: determining whether the one or more search criteria include any distant time criterion or any distant location criterion, wherein a distant time criterion specifies a relevant time range outside of a present time window of a given duration, and a distant location criterion specifies a relevant geographic region outside of a local geographic region of the user; and based on an outcome of the determination, selecting a respective set of rules for identifying an initial set of potentially relevant schedule items from which the one or more relevant schedule items are identified for the search request.

In some embodiments, at a device having one or more processors and memory, a method of operating a digital assistant includes: receiving an input (e.g., a speech input) from a user; processing the speech input to infer a respective user intent, the user intent being embodied in one or more search criteria for a search request; based on the search request, generating a constrained selection task for selecting one or more selection items from a respective selection domain based on the one or more search criteria; identifying one or more schedule items relevant to the search request based on the respective selection domain and the one or more search criteria; augmenting the search request based on information contained in at least one of the identified schedule items; and presenting the augmented search request or search results retrieved based on the augmented search request to the user.

In some embodiments, the method further implements features of any combination of the methods described above and in the remainder of this specification.

The above embodiments, and other embodiments described in this specification may help realize one or more of the following advantages. In some embodiments, user intent may be clarified during the interaction between the user and the digital assistant when the relevant schedule items are presented to the user. In some embodiments, scheduling conflicts may be identified for the user, such that the user can alter the search request or rearrange his or her schedule based on the information presented by the digital assistant. In some embodiments, the digital assistant identifies schedule items that may create some synergy (e.g., convenience, efficiency, etc.) when performed in conjunction with the action hind the intent of the search request, and making the user's actions more rewarding or more pleasant. In some embodiments, the particular manners in which the digital assistant identifies the relevant schedule items, presenting the relevant schedule items, and/or making suggestions based on the relevant schedule items are designed such that the interaction between the user and the digital assistant is smooth, efficient, and less cumbersome.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A-4B are a flow chart of an exemplary process for intelligently augmenting a search request based on relevant schedule items in accordance with some embodiments.

FIGS. 5A-5L are exemplary user interfaces and interactions illustrating a process for intelligently augmenting a search request based on relevant schedule items in accordance with some embodiments.

Like reference numerals refer to corresponding parts throughout the drawings.

DESCRIPTION OF EMBODIMENTS

Figure 1:
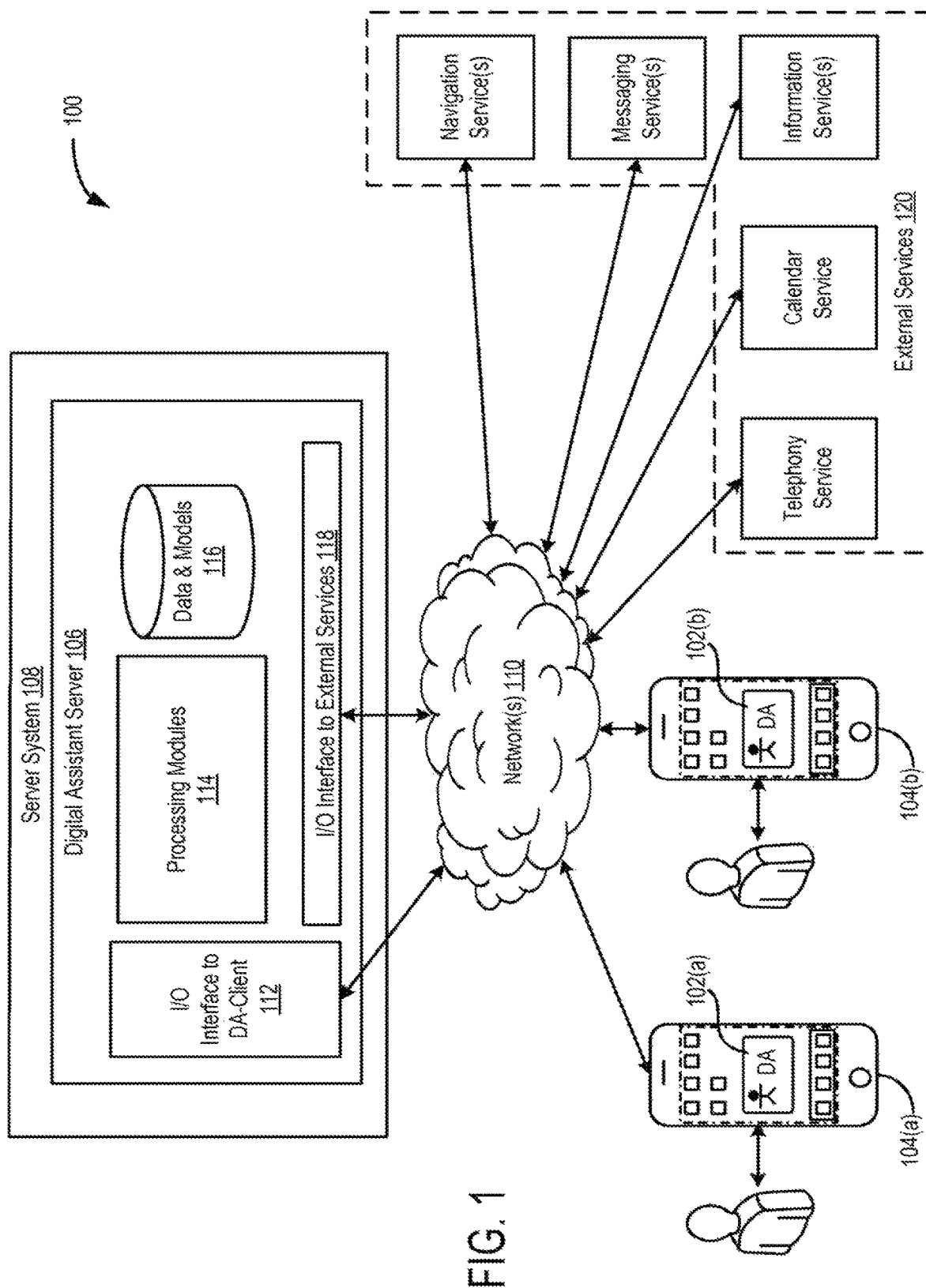
FIG. 1 is a block diagram illustrating an environment in which a digital assistant operates in accordance with some embodiments.

FIG. 1 is a block diagram of an operating environment 100 of a digital assistant according to some embodiments. The terms "digital assistant," "virtual assistant," "intelligent automated assistant," or "automatic digital assistant," refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g. speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request is either provision of the requested informational answer, performance of the requested task, or a combination of the two. For example, a user may ask the digital assistant a question, such as "Where am I right now?" Based on the user's current location, the digital assistant may answer, "You are in Central Park." The user may also request the performance of a task, for example, "Please remind me to call mom at 4 pm today." In response, the digital assistant may acknowledge the request and then creates an appropriate reminder item in the user's electronic schedule. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

An example of a digital assistant is described in Applicant's U.S. Utility application Ser. No. 12/987,982 for "Intelligent Automated Assistant," filed Jan. 10, 2011, the entire disclosure of which is incorporated herein by reference.

As shown in FIG. 1, in some embodiments, a digital assistant is implemented according to a client-server model. The digital assistant includes a client-side portion 102a, 102b (hereafter "DA client 102") executed on a user device 104a, 104b, and a server-side portion 106 (hereafter "DA server 106") executed on a server system 108. The DA client 102 communicates with the DA server 106 through one or more networks 110. The DA client 102 provides client-side functionalities such as user-facing input and output processing and communications with the DA-server 106. The DA server 106 provides server-side functionalities for any number of DA-clients 102 each residing on a respective user device 104.

In some embodiments, the DA server 106 includes a client-facing I/O interface 112, one or more processing modules 114, data and models 116, and an I/O interface to external services 118. The client-facing I/O interface facilitates the client-facing input and output processing for the digital assistant server 106. The one or more processing modules 114 utilize the data and models 116 to determine the user's intent based on natural language input and perform task execution based on inferred user intent. In some embodiments, the DA-server 106 communicates with external services 120 through the network(s) 110 for task completion or information acquisition. The I/O interface to external services 118 facilitates such communications.

Examples of the user device 104 include, but are not limited to, a handheld computer, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices. More details on the user device 104 are provided in reference to an exemplary user device 104 shown in FIG. 2.

Examples of the communication network(s) 110 include local area networks ("LAN") and wide area networks ("WAN"), e.g., the Internet. The communication network(s) 110 are, optionally, implemented using any known network protocol, including various wired or wireless protocols, such as e.g., Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The server system 108 is implemented on one or more standalone data processing apparatus or a distributed network of computers. In some embodiments, the server system 108 also employs various virtual devices and/or services of third party service providers (e.g., third-party cloud service providers) to provide the underlying computing resources and/or infrastructure resources of the server system 108.

Although the digital assistant shown in FIG. 1 includes both a client-side portion (e.g., the DA-client 102) and a server-side portion (e.g., the DA-server 106), in some embodiments, the functions of a digital assistant is implemented as a standalone application installed on a user device. In addition, the divisions of functionalities between the client and server portions of the digital assistant can vary in different embodiments. For example, in some embodiments, the DA client is a thin-client that provides only user-facing input and output processing functions, and delegates all other functionalities of the digital assistant to a backend server.

Figure 2:
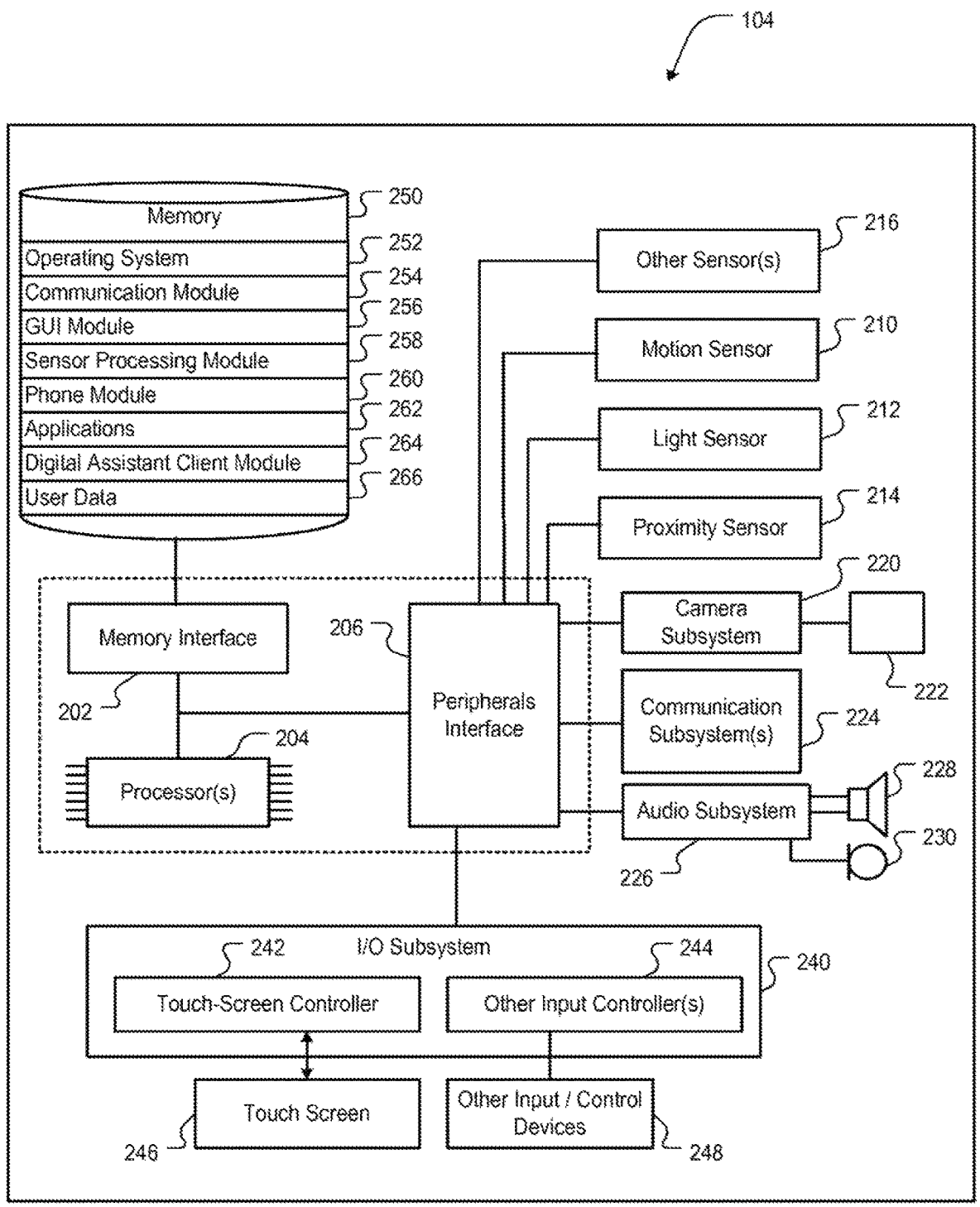
FIG. 2 is a block diagram illustrating a digital assistant client system in accordance with some embodiments.

FIG. 2 is a block diagram of a user-device 104 in accordance with some embodiments. The user device 104 includes a memory interface 202, one or more processors 204, and a peripherals interface 206. The various components in the user device 104 are coupled by one or more communication buses or signal lines. The user device 104 includes various sensors, subsystems, and peripheral devices that are coupled to the peripherals interface 206. The sensors, subsystems, and peripheral devices gather information and/or facilitate various functionalities of the user device 104.

For example, a motion sensor 210, a light sensor 212, and a proximity sensor 214 are coupled to the peripherals interface 206 to facilitate orientation, light, and proximity sensing functions. One or more other sensors 216, such as a positioning system (e.g., GPS receiver), a temperature sensor, a biometric sensor, a gyro, a compass, an accelerometer, and the like, are also connected to the peripherals interface 206, to facilitate related functionalities.

In some embodiments, a camera subsystem 220 and an optical sensor 222 are utilized to facilitate camera functions, such as taking photographs and recording video clips. Communication functions are facilitated through one or more wired and/or wireless communication subsystems 224, which can include various communication ports, radio frequency receivers and transmitters, and/or optical (e.g., infrared) receivers and transmitters. An audio subsystem 226 is coupled to speakers 228 and a microphone 230 to facilitate voice-enabled functions, such as voice recognition, voice replication, digital recording, and telephony functions.

In some embodiments, an I/O subsystem 240 is also coupled to the peripheral interface 206. The I/O subsystem 240 includes a touch screen controller 242 and/or other input controller(s) 244. The touch-screen controller 242 is coupled to a touch screen 246. The touch screen 246 and the touch screen controller 242 can, for example, detect contact and movement or break thereof using any of a plurality of touch sensitivity technologies, such as capacitive, resistive, infrared, surface acoustic wave technologies, proximity sensor arrays, and the like. The other input controller(s) 244 can be coupled to other input/control devices 248, such as one or more buttons, rocker switches, thumb-wheel, infrared port, USB port, and/or a pointer device such as a stylus.

In some embodiments, the memory interface 202 is coupled to memory 250. The memory 250 can include high-speed random access memory and/or non-volatile memory, such as one or more magnetic disk storage devices, one or more optical storage devices, and/or flash memory (e.g., NAND, NOR).

In some embodiments, the memory 250 stores an operating system 252, a communication module 254, a graphical user interface module 256, a sensor processing module 258, a phone module 260, and applications 262. The operating system 252 includes instructions for handling basic system services and for performing hardware dependent tasks. The communication module 254 facilitates communicating with one or more additional devices, one or more computers and/or one or more servers. The graphical user interface module 256 facilitates graphic user interface processing. The sensor processing module 258 facilitates sensor-related processing and functions. The phone module 260 facilitates phone-related processes and functions. The application module 262 facilitates various functionalities of user applications, such as electronic-messaging, web browsing, media processing, Navigation, imaging and/or other processes and functions.

As described in this specification, the memory 250 also stores client-side digital assistant instructions (e.g., in a digital assistant client module 264) and various user data 266 (e.g., user-specific vocabulary data, preference data, and/or other data such as the user's electronic address book, to-do lists, shopping lists, etc.) to provide the client-side functionalities of the digital assistant.

In various embodiments, the digital assistant client module 264 is capable of accepting voice input (e.g., speech input), text input, touch input, and/or gestural input through various user interfaces (e.g., the I/O subsystem 244) of the user device 104. The digital assistant client module 264 is also capable of providing output in audio (e.g., speech output), visual, and/or tactile forms. For example, output can be provided as voice, sound, alerts, text messages, menus, graphics, videos, animations, vibrations, and/or combinations of two or more of the above. During operation, the digital assistant client module 264 communicates with the digital assistant server using the communication subsystems 224.

In some embodiments, the digital assistant client module 264 utilizes the various sensors, subsystems and peripheral devices to gather additional information from the surrounding environment of the user device 104 to establish a context associated with a user, the current user interaction, and/or the current user input. In some embodiments, the digital assistant client module 264 provides the context information or a subset thereof with the user input to the digital assistant server to help infer the user's intent. In some embodiments, the digital assistant also uses the context information to determine how to prepare and delivery outputs to the user.

In some embodiments, the context information that accompanies the user input includes sensor information, e.g., lighting, ambient noise, ambient temperature, images or videos of the surrounding environment, etc. In some embodiments, the context information also includes the physical state of the device, e.g., device orientation, device location, device temperature, power level, speed, acceleration, motion patterns, cellular signals strength, etc. In some embodiments, information related to the software state of the user device 106, e.g., running processes, installed programs, past and present network activities, background services, error logs, resources usage, etc., of the user device 104 are provided to the digital assistant server as context information associated with a user input.

In some embodiments, the DA client module 264 selectively provides information (e.g., user data 266) stored on the user device 104 in response to requests from the digital assistant server. In some embodiments, the digital assistant client module 264 also elicits additional input from the user via a natural language dialogue or other user interfaces upon request by the digital assistant server 106. The digital assistant client module 264 passes the additional input to the digital assistant server 106 to help the digital assistant server 106 in intent inference and/or fulfillment of the user's intent expressed in the user request.

In various embodiments, the memory 250 includes additional instructions or fewer instructions. Furthermore, various functions of the user device 104 may be implemented in hardware and/or in firmware, including in one or more signal processing and/or application specific integrated circuits.

Figure 3A:
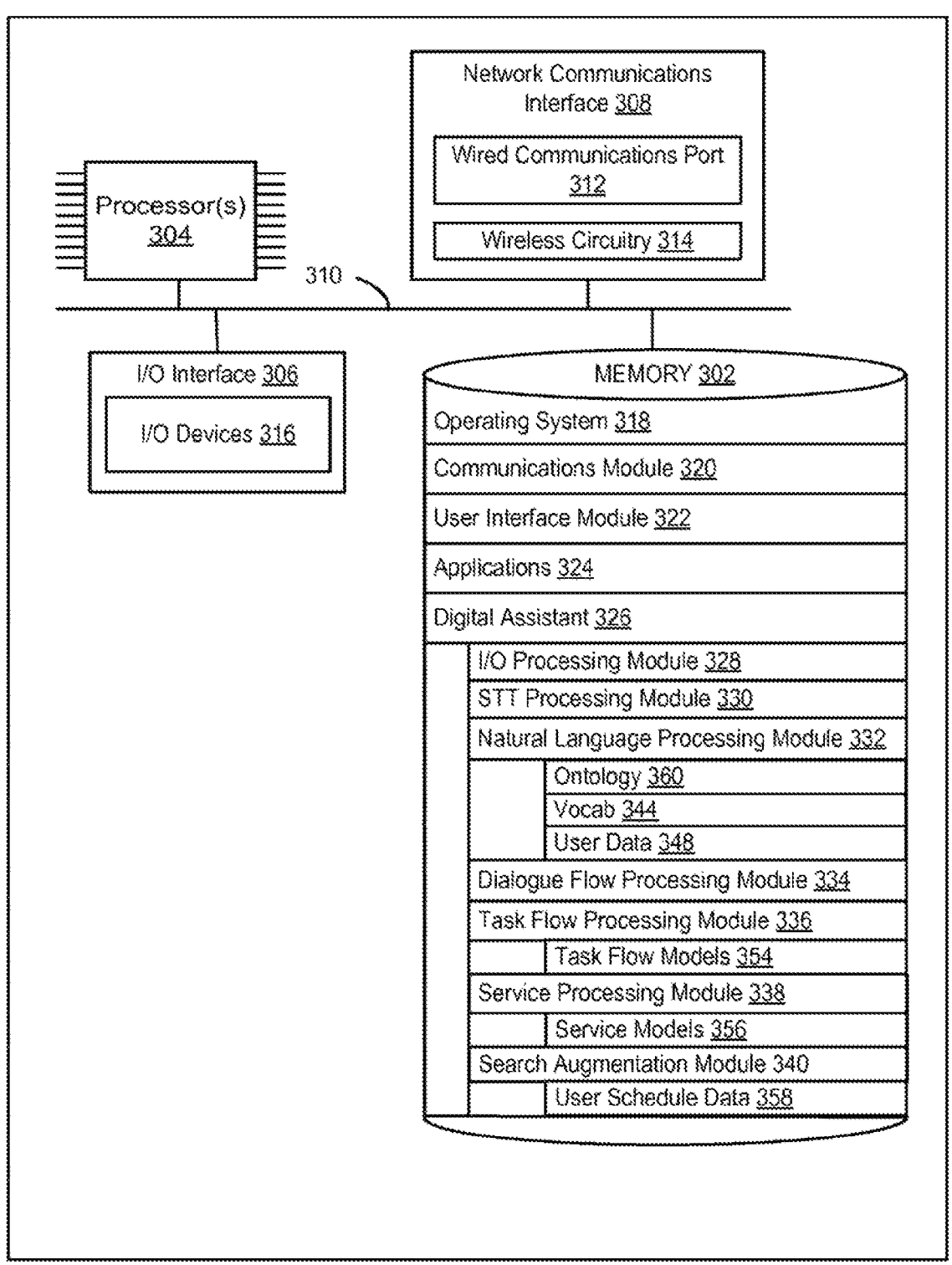
FIG. 3A is a block diagram illustrating a digital assistant system or a server portion thereof in accordance with some embodiments.

FIG. 3A is a block diagram of an example digital assistant system 300 in accordance with some embodiments. In some embodiments, the digital assistant system 300 is implemented on a standalone computer system. In some embodiments, the digital assistant system 300 is distributed across multiple computers. In some embodiments, some of the modules and functions of the digital assistant are divided into a server portion and a client portion, where the client portion resides on a user device (e.g., the user device 104) and communicates with the server portion (e.g., the server system 108) through one or more networks, e.g., as shown in FIG. 1. In some embodiments, the digital assistant system 300 is an embodiment of the server system 108 (and/or the digital assistant server 106) shown in FIG. 1. It should be noted that the digital assistant system 300 is only one example of a digital assistant system, and that the digital assistant system 300 may have more or fewer components than shown, may combine two or more components, or may have a different configuration or arrangement of the components. The various components shown in FIG. 3A may be implemented in hardware, software instructions for execution by one or more processors, firmware, including one or more signal processing and/or application specific integrated circuits, or a combination of thereof.

The digital assistant system 300 includes memory 302, one or more processors 304, an input/output (I/O) interface 306, and a network communications interface 308. These components communicate with one another over one or more communication buses or signal lines 310.

In some embodiments, the memory 302 includes a non-transitory computer readable medium, such as high-speed random access memory and/or a non-volatile computer readable storage medium (e.g., one or more magnetic disk storage devices, flash memory devices, or other non-volatile solid-state memory devices).

In some embodiments, the I/O interface 306 couples input/output devices 316 of the digital assistant system 300, such as displays, a keyboards, touch screens, and microphones, to the user interface module 322. The I/O interface 306, in conjunction with the user interface module 322, receive user inputs (e.g., voice input, keyboard inputs, touch inputs, etc.) and process them accordingly. In some embodiments, e.g., when the digital assistant is implemented on a standalone user device, the digital assistant system 300 includes any of the components and I/O and communication interfaces described with respect to the user device 104 in FIG. 2. In some embodiments, the digital assistant system 300 represents the server portion of a digital assistant implementation, and interacts with the user through a client-side portion residing on a user device (e.g., the user device 104 shown in FIG. 2).

In some embodiments, the network communications interface 308 includes wired communication port(s) 312 and/or wireless transmission and reception circuitry 314. The wired communication port(s) receive and send communication signals via one or more wired interfaces, e.g., Ethernet, Universal Serial Bus (USB), FIREWIRE, etc. The wireless circuitry 314 receives and sends RF signals and/or optical signals from/to communications networks and other communications devices. The wireless communications, optionally, use any of a plurality of communications standards, protocols and technologies, such as GSM, EDGE, CDMA, TDMA, Bluetooth, Wi-Fi, VoIP, Wi-MAX, or any other suitable communication protocol. The network communications interface 308 enables communication between the digital assistant system 300 with networks, such as the Internet, an intranet and/or a wireless network, such as a cellular telephone network, a wireless local area network (LAN) and/or a metropolitan area network (MAN), and other devices.

In some embodiments, memory 302, or the computer readable storage media of memory 302, stores programs, modules, instructions, and data structures including all or a subset of: an operating system 318, a communications module 320, a user interface module 322, one or more applications 324, and a digital assistant module 326. The one or more processors 304 execute these programs, modules, and instructions, and reads/writes from/to the data structures.

The operating system 318 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

The communications module 320 facilitates communications between the digital assistant system 300 with other devices over the network communications interface 308. For example, the communication module 320, optionally, communicates with the communication interface 254 of the device 104 shown in FIG. 2. The communications module 320 also includes various components for handling data received by the wireless circuitry 314 and/or wired communications port 312.

The user interface module 322 receives commands and/or inputs from a user via the I/O interface 306 (e.g., from a keyboard, touch screen, pointing device, controller, and/or microphone), and generates user interface objects on a display. The user interface module 322 also prepares and delivers outputs (e.g., speech, sound, animation, text, icons, vibrations, haptic feedback, and light, etc.) to the user via the I/O interface 306 (e.g., through displays, audio channels, speakers, and touch-pads, etc.).

The applications 324 include programs and/or modules that are configured to be executed by the one or more processors 304. For example, if the digital assistant system is implemented on a standalone user device, the applications 324, optionally, include user applications, such as games, a calendar application, a navigation application, or an email application. If the digital assistant system 300 is implemented on a server farm, the applications 324, optionally, include resource management applications, diagnostic applications, or scheduling applications, for example.

The memory 302 also stores the digital assistant module (or the server portion of a digital assistant) 326. In some embodiments, the digital assistant module 326 includes the following sub-modules, or a subset or superset thereof: an input/output processing module 328, a speech-to-text (STT) processing module 330, a natural language processing module 332, a dialogue flow processing module 334, a task flow processing module 336, a service processing module 338, and a search augmentation module 340. Each of these modules has access to one or more of the following data and models of the digital assistant 326, or a subset or superset thereof: ontology 360, vocabulary index 344, user data 348, task flow models 354, service models 356, and user schedule data 358.

In some embodiments, using the processing modules, data, and models implemented in the digital assistant module 326, the digital assistant performs at least some of the following: identifying a user's intent expressed in a natural language input received from the user; actively eliciting and obtaining information needed to fully infer the user's intent (e.g., by disambiguating words, names, intentions, etc.); determining the task flow for fulfilling the inferred intent; and executing the task flow to fulfill the inferred intent. In this specifications, more details regarding the search augmentation module 340 and its use of the user schedule data 358 are provided later in FIGS. 4A-6C and accompanying descriptions.

Figure 3B:
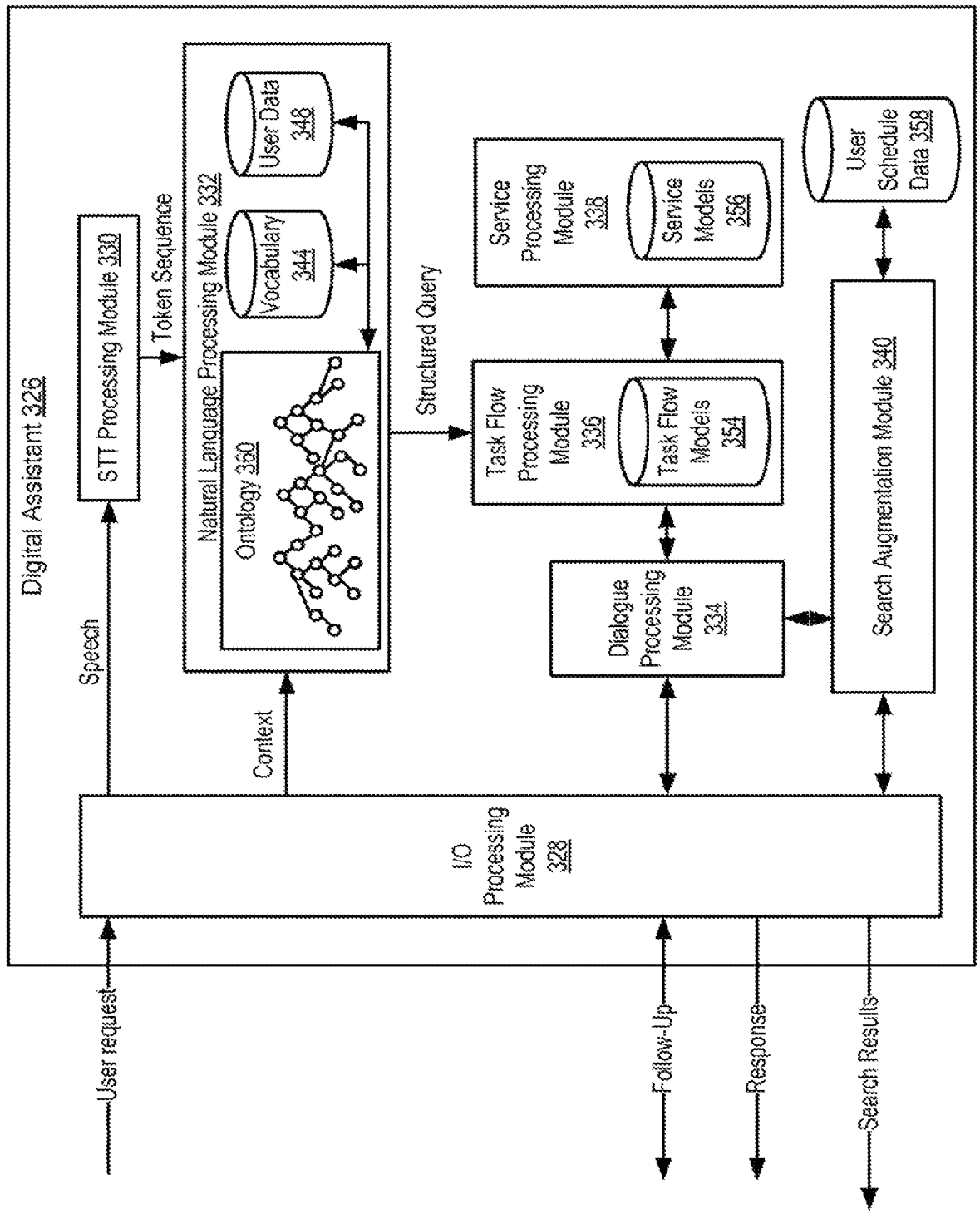
FIG. 3B is a block diagram illustrating functions of the digital assistant shown in FIG. 3A in accordance with some embodiments.

In some embodiments, as shown in FIG. 3B, the I/O processing module 328 interacts with the user through the I/O devices 316 in FIG. 3A or with a user device (e.g., a user device 104 in FIG. 1) through the network communications interface 308 in FIG. 3A to obtain user input (e.g., a speech input) and to provide responses (e.g., as speech outputs) to the user input. The I/O processing module 328, optionally, obtains context information associated with the user input from the user device, along with or shortly after the receipt of the user input. The context information includes user-specific data, vocabulary, and/or preferences relevant to the user input. In some embodiments, the context information also includes software and hardware states of the device (e.g., the user device 104 in FIG. 1) at the time the user request is received, and/or information related to the surrounding environment of the user at the time that the user request was received. In some embodiments, the I/O processing module 328 also sends follow-up questions to, and receives answers from, the user regarding the user request. When a user request is received by the I/O processing module 328 and the user request contains a speech input, the I/O processing module 328 forwards the speech input to the speech-to-text (STT) processing module 330 for speech-to-text conversions.

The speech-to-text processing module 330 receives speech input (e.g., a user utterance captured in a voice recording) through the I/O processing module 328. In some embodiments, the speech-to-text processing module 330 uses various acoustic and language models to recognize the speech input as a sequence of phonemes, and ultimately, a sequence of words or tokens written in one or more languages. The speech-to-text processing module 330 can be implemented using any suitable speech recognition techniques, acoustic models, and language models, such as Hidden Markov Models, Dynamic Time Warping (DTW)-based speech recognition, and other statistical and/or analytical techniques. In some embodiments, the speech-to-text processing can be performed at least partially by a third party service or on the user's device. Once the speech-to-text processing module 330 obtains the result of the speech-to-text processing, e.g., a sequence of words or tokens, it passes the result to the natural language processing module 332 for intent inference.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

The natural language processing module 332 ("natural language processor") of the digital assistant takes the sequence of words or tokens ("token sequence") generated by the speech-to-text processing module 330, and attempts to associate the token sequence with one or more "actionable intents" recognized by the digital assistant. An "actionable intent" represents a task that can be performed by the digital assistant, and has an associated task flow implemented in the task flow models 354. The associated task flow is a series of programmed actions and steps that the digital assistant takes in order to perform the task. The scope of a digital assistant's capabilities is dependent on the number and variety of task flows that have been implemented and stored in the task flow models 354, or in other words, on the number and variety of "actionable intents" that the digital assistant recognizes. The effectiveness of the digital assistant, however, is also dependent on the assistant's ability to infer the correct "actionable intent(s)" from the user request expressed in natural language.

In some embodiments, in addition to the sequence of words or tokens obtained from the speech-to-text processing module 330, the natural language processor 332 also receives context information associated with the user request, e.g., from the I/O processing module 328. The natural language processor 332, optionally, uses the context information to clarify, supplement, and/or further define the information contained in the token sequence received from the speech-to-text processing module 330. The context information includes, for example, user preferences, hardware and/or software states of the user device, sensor information collected before, during, or shortly after the user request, prior interactions (e.g., dialogue) between the digital assistant and the user, and the like.

In some embodiments, the natural language processing is based on ontology 360. The ontology 360 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent, a domain concept or entity, or a sub-aspect of another property. A linkage between an actionable intent node and a property node in the ontology 360 defines how a parameter represented by the property node pertains to the task represented by the actionable intent node.

Figure 3C:
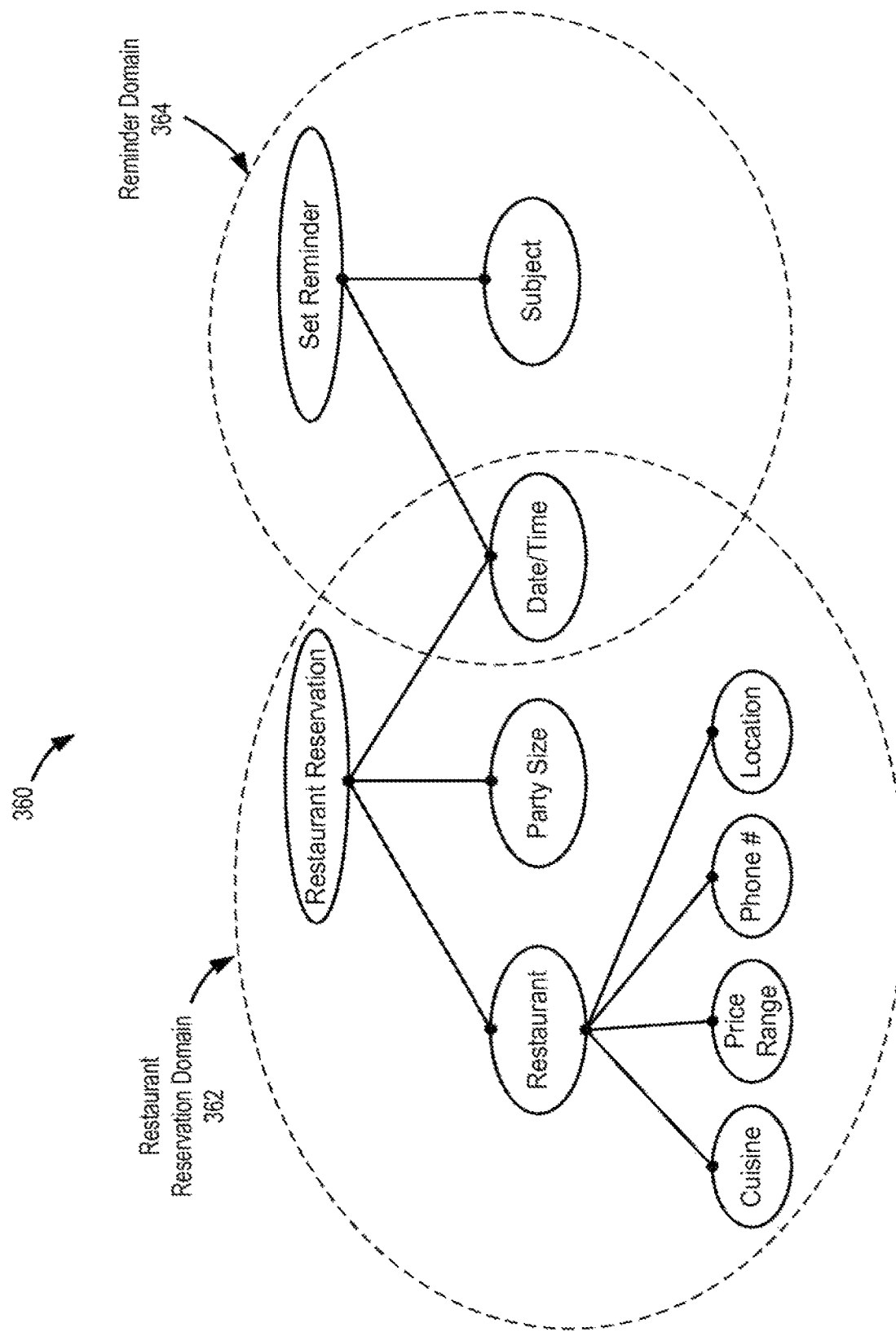
FIG. 3C is a diagram of a portion of an ontology in accordance with some embodiments.

In some embodiments, the ontology 360 is made up of actionable intent nodes and property nodes. Within the ontology 360, each actionable intent node is linked to one or more property nodes either directly or through one or more intermediate property nodes. Similarly, each property node is linked to one or more actionable intent nodes either directly or through one or more intermediate property nodes. For example, as shown in FIG. 3C, the ontology 360 may include a "restaurant reservation" node (i.e., an actionable intent node). Property node "restaurant," (a domain entity represented by a property node) and property nodes "date/time" (for the reservation) and "party size" are each directly linked to the actionable intent node (i.e., the "restaurant reservation" node). In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 3C, the ontology 360 may also include a "set reminder" node (i.e., another actionable intent node). Property nodes "date/time" (for the setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in the ontology 360.

An actionable intent node, along with its linked concept nodes, may be described as a "domain." In the present discussion, each domain is associated with a respective actionable intent, and refers to the group of nodes (and the relationships therebetween) associated with the particular actionable intent. For example, the ontology 360 shown in FIG. 3C includes an example of a restaurant reservation domain 362 and an example of a reminder domain 364 within the ontology 360. The restaurant reservation domain includes the actionable intent node "restaurant reservation," property nodes "restaurant," "date/time," and "party size," and sub-property nodes "cuisine," "price range," "phone number," and "location." The reminder domain 364 includes the actionable intent node "set reminder," and property nodes "subject" and "date/time." In some embodiments, the ontology 360 is made up of many domains. Each domain may share one or more property nodes with one or more other domains. For example, the "date/time" property node may be associated with many different domains (e.g., a scheduling domain, a travel reservation domain, a movie ticket domain, etc.), in addition to the restaurant reservation domain 362 and the reminder domain 364.

While FIG. 3C illustrates two example domains within the ontology 360, other domains (or actionable intents) include, for example, "initiate a phone call," "find directions," "schedule a meeting," "send a message," and "provide an answer to a question," and so on. A "send a message" domain is associated with a "send a message" actionable intent node, and optionally further includes property nodes such as "recipient(s)", "message type", and "message body." The property node "recipient" is optionally further defined, for example, by the sub-property nodes such as "recipient name" and "message address."

In some embodiments, the ontology 360 includes all the domains (and hence actionable intents) that the digital assistant is capable of understanding and acting upon. In some embodiments, the ontology 360 is optionally modified, such as by adding or removing entire domains or nodes, or by modifying relationships between the nodes within the ontology 360.

In some embodiments, nodes associated with multiple related actionable intents are optionally clustered under a "super domain" in the ontology 360. For example, a "travel" super-domain optionally includes a cluster of property nodes and actionable intent nodes related to travels. The actionable intent nodes related to travels optionally includes "airline reservation," "hotel reservation," "car rental," "get directions," "find points of interest," and so on. The actionable intent nodes under the same super domain (e.g., the "travels" super domain) sometimes have many property nodes in common. For example, the actionable intent nodes for "airline reservation," "hotel reservation," "car rental," "get directions," "find points of interest" sometimes share one or more of the property nodes "start location," "destination," "departure date/time," "arrival date/time," and "party size."

In some embodiments, each node in the ontology 360 is associated with a set of words and/or phrases that are relevant to the property or actionable intent represented by the node. The respective set of words and/or phrases associated with each node is the so-called "vocabulary" associated with the node. The respective set of words and/or phrases associated with each node can be stored in the vocabulary index 344 in association with the property or actionable intent represented by the node. For example, returning to FIG. 3B, the vocabulary associated with the node for the property of "restaurant" optionally includes words such as "food," "drinks," "cuisine," "hungry," "eat," "pizza," "fast food," "meal," and so on. For another example, the vocabulary associated with the node for the actionable intent of "initiate a phone call" optionally includes words and phrases such as "call," "phone," "dial," "ring," "call this number," "make a call to," and so on. The vocabulary index 344, optionally, includes words and phrases in different languages.

The natural language processor 332 receives the token sequence (e.g., a text string) from the speech-to-text processing module 330, and determines what nodes are implicated by the words in the token sequence. In some embodiments, if a word or phrase in the token sequence is found to be associated with one or more nodes in the ontology 360 (via the vocabulary index 344), the word or phrase will "trigger" or "activate" those nodes. Based on the quantity and/or relative importance of the activated nodes, the natural language processor 332 will select one of the actionable intents as the task that the user intended the digital assistant to perform. In some embodiments, the domain that has the most "triggered" nodes is selected. In some embodiments, the domain having the highest confidence value (e.g., based on the relative importance of its various triggered nodes) is selected. In some embodiments, the domain is selected based on a combination of the number and the importance of the triggered nodes. In some embodiments, additional factors are considered in selecting the node as well, such as whether the digital assistant has previously correctly interpreted a similar request from a user.

In some embodiments, the digital assistant also stores names of specific entities in the vocabulary index 344, so that when one of these names is detected in the user request, the natural language processor 332 will be able to recognize that the name refers to a specific instance of a property or sub-property in the ontology. In some embodiments, the names of specific entities are names of businesses, restaurants, people, movies, and the like. In some embodiments, the digital assistant searches and identifies specific entity names from other data sources, such as the user's address book, a movies database, a musicians database, and/or a restaurant database. In some embodiments, when the natural language processor 332 identifies that a word in the token sequence is a name of a specific entity (such as a name in the user's address book), that word is given additional significance in selecting the actionable intent within the ontology for the user request.

For example, when the words "Mr. Santo" are recognized from the user request, and the last name "Santo" is found in the vocabulary index 344 as one of the contacts in the user's contact list, then it is likely that the user request corresponds to a "send a message" or "initiate a phone call" domain. For another example, when the words "ABC Café" are found in the user request, and the term "ABC Café" is found in the vocabulary index 344 as the name of a particular restaurant in the user's city, then it is likely that the user request corresponds to a "restaurant reservation" domain.

User data 348 includes user-specific information, such as user-specific vocabulary, user preferences, user address, user's default and secondary languages, user's contact list, and other short-term or long-term information for each user. In some embodiments, the natural language processor 332 uses the user-specific information to supplement the information contained in the user input to further define the user intent. For example, for a user request "invite my friends to my birthday party," the natural language processor 332 is able to access user data 348 to determine who the "friends" are and when and where the "birthday party" would be held, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some embodiments, once the natural language processor 332 identifies an actionable intent (or domain) based on the user request, the natural language processor 332 generates a structured query to represent the identified actionable intent. In some embodiments, the structured query includes parameters for one or more nodes within the domain for the actionable intent, and at least some of the parameters are populated with the specific information and requirements specified in the user request. For example, the user may say "Make me a dinner reservation at a sushi place at seven o'clock." In this case, the natural language processor 332 may be able to correctly identify the actionable intent to be "restaurant reservation" based on the user input. According to the ontology, a structured query for a "restaurant reservation" domain optionally includes parameters such as {Cuisine}, {Time}, {Date}, {Party Size}, and the like. In some embodiments, based on the information contained in the user's utterance, the natural language processor 332 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some embodiments, the natural language processor 332 populates some parameters of the structured query with received context information. For example, in some embodiments, if the user requested a sushi restaurant "near me," the natural language processor 332 populates a {location} parameter in the structured query with GPS coordinates from the user device 104.

In some embodiments, the natural language processor 332 passes the structured query (including any completed parameters) to the task flow processing module 336 ("task flow processor"). The task flow processor 336 is configured to receive the structured query from the natural language processor 332, complete the structured query, if necessary, and perform the actions required to "complete" the user's ultimate request. In some embodiments, the various procedures necessary to complete these tasks are provided in task flow models 354. In some embodiments, the task flow models include procedures for obtaining additional information from the user, and task flows for performing actions associated with the actionable intent.

As described above, in order to complete a structured query, the task flow processor 336 sometimes needs to initiate additional dialogue with the user in order to obtain additional information, and/or disambiguate potentially ambiguous utterances. When such interactions are necessary, the task flow processor 336 invokes the dialogue processing module 334 ("dialogue processor 334") to engage in a dialogue with the user. In some embodiments, the dialogue processor 334 determines how (and/or when) to ask the user for the additional information, and receives and processes the user responses. The questions are provided to and answers are received from the users through the I/O processing module 328. In some embodiments, the dialogue processor 334 presents dialogue output to the user via audio and/or visual output, and receives input from the user via spoken or physical (e.g., clicking) responses. Continuing with the example above, when the task flow processor 336 invokes the dialogue flow processor 334 to determine the "party size" and "date" information for the structured query associated with the domain "restaurant reservation," the dialogue flow processor 335 generates questions such as "For how many people?" and "On which day?" to pass to the user. Once answers are received from the user, the dialogue flow processor 334 can then populate the structured query with the missing information, or pass the information to the task flow processor 336 to complete the missing information from the structured query.

In some cases, the task flow processor 336 receives a structured query that has one or more ambiguous properties, e.g., when a structured query for the "send a message" domain indicates that the intended recipient is "Bob," and the user happens to have multiple contacts named "Bob." In such cases, the task flow processor 336, optionally, requests that the dialogue processor 334 disambiguate this property of the structured query. In turn, the dialogue processor 334, optionally, asks the user "Which Bob?", and displays (or reads) a list of contacts named "Bob" from which the user may choose.

Once the task flow processor 336 has completed the structured query for an actionable intent, the task flow processor 336 proceeds to perform the ultimate task associated with the actionable intent. Accordingly, the task flow processor 336 executes the steps and instructions in the task flow model according to the specific parameters contained in the structured query. For example, the task flow model for the actionable intent of "restaurant reservation", optionally, includes steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, the task flow processor 336, optionally, performs the steps of (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some embodiments, the task flow processor 336 employs the assistance of a service processing module 338 ("service processor") to complete a task requested in the user input or to provide an informational answer requested in the user input. For example, the service processor 338 can act on behalf of the task flow processor 336 to make a phone call, set a calendar entry, invoke a map search, invoke or interact with other user applications installed on the user device, and invoke or interact with third party services (e.g. a restaurant reservation portal, a social networking website, a banking portal, etc.). In some embodiments, the protocols and application programming interfaces (API) required by each service can be specified by a respective service model among the services models 356. The service processor 338 accesses the appropriate service model for a service and generates requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by the task flow processor 336, the service processor 338 can establish a network connection with the online reservation service using the web address stored in the service model, and send the necessary parameters of the reservation (e.g., time, date, party size) to the online reservation interface in a format according to the API of the online reservation service.

In some embodiments, the natural language processor 332, dialogue processor 334, and task flow processor 336 are used collectively and iteratively to infer and define the user's intent, obtain information to further clarify and refine the user intent, and finally generate a response (i.e., an output to the user, or the completion of a task) to fulfill the user's intent.

In some embodiments, after all of the tasks needed to fulfill the user's request have been performed, the digital assistant 326 formulates a confirmation response, and sends the response back to the user through the I/O processing module 328. If the user request seeks an informational answer, the confirmation response presents the requested information to the user. In some embodiments, the digital assistant also requests the user to indicate whether the user is satisfied with the response produced by the digital assistant 326.

More details on the digital assistant can be found in the U.S. Utility application Ser. No. 12/987,982, entitled "Intelligent Automated Assistant," filed Jan. 18, 2010, U.S. Utility Application No. 61/493,201, entitled "Generating and Processing Data Items That Represent Tasks to Perform," filed Jun. 3, 2011, the entire disclosures of which are incorporated herein by reference.

In some embodiments, one of the task flow models 354 implemented by a digital assistant includes a constrained selection task (e.g., "{task=Constrained Selection}, {selection domain="restaurant"}, {cuisine="sushi"}. A constrained selection task is a generic task for selecting one or more selection items (e.g., sushi restaurants) from a set of selection items (e.g., restaurants) in a selection domain (e.g., the restaurant domain) based on a set of constraints (e.g., cuisine=sushi).

In some embodiments, the digital assistant, optionally, initiates a constrained selection task for the domain of restaurants when a user has provided one or more restaurant search criteria or constraints (e.g., type of cuisine, location, time, price range, atmosphere, etc.) to the digital assistant. For example, in response to a speech input (e.g., "I want to have some Asian food for lunch today.") from a user, the digital assistant, optionally, generates a constrained selection task for the restaurant domain using constraint parameters or search criteria (e.g., {cuisine="Asian"}, {time="noon today"}) extracted from the user's speech input. In some embodiments, the digital assistant, optionally, augments the constrained selection task, e.g., using additional constraints generated based on other knowledge the digital assistant has acquired about the user. The additional constraints include, for example, the user's current location, or a list of the user's favorite restaurants. Once the digital assistant has identified a set of selection items (e.g., Asian restaurants) satisfying the search criteria, the digital assistant, optionally, presents these selection items to the user for selection and/or other follow-on actions (e.g., making a reservation at a selected restaurant).

In some embodiments, the digital assistant implements a data model for the constrained selection task. The data model, optionally, includes selection items, item features, and selection criteria and constraints, as parameters of the constrained selection task.

"Selection items" are instances of a selection class (e.g., "restaurants").

"Item features" are common properties and attributes associated with a selection item. For example, the name and phone number of a restaurant are item features of a restaurant selection item. In some embodiments, item features include intrinsic features (e.g., the name or cuisine of a restaurant) and/or relational features (e.g., the distance from a location of interest). In some embodiments, item features also include static features (e.g., restaurant name) and/or dynamic features (e.g., rating).

"Selection criteria" are item features that are used to compare the value or relevance between selection items to a user. That is, selection criteria are ways to evaluate which items are preferred by the user. For example, proximity (defined as distance from the location of interest) is a selection criterion.

Selection criteria sometimes have an inherent "preference order." For example, the proximity criterion has an inherent preference order indicating that a closer distance is more preferable to the user. In another example, a rating criterion has an inherent preference order indicating that higher rating is more preferable to the user. In yet another example, an ambiance criterion has an inherent preference order indicating that a more lively and active ambiance is more preferable than a more subdued and quiet ambiance. In some embodiments, the default or inherent preference order is set by the user, or automatically selected for the user based on the user's demographic characteristics. For example, the above-mentioned preference order for the ambiance criterion is optionally set for a young person, and a reversed preference order is optionally set for an older person.

"Constraints" are restrictions on the desired values of the selection criteria. Formally, constraints are optionally represented as set membership (e.g., desired cuisine type includes "Italian," operating hours include "Saturdays," facilities includes "pharmacies," etc.), pattern matches (e.g., restaurant review text includes "romantic"), fuzzy inequalities (e.g., distance less than a few miles), qualitative thresholds (e.g., highly rated), and/or more complex functions (e.g., a value function measuring a good value for money), etc.

To summarize, in some embodiments, a selection domain is modeled as selection classes with item features that are important to users. Some of the item features are used to select and order items offered to the user—these features are called selection criteria. Constraints are limits imposed on the selection criteria that narrow the set of items that satisfy the selection criteria. In this specification, selection criteria and constrains for a constrained selection task are collectively referred to as "search criteria" for the constrained selection task. A particular constrained selection task is also referred to as a search request.

In general, constrained selection is useful to a user when the user knows the category of his or her interest and wishes to select one or more instances of the category with some desired properties. Frequently, a user initiates a constrained selection task by providing a natural language request (e.g., a natural language speech input). In the request, the user optionally describes a desire outcome, and the digital assistant operationalizes the desired outcome into one or more search criteria, and uses the search criteria to identify a relevant selection domain and one or more selection constraints. For example, instead of saying "find one or more restaurants less than 2 miles from the center of Palo Alto whose cuisine includes Italian food," the user may simply say "I want some Italian food." The digital assistant generates the formal parameters of the search request (e.g., {selection domain="restaurant"}, {cuisine type="Italian"}, {location="current location"="Palo Alto"}, {distance="nearby"="less than 2 miles from current location"}) based on the user's direct speech input and context information (e.g., the user's current location).

Sometimes, the user provides a request specifying one or more explicit search criteria, and the assistant optionally adds one or more implicit search criteria (e.g., the user's preferred price range, the user's current location, etc.) to the search request. In some embodiments, the digital assistant optionally suggests several useful selection criteria to the user, and the user can select the ones that are important to him/her at the moment. Sometimes, the digital assistant provides some guidance to the user with respect to the selection criteria to focus the search to reduce the number of choices ultimately presented to the user.

One type of useful constrained selection task is associated searching for a category of "places" where a user can visit and carry out certain types of activity commonly associated with that category of places. For example, by performing a constrained selection task, a digital assistant can help a user to find places to eat (e.g., restaurants), places to stay (e.g., hotels), places to rent a car (e.g., car rental locations), places to send a letter (e.g., post offices or postal drop-off locations), places to buy clothes (e.g., shopping malls), places to exercise (e.g., gyms, parks), places to buy power tools (e.g., hardware stores, home improvement stores), places to read (e.g., book stores, libraries, coffee shops), places to see sports games (e.g., stadiums), and places to buy groceries (e.g., grocery stores), etc.

Another type of useful constrained selection task is associated with searching for a category of "events or activities" that a user can join or participate at particular times and locations. For example, by performing a constrained selection task, a digital assistant can help a user find the particular locations and times that some events and activities of interest (e.g., movies, concerts, street fairs, farmer's markets, sporting events, etc.) will take place, such that the user can visit those particular locations at the particular times to watch, participate, and/or join the events.

Both types of constrained selection tasks mentioned above involve a respective selection domain (e.g., restaurant domain, movie domain) in which each selection item (e.g., each restaurant entity or movie entity) is associated with a respective physical location. In addition, for each selection item, a useful purpose of the selection item is accomplished by the user being present at that physical location (e.g., eating at the restaurant). Since the search results for these two types of searches are tied to physical locations, these two types of search requests are also sometimes referred to as "local search requests."

For the search requests involving selection items whose useful purposes for a user are accomplished by the user being present at the physical locations associated with the selection items, relevance of a particular selection item sometimes changes depending on a variety of non-static factors. For example, whether a particular Italian restaurant in Palo Alto is of interest to the use sometimes changes depending on factors such as the current location of the user, the kinds of transportation that the user currently has access to, the time that the user plans to eat, whether the user has other types of engagements before or after the time that the user plans to eat, the people that the user intends to dine with, and/or the amount of money the user intends to spend on a meal, etc. In another example, whether a particular action movie showing at a particular theatre at a certain show time is of interest to the user sometimes changes depending on factors such as who will be accompanying the user for the movie, whether the user has other engagement at, before, or after that show time, whether the user has enough time to reach the theatre from his engagement prior to the movie show time, and/or whether the user can conveniently accomplish some other errands near the particular show time and show location, etc.

As described in this specification, in some embodiments, a digital assistant evaluates schedule items (e.g., calendar entries, reminder items, and to-do items) in an electronic schedule associated with a user to identify particular schedule items that are potentially relevant to a local search request received from the user. The digital assistant optionally uses additional information contained in one or more of these potentially relevant schedule items to augment the search request and/or to filter and/or re-rank search results obtained for the search request.

Figure 4A:
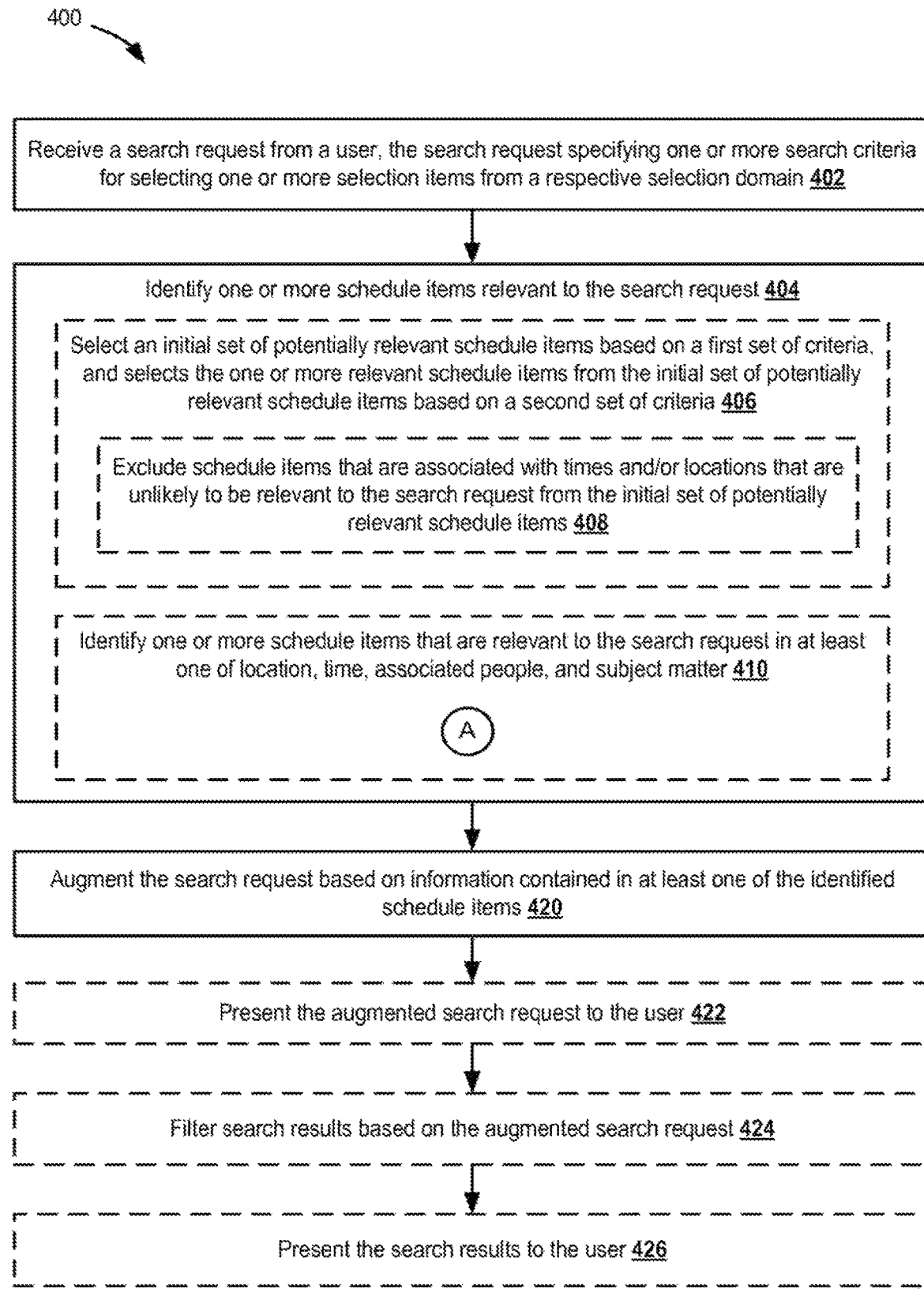

FIGS. 4A-4B illustrate an exemplary process 400 for identifying one or more relevant schedule items from an electronic schedule associated with the user, and using additional information contained in the one or more relevant schedule items to augment a search request received from the user and/or to filter the search results of the search request. In some embodiments, the process 400 is performed by the search augmentation module 340 of the digital assistant 326 based on user schedule items 358, e.g., shown in FIGS. 3A and 3B.

In the process 400, the digital assistant receives (402) a search request from a user, where the search request specifies one or more search criteria for selecting one or more selection items from a respective selection domain. In some embodiments, the search request is a speech input received from the user. In some embodiments, the search request is a user input received through other input modalities (e.g., a text input, a selection from a drop-down menu, etc.). In some embodiments, the search request is a structured query that has been generated based on direct user input (e.g., a speech input) to the digital assistant. In some embodiments, the search request only specifies a respective selection domain, and does not include any other search criteria (e.g., when the direct user input is "Find me a post office."). In some embodiments, the search request specifies a respective selection domain, and at least one search criterion (e.g., when the direct user input is "Find a post office near my house."). In some embodiments, the one or more search criteria include both a selection criterion and at least one constraint (e.g., when the direct user input is "Find a post office near my house that opens on Saturdays.").

In some embodiments, the digital assistant interprets the user input (e.g., a speech input) to determine the user's intent, and generates an associated task to accomplish the user's intent. In some embodiments, the natural language processing capabilities allows the digital assistant to correctly infer the user's intent based on a variety of expressions in natural language. In some embodiments, the digital assistant determines at least a selection domain from the speech input from the user.

In some embodiments, the digital assistant processes the input from a user to generate a local search request. For example, when the user provides a speech input asking about a place to eat (e.g., "Find me a place to eat in Palo Alto," "Is there a restaurant here?" or "I want Italian food."), the digital assistant infers that the user wishes to perform a restaurant search, and generates a constrained selection task in the restaurant domain. In another example, when the user provides a text input asking about a movie showing events (e.g., "What movies are showing this weekend?" "What's on at the Fillmore theatre?" "Show me some new movies?") in a dialogue interface of the digital assistant, the digital assistant infers that the user wishes to perform a movie search, and generates a constrained selection task in the movie domain. In some embodiments, depending on the direct input from the user, the digital assistant selectively generate constrained selection tasks in domains such as grocery stores, hardware stores, post offices, movie theatres, parks, Department of Motor Vehicles (DMVs), hotels, car-rental places, hospitals, police stations, thrift stores, pharmacies, stadiums, street fairs, public lectures, concerts, farmer's markets, sporting games, etc.

After receiving the search request, the digital assistant identifies (404) one or more schedule items relevant to the search request, e.g., based on information (e.g., relevant selection domain and search criteria) contained in the search request. In some embodiments, the digital assistant identifies the relevant schedule items from an electronic schedule associated with the user. In some embodiments, an electronic schedule associated with the user includes an electronic calendar associated with the user, and the schedule items in the electronic schedule include calendar items (e.g., calendar entries) stored in the electronic calendar. In some embodiments, the electronic schedule associated with the user includes a reminder list associated with the user, and the schedule items in the electronic schedule include reminder items stored in the reminder list. In some embodiments, the electronic schedule associated with the user includes a to-do list associated with the user, and the schedule items in the electronic schedule include task items or to-do items stored in the to-do list. In some embodiments, the electronic schedule associated with the user includes the user's own calendar(s), reminder list(s), and/or to-do list(s). In some embodiments, the electronic schedule associated with the user further includes the calendar(s), reminder list(s), and to-do list(s) that have been shared with the user by another user (e.g., the user's spouse, supervisor, children, etc.). For a schedule item in a shared calendar to be potentially relevant to a search request, the schedule item has to list the user or another person mentioned in the search request as a participant.

In some embodiments, each schedule item is associated with at least one of a time, a location, a subject matter, and one or more participants. The location, time, subject matter, and participants associated with a schedule item are optionally determined based on various predetermined data fields of the schedule item, and/or from the freeform notes that the user has entered in the schedule item. For example, a calendar entry for "pick up mom from the airport" is associated with a time (e.g., {event time="Feb. 3, 2013 at 5:45 pm"}), a location (e.g., {event location="San Francisco Airport"}), a subject matter (e.g., {subject="Airport pick-up"}), and one or more participants (e.g., {participants="the user+the user's mom"}. In another example, a to-do item for "buy groceries" is associated with a time (e.g., {event time="tonight"}), and a subject matter (e.g., {subject="purchase groceries"}), but no specified location or participants. In another example, a reminder item for "Submit job application" is associated with a time (e.g., {deadline="Jan. 1, 2013"}), a subject matter (e.g., {subject="submit job application"}), a default participant (e.g., {default participant="the user"}), but no specified location. In another example, a task item "buy lottery ticket" is associated with a subject matter (e.g., {subject="purchase lottery ticket"}) and a default participant (e.g., {default participant="the user"}), but no specified location or time. Presumably, the user is familiar with the time that the lottery is announced each week and the location he/she usually purchases the ticket, and does not need to include that information in the task item.

In some embodiments, the digital assistant selects (406) an initial set of potentially relevant schedule items based on a first set of criteria (e.g., a looser relevance filter, or a relevance filter based on a first set of search criteria), and selects the one or more relevant schedule items from the initial set of potentially relevant schedule items based on a second set of criteria (e.g., a stricter relevance filter, or a relevance filter based on a second set of search criteria). In some embodiments, more than one preliminary step is performed to select an initial set of potentially relevant schedule items. In some embodiments, when identifying the one or more relevant schedule items, the digital assistant evaluates each known schedule items associated with the user. In some embodiments, the digital assistant only evaluates the schedule items associated with a predetermined threshold time period (e.g., a week or a month) from the present time. By implementing a threshold time period, schedule items that are too remote in time from the present search request are not considered, even if those schedule items are concerned with the same location, subject matter, and/or people specified in the search request. By implementing multiple sets of criteria and selects the set of potentially relevant schedule items in multiple stages (e.g., alternating stages of inclusion and exclusions), the risk of being over-inclusive or under-inclusive in the initial set of potentially relevant schedule items is reduced. Additional details for identifying the initial set of potentially relevant schedule items from which the relevant schedule items are later identified are provided later with respect to FIGS. 6A-6C.

In some embodiments, when choosing the initial set of potentially relevant schedule items, the digital assistant excludes (408) schedule items that are associated with time and/or locations that are unlikely to be relevant to the search request. For example, in some embodiments, if the search request explicitly specifies a date or day, schedule items associated with a different date or day are unlikely to be relevant to the search request, and the digital assistant optionally excludes these schedule items from the initial set of potentially relevant schedule items. In one specific example, if the search request is "Find a restaurant for dinner today," schedule items associated with days other than "today" are excluded from the initial set of potentially relevant schedule items. In another specific example, if the search request is "Find a restaurant for my date this Thursday," schedule items associated with days other than "this Thursday" are excluded from the initial set of potentially relevant schedule items.

In another example, in some embodiments, if the search request explicitly specifies a geographic location, schedule items associated with another geographic location too remote (e.g., involving long distance travel or outside same-day driving distance) from the specified geographic location are unlikely to be relevant to the search request, and the digital assistant optionally excludes these schedule items from the initial set of potentially relevant schedule items. In one specific example, if the search request is "Find restaurant in Palo Alto," schedule items associated with a remote location "Washington D.C." (which is too far away from Palo Alto, Calif.) are excluded from the initial set of potentially relevant schedule items. More details on how an initial set of potentially relevant schedule items are selected are provided in FIGS. 6A-6C and accompanying descriptions.

In some embodiments, to identify the one or more relevant schedule items, the digital assistant identifies (410) one or more schedule items that are relevant to the search request in at least one of location, time, associated people, and subject matter. When a schedule item is relevant to the search request in at least one of location, time, associated people, and subject matter, it is likely that the schedule item is relevant to the search request, and the additional information contained in the schedule item can be used to augment the search request.

Referring now to FIG. 4B, in some embodiments, to determine whether a particular schedule item is relevant to the search request in time, the digital assistant identifies (412) a first time window associated with the search request and a second time window associated with the particular schedule item, and determines whether there is an overlap between the first time window and the second time window.

In some embodiments, the time specified in a schedule item is a single time range (e.g., "3:00-4:00 pm on Jan. 1, 2013") or multiple discrete time ranges (e.g., "5:00-6:00 pm every Monday"). In some embodiments, the time window associated with a schedule item is the same as the time range(s) specified in the schedule item. In some embodiments, the time window associated with a schedule item includes a buffer time period (e.g., a reminder time, preparation time, and/or travel time) in addition to a specified event time. In some embodiments, the time specified in a schedule item (e.g., a to-do item) is a deadline for completing a task, and the time window associated with the schedule item is a time range extending from the present time to the deadline. In some embodiments, the time window associated with the schedule item is the actual amount of time needed to complete the task, and the digital assistant dynamically selects the start and end times of the time window based on the event time(s) and duration(s) of other schedule items on the user's electronic schedule. In some embodiments, if no event time is specified in a schedule item (e.g., the task item "buy lottery ticket" mentioned above), the digital assistant optionally attaches time information to the schedule item based on an Internet search (e.g., "lottery time"). In some embodiments, the digital assistant sometimes determines that no relevant time window can be identified from a particular schedule item directly, e.g., when no schedule time is specified in the particular schedule item.

In some embodiments, a time window associated with a search request is a time range specified in the user's direct input. For example, for a speech input "Find a romantic restaurant for my date on Saturday evening."), the digital assistant identifies a time window "Saturday evening." In some embodiments, the digital assistant optionally refines the explicit time range with additional information available to the digital assistant. For example, the digital assistant optionally uses a time range "6 pm-8 pm" to further refine the term "evening." In another example, the digital assistant optionally uses a time range "12:00 pm-2:00 pm" to further refine the term "after lunch" in a search request "What's showing after lunch?"

In some embodiments, the user does not explicitly specify a time in the search request, the digital assistant optionally identifies a relevant time window based on the present time and/or the search criteria (e.g., subject matter) specified in the search request. For example, for a speech input "Find me a place for lunch," the digital assistant identifies a relevant time window ("11:30 am-2 pm today" or "an one-hour window between 11:30-2 pm today") based on the subject matter (e.g., "lunch").

In some embodiments, the digital assistant determines that no relevant time window can be identified from a particular search request directly, e.g., when no time criterion is specified in the particular search request. In some embodiments, when the search request does not include a time criterion, the digital assistant assumes that the relevant time window for a search request is a "present" time window of a predetermined duration (e.g., the present day, the present week, or the present month, the next two hours, etc.).

In some embodiments, the digital assistant allows a certain degree of "fuzziness" around the time windows determined from the search request and/or the schedule item to avoid under-inclusion of potentially relevant schedule items. For example, if the respective time windows of a search request and a schedule item are spaced apart by a short amount of time (e.g., an amount of time within the "fuzziness" threshold), the digital assistant optionally includes the schedule item as a relevant schedule item for the search request even though the two time windows do not actually overlap. In some embodiments, the "fuzziness" is built into the way the relevant time windows are determined. For example, in some embodiments, the digital assistant automatically adds a five-minute buffer or a thirty-minute buffer to a specified time range in the search request and/or a schedule item, when calculating the relevant time window for the search request and/or schedule item.

In some embodiments, to determine whether a particular schedule item is relevant to the search request in location, the digital assistant identifies (414) a first geographic area associated with the search request and a second geographic area associated with the particular schedule item, and determines whether there is an overlap between the first geographic area and the second geographic area.

In some embodiments, the location specified in a schedule item is a street address (e.g., "123 Main Street, Palo Alto, Calif.") or a distinct geographic location (e.g., "south gate of Central Park," "office lobby," etc.). In some embodiments, the geographic area associated with a schedule item is a geographic region of a predetermined size and includes the location specified in the schedule item. In one example, the geographic area is optionally the city including the location specified in the schedule item. In another example, the geographic area is optionally an area within a certain distance (e.g., 500 feet, 5 miles, 10 miles, 50 miles, etc.) from the location specified in the schedule item. In some embodiments, the digital assistant dynamically determines the size of the geographic area based on the transportation means (e.g., car vs. foot) available to the user.

In some embodiments, the schedule item does not explicitly specify a location, and the digital assistant optionally attaches location information to the schedule item based on the subject matter specified in the schedule item. For example, if the schedule item is a to-do item "mail wedding invitations," the digital assistant optionally attaches locations of one or more nearby post offices to the schedule item. In some embodiments, the digital assistant sometimes determines that no relevant geographic area can be identified from a particular schedule item directly, e.g., when no location is specified in the particular schedule item.

In some embodiments, a relevant geographic area associated with a search request is a geographic area specified in the user's direct input. For example, for a speech input "Find me a romantic restaurant in Palo Alto."), the digital assistant identifies a geographic area "Palo Alto" from the speech input. In some embodiments, the digital assistant optionally broadens the relevant geographic area to include neighboring cities of the location explicitly specified in the search request, e.g., when the specified city and its neighboring cities are within short driving distances of one another.

In some embodiments, the relevant geographic area of a search request includes an area surrounding the user's current location. For example, if the user's search request is "What grocery stores are open now?" or "What's nearby?" the digital assistant optionally identifies a relevant geographic area for the search request based on the user's current location and a short radius (e.g., less than 15 minute's walk or drive) from the user's current location.

In some embodiments, the digital assistant sometimes determines that no relevant geographic area can be identified from a particular search request directly, e.g., when no location criterion is specified in the particular search request. In some embodiments, when the search request does not include a location criterion, the digital assistant assumes that the relevant geographic area for a search request is a "local" geographic area of certain size (e.g., the city in which the user is currently located, an area within driving distance from the user's current location, an area within driving distance from the user's home/work location, etc.).

In some embodiments, to determine whether a particular schedule item is relevant to the search request in associated people, the digital assistant identifies (416) a first group of people including all people (if any) specified in the search request, and a second group of people including all people specified as participants or otherwise mentioned in the particular schedule item. The digital assistant then determines whether there is any overlap between the first group of people and the second group of people. For example, if the search request is "Find lodging options for my bridal party," a schedule item for "dinner with my bridesmaids" are relevant in associated people, since there is at least some overlap between the members of the user's bridal party and her bridesmaids. In some embodiments, the digital assistant does not consider inclusion of the user him/herself in the first and second groups when determining whether the first group and the second group overlap in associated people.

In some embodiments, to determine whether a particular schedule item is relevant to the search request in subject matter, the digital assistant identifies (418) a first domain associated with the search request and a second domain associated with the particular schedule item, and determines whether the first domain and the second domain are related domains (e.g., parent-child domains, or sibling domains) in an ontology of domains implemented by the digital assistant. For example, the "hotel" domain is a child domain of the "travel" domain. In another example, the "restaurant" domain is a sibling domain of the "movies" domain under the "entertainment" domain. Therefore, in some embodiments, a schedule item associated with traveling to a remote location (e.g., a reminder item for taking a flight on Sunday) is relevant to a search request for the hotel domain (e.g., a search for "Find hotels in Atlanta.") in subject matter. In some embodiments, a schedule item associated the restaurant domain (e.g., a calendar item for "Dinner with blind date") is relevant to a search request for the movie domain (e.g., a search for "What movies are showing this Saturday?") in subject matter.

In some embodiments, the digital assistant explicitly defines particular subject matters that are considered relevant to each other. Other examples of pairs of schedule item and search request that are relevant to each other include: (1) search request="Find me a restaurant", and schedule item="Lunch with boss", "Order take-out for lunch meeting," or "Date with Linda," etc.; (2) search request="Find gift shop", and schedule item="Birthday party," "Anniversary dinner with wife" "Attend Tim's graduation," "Christmas shopping," "Visit morn in hospital," etc.; (3) search request="Find me a pharmacy," and schedule item="Doctor's Appointment"; (4) search request="Find gas stations," and schedule item="Ski trip to Tahoe," "Doctor's appointment," "Visit the Zoo," etc; (5) search request="What movies are on this Saturday?" and schedule item="Date with Kate," "Dinner with wife," "Hang out with nephews and nieces," etc; and (6) search request="Find me a perfume shop", and schedule item="Buy gift for wife's birthday"; etc.

In some embodiments, to determine whether a particular schedule item is relevant to the search request, the digital assistant combines multiple factors to assess whether the particular schedule item is relevant to the search request. For example, in some embodiments, although a schedule item "Dinner with mom in Palo Alto on Mother's Day" may not be considered to be relevant to a search request "Find me a flower shop in Palo Alto," it would be considered relevant to another search request "Where can I buy flowers for mom in Palo Alto?"

In some embodiments, referring back to FIG. 4A, after the digital assistant has identified one or more relevant schedule items for the search request, the digital assistant augments (420) the search request based on information contained in at least one of the identified schedule items. In some embodiments, the digital assistant presents (422) the augmented search request to the user. In some embodiments, the digital assistant requests user confirmation before proceeding with the search using the augmented search request. In some embodiments, the digital assistant filters (424) the search results based on augmented search request.

In some embodiments, the digital assistant presents (426) the search results to the user. In some embodiments, only the filtered search results are presented to the user. In some embodiments, the digital assistant optionally presents the identified relevant schedule items to the user, and confirms with the user whether these identified schedule items are indeed relevant to the search request.

Some exemplary use cases for using relevant schedule items identified for a search request to augment the search request and/or to filter search results are described below. These exemplary uses cases illustrate how information extracted from one or more relevant schedule items individually or in combination are used to augment the search request in accordance with various embodiments. In some embodiments, the order by which the schedule items occur, and the relationships (e.g., synergies, conflicts, and dependencies) between various schedule events and are also used to augment the search request.

Figure 5A:
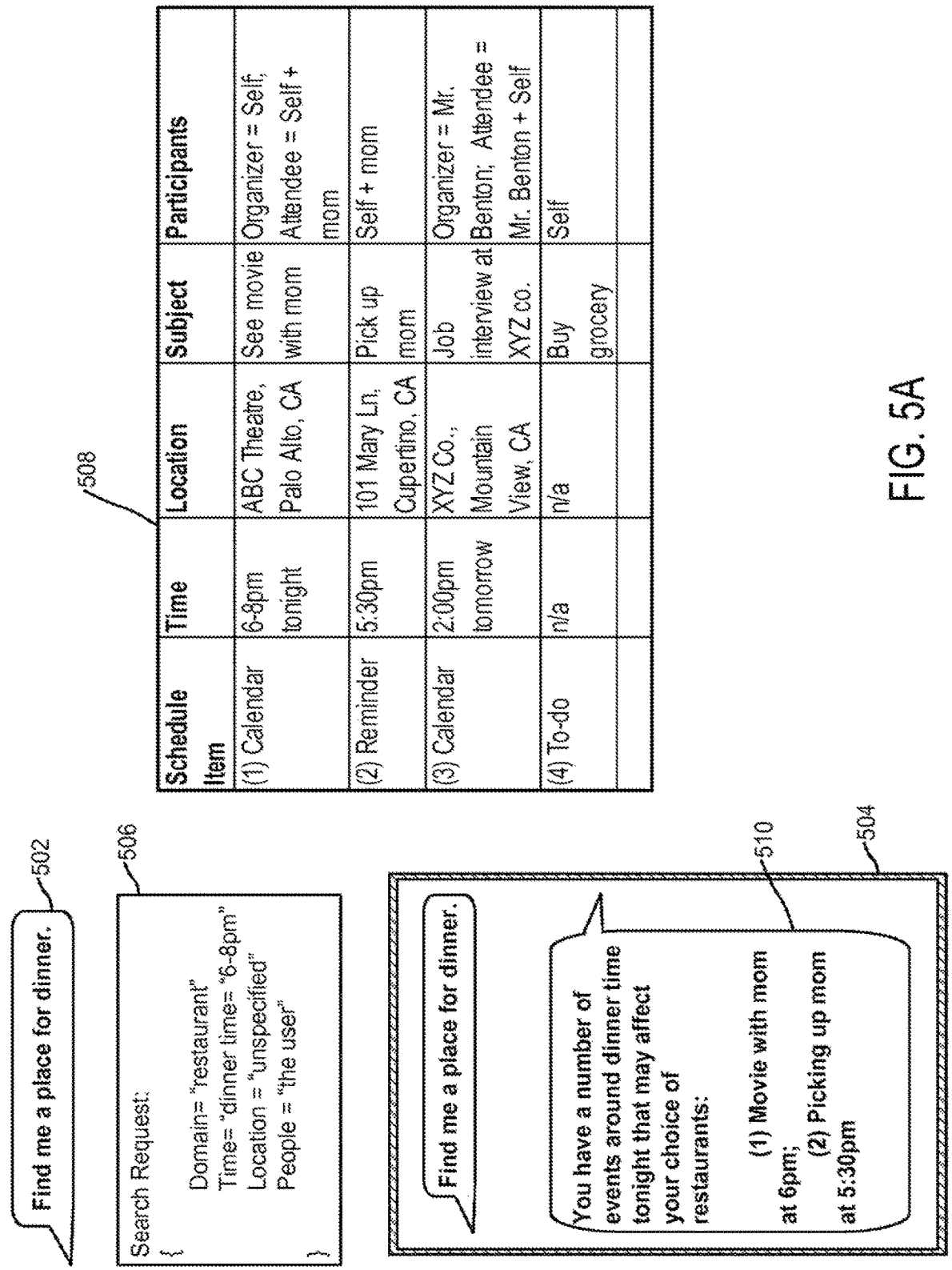

As shown in FIG. 5A, the user provides a speech input 502 (e.g., "Find me a place for dinner tonight.") to a user device (e.g., a user device 104) on which a digital assistant is operating. The digital assistant captures the speech input 502 and optionally presents corresponding text of the speech input in a dialogue panel 504 displayed on the user device. The digital assistant processes the speech input 502 and generates a search request 506 based on the speech input 502. The digital assistant initiates a constrained selection task based on the search request 506. The search request 506 specifies a selection domain {selection domain=restaurant}, and an implicit time criterion={time=dinner tonight}, but not any explicit location constraint or participant constraint. The digital assistant optionally determines that the implicit time criterion for the search request 506 is "6 pm-8 pm." The digital assistant further determines that the relevant time window for the search request 506 is the present day (i.e., today). The digital assistant optionally determines that, given that no location is explicitly specified in the speech input, a relevant geographic area for the search request 506 is a local area within driving distance from the user's current location (i.e., no extensive travel or long-time driving required). The digital assistant optionally determines that the associated people for the search request include at least the user.

After the digital assistant has determined the relevant geographic area, time window, subject matter, and/or associated people of the received search request 506, the digital assistant evaluates each of an initial set of potentially relevant schedule items 508 associated with the user to determine which schedule items are particularly relevant to the search request 506. For illustration purposes, the set of potentially relevant schedule items 508 include four schedule items from the user's schedule of the current week, as shown in the table below:

search request (e.g., "6:00 pm-8:00 pm today"). In addition, the reminder item (2) "Pick up mom" is associated with a time range (e.g., "5:15 pm-5:30 pm today"). The digital assistant optionally identifies the reminder item (2) as a relevant schedule item based on a thirty-minute fuzziness threshold attached to the respective time windows associated with the search request and the reminder item (2).

In some embodiments, the digital assistant includes all schedule items associated with the present day (e.g., using a time window of "one day" for all schedule items) as relevant to the search request. In some embodiments, the digital assistant assigns more relevance to schedule items that have a greater extent of overlap in time with the search request. For example, in this particular scenario, the digital assistant optionally treats the calendar item (1) as a more relevant schedule item to the search request 506 than the reminder item (2). In some embodiments, the digital assistant includes all schedule items associated with the present day as relevant to all search request that does not explicitly specifies a different day (e.g., "next Saturday") in its search criteria. In some embodiments, the more relevant schedule item is given more weight when considering what and how information in the relevant schedule items are used to augment the search request.

In this particular example, the digital assistant also determines that the relevant geographic areas associated with the schedule items (1)-(3) all overlap with the relevant geographic area for the search request (e.g., a local area within driving distance from the user's current location). However, since the user explicitly stated a time criterion of "today", and a time window associated with the schedule item (3) is for a different day (e.g., "tomorrow"), the digital assistant does not consider the schedule item (3) as a relevant schedule item for the search request 506. In addition, the to-do item (4) does not overlap with the search request 506 in any of location, time, subject matter, and people (exclud-

| | Item Type | Time | Location | Subject | Participants |
|---|---|---|---|---|---|
| (1) | Calendar | Event time = 6:00-8:00 pm tonight | ABC theatre in Palo Alto, CA | See movie with mom | Organizer = self; Attendee = self + mom |
| (2) | Reminder | Event time = 5:30 pm today; Reminder time = 15 minutes before event time | 101, Mary Ln., Cupertino, CA | Pick up mom | self + mom |
| (3) | Calendar | Event time = 2:00 pm tomorrow | XYZ company, Mountain View, CA | Job interview at XYZ Co. | Organizer = Mr. Benton; Attendee = Mr. Benton + self |
| (4) | To-do | n/a | n/a | Buy grocery | self |

The digital assistant identifies calendar item (1) and the reminder item (2) as relevant to the search request 506 because they each overlap with the search request 506 in time. For example, suppose that the relevant time window of the search request is determined to be the present day. Both calendar item (1) and the reminder item (2) are associated with time windows within the present day, and therefore are relevant to the search request 506. In some embodiments, if a specific time window (e.g., "dinner"+"today"→"6:00 pm-8:00 pm today") is used for the search request 506, the calendar item (1) "See movie with mom" is identified as a relevant schedule item because the calendar item (1) is associated with a time window (e.g., "6:00 pm-8:00 pm today") overlapping with the relevant time window of the ing the user him/herself), and is therefore not considered to be a relevant schedule item for the search request 506.

In some embodiments, the digital assistant optionally presents the relevant schedule items identified for the search request to the user to facilitate the user's subsequent review and selection of available selection items. As shown in FIG. 5A, the digital assistant optionally provides a response 510 (e.g., text or speech output) to the user's speech input 502, stating that, "You have a number of events around dinner time tonight that may affect your choice of restaurants: (1) Movie with mom at 6 pm; and (2) Picking up mom at 5:30 pm."

In some embodiments, after presenting the relevant schedule items to the user, the digital assistant optionally proceeds with the search using the original search criteria specified in the search request. In some embodiments, as illustrated below, the digital assistant optionally augments the search request using information extracted from the relevant schedule items, makes suggestions of refinement to the original search criteria specified in the search request, adds new search criteria to the search request, automatically categorizes the search results based on information extracted from the relevant schedule items, makes recommendations based on information extracted from the relevant schedule items, and/or provide other information and assistance to help the user resolve potential scheduling conflicts and/or improve efficiency in the user's subsequent action plan.

In some embodiments, the digital assistant reviews the calendar item (1), and recognizes that time window specified in the search request and the time window of the calendar item (1) substantially coincide with each other. In response to this discovery, the digital assistant determines whether the schedule item poses a conflict with the inferred purpose of the search request (e.g., "to have dinner"). For example, the digital assistant may determine that the subject of the search request 506 and the subject of the schedule item (e.g., calendar item (1)) are things to be done at different locations (e.g., a restaurant and a movie theater, respectively), and there isn't enough time to do both things within their respective time windows. In such a scenario, the digital assistant optionally presents this information to the user, and asks the user to pick a different time window for the search request, or confirm the original time window specified in the search request. In this example, based on the calendar item (1), the digital assistant presents a clarification request 512 to the user based information extracted from the calendar item (1). In some embodiments, the digital assistant proposes a modification to the search request to the user. As shown in FIG. 5B, the digital assistant asks the user, "You have a movie from 6:00 pm-8:00 pm tonight. Would you like to have dinner before or after the movie?" The proposed time window(s) avoid the conflict with the time window of the relevant calendar item (1).

In some embodiments, if the user replies "After the movie," the digital assistant optionally uses the end time of the calendar item (1) to generate a refinement of the time criterion (e.g., "after 8 pm tonight") for the search request 506. In some embodiments, the digital assistant optionally presents an output 514 showing the refinement to the search request (e.g., a speech output saying, "Searching for restaurants with open tables after 8:00 pm today . . . "), as shown in FIG. 5C. In some embodiments, the digital assistant then presents the search results satisfying the refined search request to the user. In some embodiments, the digital assistant optionally adds a location criterion to the search request 506 based on the location (e.g., "ABC theatre in Palo Alto") specified in the calendar item (1). Since the user has clarified that the dinner is for after the movie, the digital assistant optionally adds to the search request a location criterion {restaurant location="near Palo Alto"} with a default preference order indicating that a closer distance from the movie theatre is preferred. In some embodiments, the digital assistant presents the search results to the user in a subsequent output 516. In some embodiments, as shown in FIG. 5C, the digital assistant only presents a small number of search results that are ranked highest (e.g., the top two results) based on the augmented search request, i.e., the search request including the refined and/or additional search criteria generated based on the relevant schedule items.

In some embodiments, upon a discovery that the relevant time windows of the calendar item (1) and the search request 506 substantially coincide with each other, the digital assistant also determines whether the purpose of the calendar item (1) aligns with the inferred purpose of the search request 506 in one or more aspects. For example, the digital assistant may infer that the subject of the search request (e.g., "to have dinner") and the subject of the calendar item (1) (e.g., "to see movie") are things likely to be done at proximate time(s) and location(s), and/or with the same people. In such a scenario, the digital assistant optionally presents this information to the user, and asks the user to confirm such an inference made by the digital assistant. In some embodiments, once the inference is confirmed by the user, the digital assistant optionally uses additional information extracted from the schedule item to generate additional search criteria for the search request. As shown in FIG. 5D, the digital assistant infers from the calendar item (1) ("See movie with mom") that the user may wish to have the dinner with mom as well, and adds the additional people criterion to the search request 506. For example, the digital assistant optionally presents an output 518 asking the user, "You have a movie from 6:00 pm-8:00 pm tonight with your mom, would you like to have dinner with your mom?"

In some embodiments, the digital assistant provides the response 518 ("Will you be having dinner with your mom?") after the user has confirmed that the dinner is to occur after the movie (e.g., after the digital assistant had provided the output 512). In some embodiments, the digital assistant provides a response that combines the inquiry in both the responses 512 and 518. For example, digital assistant may ask, "You are seeing a movie with mom from 6-8 pm tonight. Will you be having dinner with your mom after the movie?"

In some embodiments, if the user replies that he would be having the dinner with mom, as shown in FIG. 5E, the digital assistant optionally adds additional search criteria, such as the ambiance, price range, and/or cuisine type generally suitable for dinner with one's mother, to the search request. In some embodiments, the digital assistant optionally uses the price, cuisine, and ambiance preferences of the user's mother as additional search criteria for the search request, provided that such preferences are known to the digital assistant. In some embodiments, the digital assistant also adds a location criterion based on the home location of the user's mom if the user has not specified that the dinner is to occur after the movie. In some embodiments, the digital assistant uses a location criterion based on both the home location of the user's mom and the location of the movie theatre (e.g., {restaurant location="vicinity of Cupertino & Palo Alto"}). In some embodiments, as shown in FIG. 5E, the digital assistant presents these additional search criteria to the user for selection and approval before proceeding with the search. For example, the digital assistant optionally provide an output 520 showing the refined and/or additional search criteria generated based on the relevant calendar item (1). In some embodiments, the digital assistant also presents user interface elements (e.g., check boxes, drop-down selection menus, editable ranges, etc.) for modifying and/or deleting the additional search criteria provided by the digital assistant. In some embodiments, the digital assistant also accepts verbal modifications of the refined and/or additional search criteria. In some embodiments, once the user has approved the search criteria presented by the digital assistant, e.g., via a verbal approving command or a selection input on a "Proceed" button in the dialogue interface 504, the digital assistant proceeds with the augmented search.

In some embodiments, in lieu of and/or in addition to presenting the refinement to existing search criteria and/or the newly generated search criteria to the user, the digital assistant performs the search using the original search criteria of the search request, and filters the search results based on the refinement and/or additional search criteria. In such embodiments, the user can selectively review the respective search results satisfying each augmented search request that includes a particular set of one or more refined search criteria and/or newly generated search criteria. As shown in FIG. 5F, the digital assistant presents a response 522 containing different categories (e.g., 524a-c) of search requests, each category corresponding to a respective set of search results satisfying a particular augmented search request based on the original search request and one or more relevant schedule item (e.g., calendar item (1)).

In this particular example, the digital assistant optionally presents the following three categories of search results: (1) restaurants with open tables before 6:00 pm, (2) restaurants with open tables after 8:00 pm, and (3) restaurants near the movie theatre. For the first category of search results, the digital assistant optionally filters the search results of the original search request using a refined time criterion {time="before the movie event"="before 6 pm tonight"} and a preferred restaurant feature {feature="service speed"}, with a preference order {preference order="faster service speed is more preferable"}. This search augmentation is based on the assumption that the dinner is to occur before the movie and there isn't a lot of time for the dinner. For the second category of search results, the digital assistant optionally filters the search results of the original search request using a refined time criterion {time="after the movie event"="after 8 pm tonight"} and a preferred restaurant feature {feature="ambiance"}, with a preference order {preference order="good ambiance is more preferable"}. This search augmentation is based on the assumption that the dinner is to occur after the movie with the user's mother. For the third category of search results, the digital assistant optionally filters the search results of the original search request using an additional location criterion {location="near the movie theatre"="near Palo Alto"}. Other categories of results can be presented depending on the particular embodiments used.

In some embodiments, the digital assistant presents the different categories of search results after presenting the relevant schedule item to the user. In some embodiments, the digital assistant highlights at least some of the refinement and/or additional search criteria to the user when presenting the different categories of search results to the user. In some embodiments, the user can select a particular highlighted search criterion and modify that search criterion directly. For example, in some embodiments, the user can edit "before 6:00 pm" shown in the response 522, and change it to "before 5:30 pm" or "before 6:00 pm in Cupertino" and in response, a new group of search results meeting the user-modified search criteria will be presented to the user in place of the results 524a.

In some embodiments, the digital assistant uses the location in a schedule item to generate a new location criterion or modify an existing location criterion in the search request, when the digital assistant determines that the subject of the search request (e.g., "to have dinner") and the subject of the schedule item (e.g., "to see movie") are things to be done at proximate time(s). In this particular example, the search request does not explicitly include any location criterion, and the digital assistant uses the location of the calendar item (1) to generate the location criterion for the restaurant search request. In some embodiments, the digital assistant optionally presents an output to the user indicating the location search criterion (e.g., "These are search results near the ABC movie theater."). In some embodiments, if the search request does explicitly specify a location criterion (e.g., "in Palo Alto"), and if the location of the calendar item (1) (e.g., ABC theatre in Palo Alto) does not conflict with the explicitly specified location criterion, the digital assistant optionally uses the location of the calendar item (1) to refine the location criterion specified in the search request. For example, the digital assistant optionally augments the search request "Find me a restaurant in Palo Alto" to "Find me a restaurant near ABC theatre in Palo Alto."

In some embodiments, the digital assistant generates a number of suggestions for the user's subsequent action plan in light of the user's search request and the relevant schedule items that have been identified. In some embodiments, the digital assistant presents the different suggestions and search results suitable for each of the suggestions to the user without first asking the user to clarify the search request in light of the relevant schedule items. For example, as shown in FIG. 5G, the digital assistant presents an output 526 stating, "You are seeing a movie with mom from 6-8 pm. I have the following suggestions: (1) Dinner alone with mom before the movie, (2) Dinner with mom after the movie, and (3) Dinner alone after the movie." For each of the suggested scenario, the digital assistant presents some suitable search results (e.g., 528a-c) obtained or filtered based on a respective augmented search request. For example, for the first suggestion, the digital assistant optionally performs the search using a refined time criterion {time="before the movie event"="before 6 pm tonight} and a preferred restaurant feature {feature="service speed"}, with a preference order {preference order="faster service speed is more preferable"}. For the second suggestion, the digital assistant optionally performs the search using a refined time criterion {time="after the movie event"="after 8 pm tonight"} and a preferred restaurant feature {feature="ambiance"}, with a preference order {preference order="good ambiance is more preferable"}. For the third suggestion, the digital assistant optionally performs the search using an additional location criterion {location="near the movie theatre"="near Palo Alto"}.

In this example, when reviewing the second relevant schedule item that has been identified (e.g., the reminder item (2) for picking up mom at 5:30 pm in Cupertino), the digital assistant determines that the relevant time window associated with reminder item (2) is also proximate to the relevant time window associated with the search request 506. In some embodiments, the digital assistant presents this information to the user and asks the user to confirm the association between the search request 506 and the reminder item (2). For example, as shown in FIG. 5H, the user has answered the digital assistant's inquiry regarding the timing of the dinner by saying "Before the movie." In response, the digital assistant optionally presents an output 530 "You have a reminder to pick up mom at 5:30 pm today, would you be having dinner with your mom?" If the user answers in the affirmative to this question, the digital assistant will use the associated person information in the reminder item (2) as an additional people criterion to augment the search request 506. For example, once the user confirms that his/her mom will be at the dinner, the digital assistant optionally adds additional search criteria related to the ambiance, price range, and/or cuisine type generally suitable for dinner with one's mother to the search request 506. In some embodiments, the user's mom's preferences for restaurants are optionally used as additional search criteria for the restaurant search. For example, the digital assistant optionally uses the personal price, cuisine, and ambiance preferences of the user's mother as additional search criteria for the search request 506, provided that such personal preferences are known to the digital assistant. In some embodiments, the digital assistant optionally changes the default preference order associated with a search criterion of the search request 506. For example, if the user's usual preference order for restaurant search is that a lively and loud atmosphere is more preferable than a quiet and intimate atmosphere, in this particular scenario, however, the digital assistant optionally changes the preference order for the restaurant search 506 to indicate that a quiet, intimate atmosphere is more preferable than a lively and loud atmosphere.

In some embodiments, the digital assistant correlates the location and/or time information in multiple identified relevant schedule items with the location and/or time criteria in the search request, and attempts to reconcile any potential conflicts between them and/or streamline the process the user has to take to meet his/her schedule. In this particular example, the digital assistant determines that the calendar item (1), the reminder item (2), and the search request are associated with times and/or locations proximate to one another. In some embodiments, the digital assistant presents this information to the user and tries to provide a recommendation that would accommodate all or most of the constraints imposed by the multiple relevant schedule items and the original search request 506. As shown in FIG. 5I, the digital assistant optionally presents an output 532 indicating that given the location and time constraints imposed by the multiple relevant schedule items (e.g., the calendar item (1) and the reminder item (2)), only search results meeting a combined search criterion (e.g., {restaurant location="along the route from mom's house in Cupertino to the movie theatre in Palo Alto"} and {dinner time="between 5:30 pm-6:00 pm"}) would be presented to the user. In some embodiments, the output 532 states, "Since you only have half an hour for dinner before the movie, I will only recommend fast food restaurants on your route from mom's house to the movie theatre." In some embodiments, the digital assistant optionally highlights the combined search criterion generated based on the information extracted from the multiple relevant schedule items (e.g., the calendar item (1) and the reminder item (2)). In some embodiments, the digital assistant presents the search results 534 obtained using the combined search criterion to the user for review and selection in the dialogue panel 504, as shown in FIG. 5I.

In some embodiments, once the digital assistant determines that multiple schedule items (e.g., the calendar item (1) and the reminder item (2)) are proximate in locations and/or time to the search request, the digital assistant optionally presents the relevant schedule items (1) and (2) to the user, and asks the user to clarify whether the inferred purpose (e.g., "to have dinner") of the search request is to be carried out before the earliest schedule item, after the last schedule item, or between any adjacent pair of schedule items. In this particular example, the digital assistant optionally presents an output saying, "You have a reminder to pick up mom at 5:30 pm, and a calendar item for see movie with mom from 6:00 pm to 8:00 pm tonight, would you like to have dinner (A) before picking up your mom, (B) before the movie with mom, or (C) after seeing the movie?" Each option presented to the user corresponds to a respective augmented search request with appropriate search criteria generated based on the scenario embodied in the options presented.

In some embodiments, the digital assistant presents the search results that best accommodate all the constraints obtained from the relevant schedule items, and provides a suggestion for an alternative plan of action (provided that the user has not previously rejected this alternative plan of action). For example, suppose that after the user provided the speech input "Find me a place for dinner tonight," the digital assistant provided a response "You have to pick up mom at 5:30, and see a movie with mom from 6-8 pm. Would you like to have dinner (A) before picking up your mom, (B) before the movie with mom, or (C) after seeing the movie?" If the user responds "Before the movie with mom," the digital assistant presents a response 536 based on the user's clarification, and presents search result (e.g., 538a-b) that are suitable for dinner with mom before the movie. In addition to presenting the results 538a-b according to the action plan provided by the user (e.g., having dinner with mom before the movie), the digital assistant optionally recognizes that the action plan proposed by the user may not be ideal. Upon such recognition, the digital assistant optionally generates and presents an alternative action plan to the user. As shown in FIG. 5J, in addition to the response 536 and the search results 538, the digital assistant also provides an output 540 specifying an alternative action plan, and presents search results 542 obtained based on an augmented search request generated based on the alternative action plan. Specifically, the augmented search request based on the user's proposed action plan includes a location criterion {restaurant location="near the movie theatre or en route from the user's mom's house to the movie theatre"} and a feature criterion {feature="fast service speed"}. The augmented search request based on the digital assistant's alternative action plan includes a person criterion {party="user+ user's mom"} and other criteria derived from the person criterion (e.g., {ambiance="quiet and intimate"}, {price="$$-$$$"}, {restaurant location="vicinity of Cupertino and Palo Alto"}, and {time="after 8 pm tonight"}.

In some embodiments, if the user's proposed action plan is to have dinner after picking up mom and before the movie, the digital assistant optionally determines that the amount of time available between the scheduled time for the movie and the reminder time for picking up mom is not sufficient for the inferred purpose of the search request (e.g., "to have dinner"). For example, if the travel time between the pick-up location and the movie theatre is close to thirty minutes, there is not sufficient time to insert a dinner event between the two scheduled events (1) and (2). In such a scenario, the digital assistant optionally notifies the user of this scheduling conflict, and optionally suggests an alternative action plan. For example, as shown in FIG. 5K, the digital assistant presents an output 544, "You are seeing a movie with mom from 6-8 pm in Palo Alto and you are picking up mom at 5:30 pm in Cupertino. There is too little time for dinner with mom before the movie. Would you like to have dinner after the movie instead?"

In some embodiments, if the user insists on having the dinner event fit between picking up mom and seeing the movie, the digital assistant optionally generates a location criterion for the restaurant search to only include restaurants along the route from the location specified in the reminder item (2) and the location specified in the calendar item (1). In addition, the digital assistant optionally add an additional constraints to ensure that the dinner can be completed within a short amount of time (e.g., 30 minutes minus the necessary travel time between the location in the reminder item (1) and the location in the calendar item (1)). In some embodiments, the digital assistant optionally generates a restaurant type criterion to include only fast food chains with a drive-through option. In some embodiments, the digital assistant presents the option to the user before performing the search. For example, the digital assistant optionally says, "You would only have time for drive-through fast food on your way to the movie. Shall I proceed with the search for fast food restaurants that have a drive-through option along your route to the movie?"

In some embodiments, the user, upon the suggestion by the digital assistant (e.g., via output 544), recognizes that the amount of time available for dinner between the time in the reminder item (2) and the time in the calendar item (1) is too short for a dinner, and decides to take the suggestion by the digital assistant. In such a scenario, the digital assistant optionally performs a search based on an augmented search request generated according to the alternative action plan proposed by the digital assistant, and presents the search results to the user. As shown in FIG. 5K, after the user accepted the alternative action plan proposed by the digital assistant, the digital assistant performs a search based on a set of search criteria suitable for dinner with mom after the movie (e.g., {ambiance="quiet and intimate"}, {price="$$-$$$"}, {restaurant location="vicinity of Cupertino and Palo Alto"}, {time="after 8 pm tonight"}), and presents the search results 548 to the user in an output 546, as shown in FIG. 5K.

In some embodiments, if the digital assistant determines that the amount of time available for dinner between the time in the reminder item (2) and the time in the calendar item (1) is too short for a dinner, the digital assistant assesses whether either or both of the schedule items (1) and (2) can be shifted in time or location to accommodate the dinner. In some embodiments, the digital assistant optionally asks the user whether the location or time of either scheduled event may be moved to accommodate the dinner in between. In some embodiments, the digital assistant proposes the time and location change to the user in an output 550. For example, in the output 550, the digital assistant optionally states, "You are seeing a movie with mom from 6-8 pm in Palo Alto, and you have scheduled to pick her up at 5:30 in Cupertino. There is too little time for dinner before the movie. Would you like to call mom to change the pick-up time to 4:30 pm?"

In some embodiments, if the user agrees to change the scheduled pick-up time according to the assistant's suggestion, the digital assistant proceeds to contact the participants to make the proposed changes known to the other participants. For example, after the user accepted the proposal by the digital assistant, the digital assistant proceeds to establish a telephone connection to the user's mom. In some embodiments, the digital assistant listens in on the conversation between the user's and the user's mom to determine whether the proposal for change is accepted by both parties.

In some embodiments, once the digital assistant determines that the proposed changes to a schedule item are accepted by all participants of the schedule item, the digital assistant proceeds to make the changes to the schedule item in the user's electronic schedule. The digital assistant also proceeds to perform the search based on an augmented search request in accordance with an action plan including the changed schedule item, as shown in FIG. 5L. In some embodiments, if the proposed change is not accepted (e.g., if the attempt to reach the user's mom is not successful, or if the conversation between the user and the user's mom does not result in any changes to the schedule item), the digital assistant optionally present search results based on the constraints imposed by the relevant schedule items (e.g., the calendar item (1) and the reminder item (2)). In some embodiments, the digital assistant provides more than one alternative changes to the relevant schedule items.

In some embodiments, the digital assistant optionally determines whether the user is the organizer of one or more of the relevant schedule items, and if so, the digital assistant determines that the user may be able to change the scheduled time for at least some of the schedule items. In some embodiments, the digital assistant also considers the identities of other participant(s) of the scheduled event, and determines whether the user may be able to change the scheduled event time based on the identities of the other participants. For example, if the other participants include only the user's family members or personal contacts (e.g., the user's mother or friends), the digital assistant optionally asks the user to consider changing the scheduled time of at least one of the relevant schedule items. If the other participants include at least one professional contact, the digital assistant assumes by default that the scheduled time cannot be changed by the user.

In some embodiments, the digital assistant determines that the user is the organizer of an event, and assumes that the user may be able to change the location or time of the event if the user is the organizer of the event. In some embodiments, the digital assistant determines whether the user is a sole participant of the event, and assumes that the user may be able to change the location or time of the event if the user is the sole participant of the event. In some embodiments, the digital assistant determines whether the event is for a public event that the user participates in, and whether the time for participation is flexible. For example, a public event such as a movie is somewhat flexible in time and location because there are multiple show times and theatres locations that may work for the user. A public event such as a street fair is somewhat flexible in time but not in location, since the user can go to the street fair at any time during the scheduled time of the fair, but only at the scheduled location of the fair. A public event such as a sports game is flexible in neither time nor location, because the game that the user wishes to watch only occurs at its scheduled time and location.

In some embodiments, the digital assistant determines whether the user is a mandatory participant or optional participant of an event for which the user is an invitee. If the user is an invitee of a scheduled event, but is not a mandatory attendee, the digital assistant assumes that the user can be late to or absent from the event. If the user is a mandatory attendee, the digital assistant assumes that the user may not be able to change the location or time of the scheduled event.

In some embodiments, the digital assistant evaluates various combinations of the above factors to determine the likelihood that the user may be able to change the location and/or time of the relevant schedule item. In some embodiments, if the digital assistant determines that the user may be likely to change the location and/or time of the relevant schedule item, the digital assistant proposes a change to the location and/or time of the relevant schedule item to accommodate the inferred purpose of the search request. In some embodiments, the digital assistant generates one or more proposals for the time and/or location change for the relevant schedule item based on the subject, location, and time, and/or people associated with the other relevant schedule items.

The actions, interactions, and user interfaces described in the above examples in FIGS. 5A-5L are merely illustrative. Various combinations of the features described above are possible.

In some embodiments, the search request received by the digital assistant includes explicitly stated location, time, associated people, and domain for the constrained selection task. Sometimes, the original search request does not include an explicit location and/or time criterion. Although the digital assistant may infer a default or implicit location or time (e.g., the user's current location or the current time) for a search request, such inference may result in an under-inclusion of potentially relevant schedule items. On the other hand, if no inference is drawn regarding the location or time criteria, the digital assistant may have to review schedule items associated with any locations and time as being potentially relevant to the search request. Therefore, when a location or time criterion is not explicitly stated in the original search request, there is a high likelihood of over-inclusion or under-inclusion of relevant schedule items in the initial set of potentially relevant schedule items.

Figure 6A:
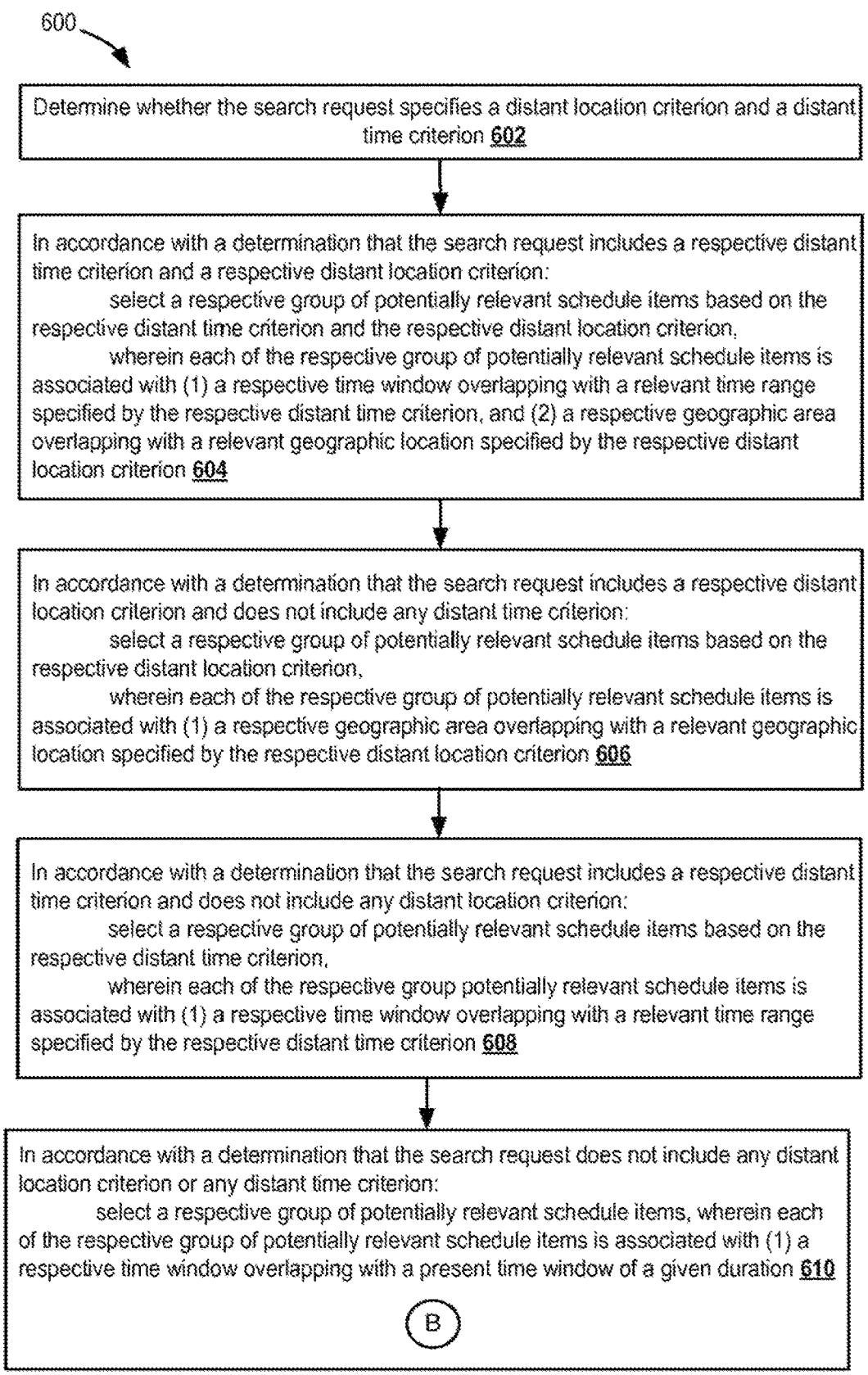
FIGS. 6A-6C are a flow chart of an exemplary process for selecting a preliminary set of potentially relevant schedule items for a search request in accordance with some embodiments.
Figure 6B:
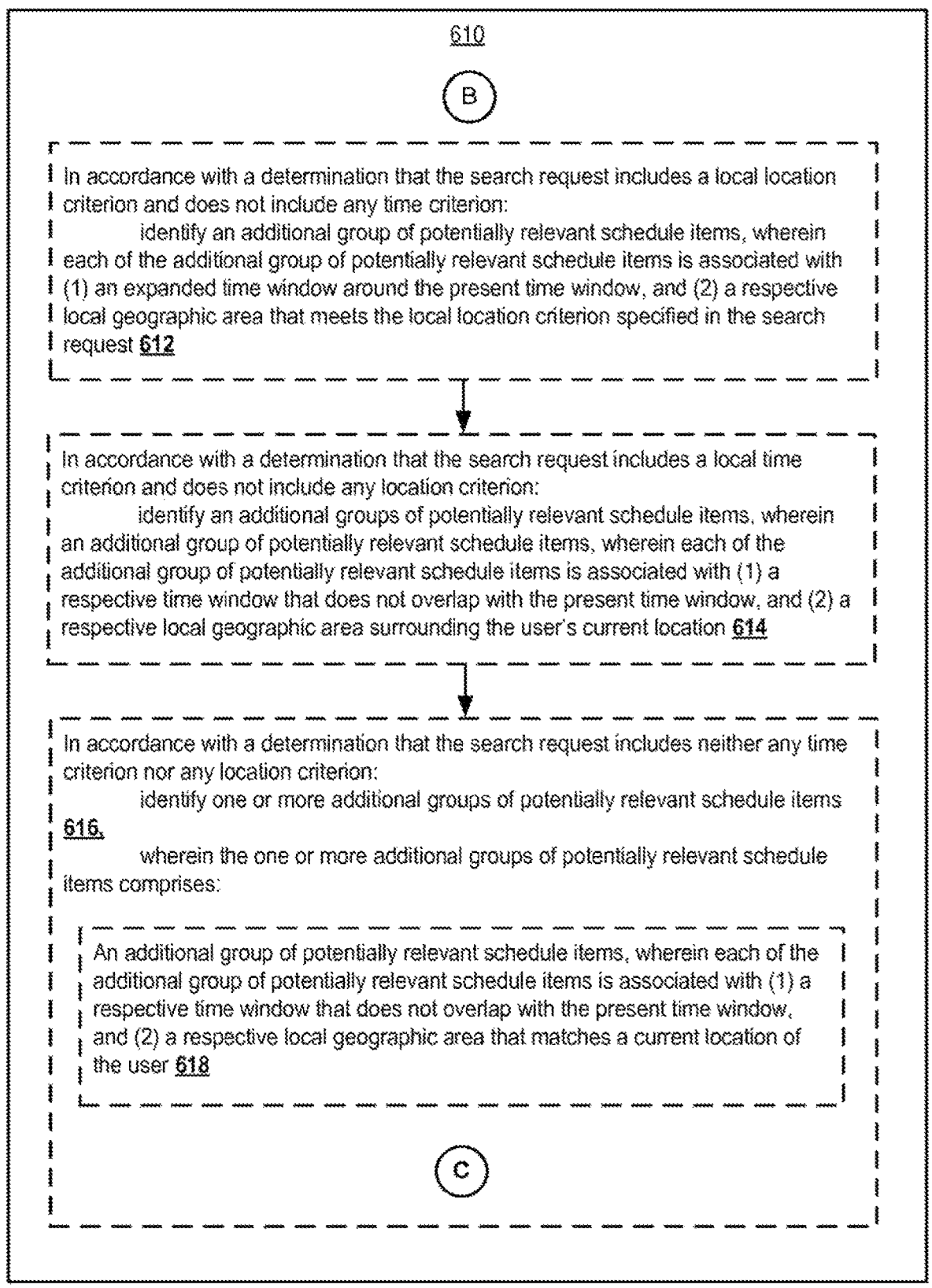
Figure 6C:
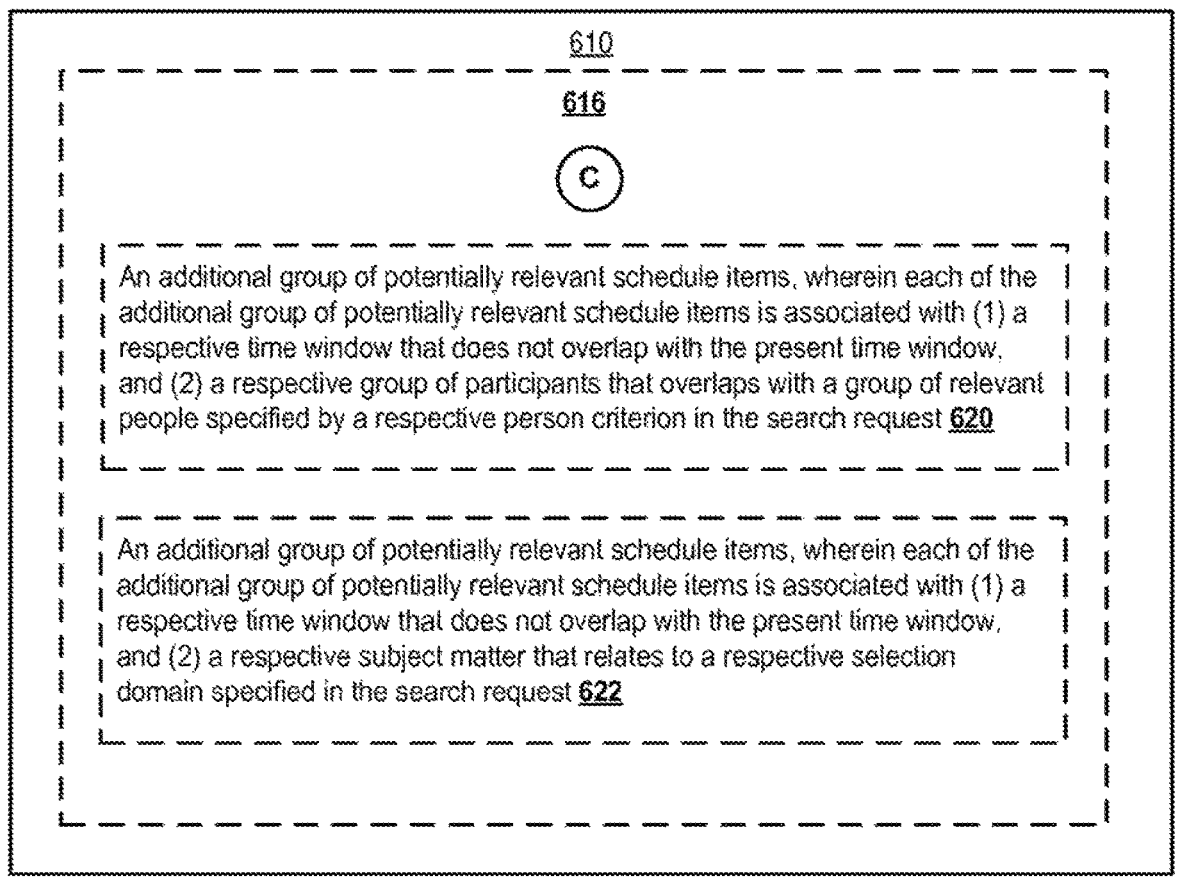

To improve the efficiency and accuracy of the digital assistant's identification of relevant schedule items for a search request, it is important that a suitable initial set of potentially relevant schedule items is obtained first, and then the digital assistant can select the relevant schedule items from the initial set based on the overlap in location, time, subject matter, and/or associated people between the schedule item and the search request. FIGS. 6A-6C illustrate an exemplary process 600 for selecting an initial set of potentially relevant schedule items.

In some embodiments, in the process 600, to find the initial set of potentially relevant schedule items, the digital assistant determines (602) whether the search request specifies a distant location criterion and a distant time criterion. When the user explicitly specifies a remote location in the search request, it is likely that the user is interested in places and/or events associated with that remote location, and therefore, schedule items that are associated with local locations are not likely to be relevant to the search request. Similarly, when the user explicitly specifies a remote time (e.g., a particular day apart from the present day) in the search request, it is likely that the user is interested in places and/or events associated with that particular day, and therefore, schedule items that are associated with the present day and other days are not likely to be relevant to the search request. In contrast, when the user is merely interested in events in the present timeframe (e.g., the present day) and local places and events, the user frequently omits the location and time criteria in the search request. In further contrast, when the user is merely interested in local places for events occurring on a particular future date, the user sometimes omits the location criterion in the search request and only specifies the future date in the search request. In further contrast, when the user is interested in places and events for a particular remote location for either the present day or a future date, the user sometimes omits the time criterion in the search request and only specifies the remote location in the search request.

Due to the subtle asymmetry and differences in user behavior described above, in some embodiments, depending on whether the search request specifies: (1) both a distant location criterion and a distant time criterion, (2) a distant location criterion, but no distant time criterion, (3) a distant time criterion, but no distant location criterion, (4) a local location criterion, but not any time criterion, (5) a local time criterion, but not any location criterion, or (6) neither location nor time criterion, the digital assistant optionally uses different strategies to select the initial set of potentially relevant schedule items.

In some embodiments, a distant location criterion can be found in the search request in the form of a location that is "remote" from the user's current location. A distant time criterion can be found in the search request in the form of a time that is "remote" from the current time. The exactly standard for determining whether a location or time is "remote" can vary in different embodiments. In general, a "remote" location is a location that is not typically reachable during the user's daily or routine movements. For example, regions that are not accessible by the user's routine transportation means would be considered "remote." For most people, regions outside of distances accessible by walking, driving, biking, public buses, and commuter trains, etc. from the user's current or home location are considered "remote." For some people who frequently travel by air between two particular cities, regions outside of distances accessible by walking, driving, biking, public buses, and commuter trains, etc. from these two particular cities would be considered "remote." Typically, a "remote" time is a time outside of the present day (i.e., the day that the user provided the search request).

In some embodiments, in accordance with a determination that the search request includes a respective distant time criterion and a respective distant location criterion: the digital assistant selects (604) a respective group of potentially relevant schedule items based on the respective distant time criterion and the respective distant location criterion, where each of the respective group of potentially relevant schedule items is associated with (1) a respective time window overlapping with a relevant time range specified by the respective distant time criterion, and (2) a respective geographic area overlapping with a relevant geographic location specified by the respective distant location criterion. For example, if the user asks the digital assistant to "find a romantic restaurant in Atlanta for next Saturday," and Atlanta is a remote location to the user, then, schedule items associated with locations other than Atlanta are unlikely to be relevant. Furthermore, among the schedule items associated with the remote location Atlanta, only schedule items that have a time window overlapping with next Saturday are likely to be relevant to the search request. Therefore, in some embodiments, the digital assistant identifies only schedule items that are associated with both the remote location "Atlanta" and the remote time "next Saturday" as being relevant to the search request. This filtering process performed by the digital assistant generates a small set of potentially relevant schedule items for further evaluation. As a result, the amount of data processing and the complexity of the processing tasks may be reduced. In addition, it is easier and more likely for the digital assistant to find the more relevant schedule items from the smaller set of potentially relevant items.

In this particular example, the user has specified a search request "Find a nice restaurant in Atlanta for next Saturday," and the digital assistant has generated a constrained selection task based on the search request (e.g., {selection domain="restaurant"}, {location="Atlanta"}, {time="next Saturday"), {keyword="nice"}). Suppose that the digital assistant also identifies several schedule items associated with the user, including:

(1) a calendar entry with {subject="meet wife for dinner"}, {location="Palo Alto"}, and {time="today at 6 pm"};

(2) a reminder item with {subject="flight to Atlanta"}, and {time="next Thursday at 9 pm"};

(3) a calendar item with {subject="meet with old friends"}, {location="Atlanta"}, and {time="next Saturday at 6 pm"};
(4) a to-do item with {subject="buy gift for wife"}, {location="Atlanta"}, {time="before next Saturday"}; and
(5) a calendar item with {subject=Job interview"}, {time="9 am-2 pm next Friday"}, and location="Atlanta"}.

Among these five schedule items, the digital assistant eliminates schedule items that are associated with geographic areas that do not overlap with a relevant geographic area specified by the distant location criterion in the search request. For example, schedule item (1) (e.g., calendar entry with {location="Palo Alto"}) is eliminated from the set of potentially relevant schedule items for the search request. The digital assistant also eliminates schedule items that are associated with time windows that do not overlap with a relevant time window specified by the distant time criterion in the search request. For example, schedule item (1) (e.g., {time="today at 6 pm"}, schedule item (2) (e.g., {time="Thursday at 9 pm"}), and schedule item (5) (e.g., {time="9 am-2 pm next Friday"} are also eliminated from the set of potentially relevant schedule items for the search request. The remaining schedule items (3) and (4) are each associated with a respective geographic area that overlaps with the relevant geographic area specified by the distant location criterion in the search request, and also associated with a respective time window that overlaps with the relevant time specified by the distant time criterion in the search request. Therefore, the digital assistant identifies each of schedule items (3), and (4) as a potentially relevant schedule item for the search request.

In some embodiments, once the digital assistant has identified the set of potentially relevant schedule items, the digital assistant optionally determines whether the respective time, location, associated people, subject matter, and/or other information in the potentially relevant schedule items can be used to refine the search request.

In this example, the selection domain of the search request is the restaurant domain, which overlaps with the subject matter of schedule item (3) (e.g., "dinner with old friends"). In response to determining an overlap in subject matter, the digital assistant optionally infers that the search request is for accomplishing the activity expressed in the schedule item (3). In some embodiments, the digital assistant obtains one or more additional parameters from the schedule item (3), such as a time parameter="6 pm" and an attendee parameter="Pete, John, and self." Based on the additional parameters obtained from the schedule item (3), the digital assistant optionally augments the search request with additional search criteria. For example, the augmented search request includes the following search criteria: {selection domain="restaurant"}, {location="Atlanta"}, {time="6 pm next Saturday"}, and {party size="3"}.

In some embodiments, the digital assistant presents an output identifying the relevant schedule item used to augment the search request and the augmented search request. For example, in some embodiments, the digital assistant provides a speech output "You have a dinner scheduled for three people at 6 pm next Saturday in Atlanta, would you like to find restaurants that have open table a party of three for 6 pm?" In some embodiments, the digital assistant automatically proceed to filter the search results obtained for the user request using the additional search criteria obtained from the relevant schedule item, and present the filtered search results to the user.

In some embodiments, the digital assistant identifies that the potentially relevant schedule item (4) does not provide further refinement to the specified location and time, and does not overlap with the search request in terms of subject matter and associated people. Upon such determination, the digital assistant does not use the information from schedule item (4) to change the search request.

In some embodiments, in accordance with a determination that the search request includes a respective distant location criterion and does not include any distant time criterion, the digital assistant selects (606) a respective group of potentially relevant schedule items based on the respective distant location criterion, where each of the respective group of potentially relevant schedule items is associated with (1) a respective geographic area overlapping with a relevant geographic location specified by the respective distant location criterion. For example, if the user asks "Where can I get some souvenirs in Atlanta?" Based on this user input, the digital assistant generates a search request with a distant location criterion {Location=Atlanta}, but no distant time criterion, and excludes only item (1) (e.g., "meet wife for dinner today in Palo Alto") from the set of potentially relevant schedule items.

In some embodiments, in accordance with a determination that the search request includes a respective distant time criterion and does not include any distant location criterion, the digital assistant selects (608) a respective group of potentially relevant schedule items based on the respective distant time criterion, where each of the respective group potentially relevant schedule items is associated with (1) a respective time window overlapping with a relevant time range specified by the respective distant time criterion. For example, if the user had asked "What movies are showing next Saturday?" instead of "Find a nice restaurant in Atlanta next Saturday," the digital assistant would generate a search request with a distant time criterion {time="next Saturday"}, but no distant location criterion. Based on this search request, the digital assistant would exclude schedule items that are not associated with "next Saturday" from the set of potentially relevant schedule items, but would not exclude items based on locations.

In some embodiments, in accordance with a determination that the search request does not include any distant location criterion or any distant time criterion, the digital assistant selects (610) a respective group of potentially relevant schedule items, where each of the respective group of potentially relevant schedule items is associated with (1) a respective time window overlapping with a present time window of a given duration. For example, if the user input is "What's happening in Mountain View today?" (provided that Mountain View is local to the user) or "What new movies have come out lately?," the digital assistant automatically includes schedule items associated with the present day in the set of potentially relevant schedule items. In some embodiments, only items associated with the present day are included in the set of potentially relevant schedule items if the search request specifies both a local location criterion and a local time criterion.

In some embodiments, inclusion of the schedule items associated with the present day does not exclude inclusion of additional group(s) of schedule items in the set of potentially relevant schedule items. In other words, in some embodiments, if the search request includes neither a distant location criterion nor a distant time criterion, the digital assistant gradually expands the set of potentially relevant schedule items by including additional groups of schedule items. In contrast, in some embodiments, if the search request does include a distant location criterion and/or a distant time criterion, the digital assistant reduces the set of potentially relevant schedule items by excluding schedule items based on the distant location criterion and/or the distant time criterion (as shown in steps 604, 606, and 608 above).

In some embodiments, in accordance with a determination that the search request includes a local location criterion and does not include any time criterion, the digital assistant identifies (612) an additional group of potentially relevant schedule items, wherein each of the additional group of potentially relevant schedule items is associated with (1) an expanded time window around the present time window, and (2) a respective local geographic area that meets the local location criterion specified in the search request. For example, if the user asks "What's a good Sushi place in Palo Alto" (provided that Palo Alto is local to the user), the digital assistant includes both schedule items associated with the present day regardless of location (e.g., included in a first group), and schedule items associated with Palo Alto and within a few days after present day (e.g., in the additional group) in the set of potentially relevant schedule items.

In some embodiments, in accordance with a determination that the search request includes a local time criterion and does not include any location criterion, the digital assistant identifies (614) an additional group of potentially relevant schedule items, wherein each of the additional group of potentially relevant schedule items is associated with (1) a respective time window that does not overlap with the present time window, and (2) a respective local geographic area surrounding the user's current location. For example, if the user asks "I want Sushi for lunch today" while the user is located in Palo Alto, the digital assistant includes both schedule items associated with the present day regardless of location (e.g., included in a first group), and schedule items associated with Palo Alto (e.g., in the additional group) in the set of potentially relevant schedule items.

In some embodiments, in accordance with a determination that the search request includes neither any time criterion nor any location criterion, the digital assistant identifies (616) one or more additional groups of potentially relevant schedule items. In some embodiments, the one or more additional groups include (618) an additional group of potentially relevant schedule items, where each of the additional group of potentially relevant schedule items is associated with (1) a respective time window that does not overlap with the present time window, and (2) a respective local geographic area that matches a current location of the user. In some embodiments, the one or more additional groups include (620) an additional group of potentially relevant schedule items, where each of the additional group of potentially relevant schedule items is associated with (1) a respective time window that does not overlap with the present time window, and (2) a respective group of participants that overlaps with a group of relevant people specified by a respective person criterion in the search request. In some embodiments, the one or more additional groups include (622) an additional group of potentially relevant schedule items, where each of the additional group of potentially relevant schedule items is associated with (1) a respective time window that does not overlap with the present time window, and (2) a respective subject matter that relates to a respective selection domain specified in the search request.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed:

1. A method of operating a digital assistant, comprising:
    at a device having one or more processors and memory:
    receiving a search request from a user, the search request specifying one or more search criteria for selecting one or more selection items from a respective selection domain;
    identifying one or more schedule items relevant to the search request;
    presenting the one or more schedule items to the user;
    receiving a user input responsive to the presentation of the one or more schedule items, the user input specifying a search criterion associated with the one or more schedule items;
    before performing the search request, augmenting the search request based on the search criterion specified in the user input and information contained in at least one of the identified schedule items, wherein the augmenting comprises modifying at least one of the one or more search criteria or adding an additional search criterion to the search request; and
    presenting the augmented search request or search results retrieved based on the augmented search request to the user.

2. The method of claim 1, wherein the schedule items include one or more calendar items from a calendar associated with the user.

3. The method of claim 1, wherein the schedule items further include one or more calendar items from a calendar that has been shared with the user by another user.

4. The method of claim 1, wherein the schedule items further include one or more reminder items in the user's electronic schedule.

5. The method of claim 1, wherein the schedule items further include one or more to-dos in the user's electronic schedule.

6. The method of claim 1, wherein identifying the one or more schedule items relevant to the search request further comprises:
    identifying one or more schedule items that are relevant to the search request in at least one of location, time, associated people, and subject matter.

7. The method of claim 1, wherein modifying at least one of the one or more search criteria or adding the additional search criterion to the search request comprises:
    establishing, based on the search criterion specified in the user input and the information contained in the at least one of the identified schedule items, a refinement on the at least one of the one or more search criteria specified in the search request; and
    modifying the search request based on the refinement.

8. The method of claim 1, wherein the additional search criterion is not specified in the received search request, and wherein modifying at least one of the one or more search criteria or adding the additional search criterion to the search request comprises:

establishing, based on the search criterion specified in the user input and the information contained in the at least one of the identified schedule items, the additional search criterion; and modifying the search request to include the additional search criterion.

9. The method of claim 1, wherein augmenting the search request based on the search criterion specified in the user input and the information contained in the at least one of the identified schedule items comprises:

establishing, based on the search criterion specified in the user input and the information contained in the at least one of the identified schedule items, a new preference order that has not been specified in the search request; and modifying the search request to include the new preference order.

10. The method of claim 1, wherein modifying at least one of the one or more search criteria or adding the additional search criterion to the search request comprises:

adding a new time criterion or modifying an existing time criterion based on an event time associated with the at least one of the identified schedule items.

11. The method of claim 10, wherein adding the new time criterion or modifying the existing time criterion is further based on an event location associated with at least one of the identified schedule items.

12. The method of claim 1, wherein modifying at least one of the one or more search criteria or adding the additional search criterion to the search request comprises:

adding a new location criterion or modifying an existing location criterion based on a respective location associated with at least one of the identified schedule items.

13. The method of claim 12, wherein adding the new location criterion or modifying the existing location criterion is further based on an event time associated with at least one of the identified schedule items.

14. The method of claim 1, wherein identifying the one or more schedule items relevant to the search request further comprises:

identifying a respective group of relevant schedule items, wherein each of the respective group of relevant schedule items is associated with a respective time window overlapping with a present time window of a given duration.

15. The method of claim 14, wherein identifying the respective group of relevant schedule items is performed in accordance with a determination that the search request includes neither any distant time criterion nor any distant location criterion.

16. The method of claim 14, wherein identifying the one or more schedule items relevant to the search request further comprises:

identifying an additional group of relevant schedule items, wherein each of the additional group of relevant schedule items is associated with (1) a respective time window that does not overlap with the present time window, and (2) a respective local geographic region that meets a location criterion specified in the search request.

17. A method of operating a digital assistant, comprising:
at a device having one or more processors and memory:
receiving a speech input from a user;
processing the speech input to infer a respective user intent, the user intent being embodied in one or more search criteria for a search request;

based on the search request, generating a constrained selection task for selecting one or more selection items from a respective selection domain based on the one or more search criteria;

identifying one or more schedule items relevant to the search request based on the respective selection domain and the one or more search criteria;

presenting the one or more schedule items to the user;

receiving a user input responsive to the presentation of the one or more schedule items, the user input specifying a search criterion associated with the one or more schedule items;

before performing the search request, augmenting the search request based on the search criterion specified in the user input and information contained in at least one of the identified schedule items, wherein the augmenting comprises modifying at least one of the one or more search criteria or adding an additional search criterion to the search request; and presenting the augmented search request or search results retrieved based on the augmented search request to the user.

18. The method of claim 17, wherein the schedule items include one or more calendar items from a calendar associated with the user.

19. The method of claim 17, wherein the schedule items further include one or more calendar items from a calendar that has been shared with the user by another user.

20. The method of claim 17, wherein the schedule items further include one or more reminder items in the user's electronic schedule.

21. The method of claim 17, wherein the schedule items further include or one or more to-dos in the user's electronic schedule.

22. The method of claim 17, wherein identifying the one or more schedule items relevant to the search request further comprises:

identifying one or more schedule items that are relevant to the search request in at least one of location, time, associated people, and subject matter.

23. A system, comprising:
one or more processors; and
memory having instructions stored thereon, the instructions, when executed by the one or more processors, cause the processors to perform:

receiving a search request from a user, the search request specifying one or more search criteria for selecting one or more selection items from a respective selection domain;

identifying one or more schedule items relevant to the search request;

presenting the one or more schedule items to the user;

receiving a user input responsive to the presentation of the one or more schedule items, the user input specifying a search criterion associated with the one or more schedule items;

before performing the search request, augmenting the search request based on the search criterion specified in the user input and information contained in at least one of the identified schedule items, wherein the augmenting comprises modifying at least one of the one or more search criteria or adding an additional search criterion to the search request; and presenting the augmented search request or search results retrieved based on the augmented search request to the user.

24. The system of claim 23, wherein the schedule items include one or more calendar items from a calendar.

25. The system of claim 23, wherein identifying the one or more schedule items relevant to the search request further comprises:
identifying one or more schedule items that are relevant to the search request in at least one of location, time, associated people, and subject matter.

26. A non-transitory computer readable medium having instructions stored thereon, the instructions, when executed by one or more processors, cause the processors to perform:
receiving a search request from a user, the search request specifying one or more search criteria for selecting one or more selection items from a respective selection domain;
identifying one or more schedule items relevant to the search request;
presenting the one or more schedule items to the user;
receiving a user input responsive to the presentation of the one or more schedule items, the user input specifying a search criterion associated with the one or more schedule items;
before performing the search request, augmenting the search request based on the search criterion specified in the user input and information contained in at least one of the identified schedule items, wherein the augmenting comprises modifying at least one of the one or more search criteria or adding an additional search criterion to the search request; and
presenting the augmented search request or search results retrieved based on the augmented search request to the user.

27. The non-transitory computer readable medium of claim 26, wherein the schedule items include one or more calendar items from a calendar.

28. The non-transitory computer readable medium of claim 26, wherein identifying the one or more schedule items relevant to the search request further comprises:
identifying one or more schedule items that are relevant to the search request in at least one of location, time, associated people, and subject matter.

29. The method of claim 1, wherein identifying the one or more schedule items relevant to the search request is based on the one or more search criteria.

30. The method of claim 1, further comprising:
determining, based on the search request, a user intent, wherein the user intent corresponds to the respective selection domain, and wherein the one or more schedule items relevant to the search request is identified based on the respective selection domain.

31. The method of claim 1, wherein the respective selection domain is a domain of an active ontology.

32. The method of claim 17, wherein the respective selection domain is a domain of an active ontology.

33. The method of claim 1, further comprising performing natural language processing on the search request to identify the one or more search criteria and the respective selection domain.

34. The method of claim 17, wherein processing the speech input to infer the respective user intent comprises performing natural language processing on the speech input to identify the respective selection domain.

35. The method of claim 1, wherein the one or more identified schedule items are each within a threshold time of a current time.

36. The method of claim 1, wherein identifying the one or more schedule items includes comparing respective domains associated with the one or more schedule items to the respective selection domain.

37. The method of claim 1, further comprising performing natural language processing on the search request to determine a second search criterion, the second search criterion not explicitly specified in the search request; and
wherein identifying the one or more schedule items relevant to the search request includes comparing the second search criterion to information contained in the one or more schedule items.

38. The method of claim 1, wherein each of the search results retrieved satisfies the modified at least one of the one or more search criteria or the additional search criterion.

39. The method of claim 17, wherein modifying at least one of the one or more search criteria or adding the additional search criterion to the search request comprises:
adding a new time criterion or modifying an existing time criterion based on an event time associated with the at least one of the identified schedule items.

40. The method of claim 17, wherein modifying at least one of the one or more search criteria or adding the additional search criterion to the search request comprises:
adding a new location criterion or modifying an existing location criterion based on a respective location associated with at least one of the identified schedule items.

41. The method of claim 17, wherein identifying the one or more schedule items includes comparing respective domains associated with the one or more schedule items to the respective selection domain.

42. The method of claim 17, further comprising:
determining, based on results of the speech input processing, a second search criterion, wherein the second search criterion is not explicitly specified in the speech input; and
wherein identifying the one or more schedule items relevant to the search request includes comparing the second search criterion to information contained in the one or more schedule items.

43. The system of claim 23, wherein modifying at least one of the one or more search criteria or adding the additional search criterion to the search request comprises:
adding a new time criterion or modifying an existing time criterion based on an event time associated with the at least one of the identified schedule items.

44. The system of claim 23, wherein modifying at least one of the one or more search criteria or adding the additional search criterion to the search request comprises:
adding a new location criterion or modifying an existing location criterion based on a respective location associated with at least one of the identified schedule items.

45. The system of claim 23, wherein identifying the one or more schedule items includes comparing respective domains associated with the one or more schedule items to the respective selection domain.

46. The system of claim 23, wherein the memory has further instructions stored thereon, the further instructions, when executed by the one or more processors, cause the processors to perform:
performing natural language processing on the search request to determine a second search criterion, the second search criterion not explicitly specified in the search request; and
wherein identifying the one or more schedule items relevant to the search request includes comparing the second search criterion to information contained in the one or more schedule items.

47. The non-transitory computer readable storage medium of claim 26, wherein modifying at least one of the one or more search criteria or adding the additional search criterion to the search request comprises:
adding a new time criterion or modifying an existing time criterion based on an event time associated with the at least one of the identified schedule items.

48. The non-transitory computer readable storage medium of claim 26, wherein modifying at least one of the one or more search criteria or adding the additional search criterion to the search request comprises:
adding a new location criterion or modifying an existing location criterion based on a respective location associated with at least one of the identified schedule items.

49. The non-transitory computer readable medium of claim 26, wherein identifying the one or more schedule items includes comparing respective domains associated with the one or more schedule items to the respective selection domain.

50. The non-transitory computer readable medium of claim 26, wherein the memory has further instructions stored thereon, the further instructions, when executed by the one or more processors, cause the processors to perform:
performing natural language processing on the search request to determine a second search criterion, the second search criterion not explicitly specified in the search request; and
wherein identifying the one or more schedule items relevant to the search request includes comparing the second search criterion to information contained in the one or more schedule items.

* * * * *